(12) United States Patent
Sachdeva et al.

(10) Patent No.: US 10,535,191 B2
(45) Date of Patent: Jan. 14, 2020

(54) OBJECT IDENTIFICATION AND LABELING TOOL FOR TRAINING AUTONOMOUS VEHICLE CONTROLLERS

(71) Applicant: LUMINAR TECHNOLOGIES, INC., Orlando, FL (US)

(72) Inventors: Prateek Sachdeva, San Francisco, CA (US); Dmytro Trofymov, Los Altos, CA (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 15/906,529

(22) Filed: Feb. 27, 2018

(65) Prior Publication Data

US 2019/0197778 A1    Jun. 27, 2019

Related U.S. Application Data

(60) Provisional application No. 62/609,015, filed on Dec. 21, 2017.

(51) Int. Cl.
*G06T 19/00* (2011.01)
*G06K 9/62* (2006.01)
(Continued)

(52) U.S. Cl.
CPC ......... *G06T 19/003* (2013.01); *G05D 1/0221* (2013.01); *G05D 1/0253* (2013.01);
(Continued)

(58) Field of Classification Search
None
See application file for complete search history.

(56) References Cited

U.S. PATENT DOCUMENTS

| 7,979,172 B2 | 7/2011 | Breed |
| 8,712,624 B1 | 4/2014 | Ferguson et al. |
| | (Continued) | |

OTHER PUBLICATIONS

Vatic, "Video Annotation Tool from Irvine, California," (2011). Retrieved from the Internet at: URL:http://carlvondrick.com/vatic/.
(Continued)

*Primary Examiner* — Kyle Zhai

(57) ABSTRACT

Techniques for identifying and labeling distinct objects within 3-D images of environments in which vehicles operate, to thereby generate training data used to train models that autonomously control and/or operate vehicles, are disclosed. A 3-D image may be presented from various perspective views (in some cases, dynamically), and/or may be presented with a corresponding 2-D environment image in a side-by-side and/or a layered manner, thereby allowing a user to more accurately identify groups/clusters of data points within the 3-D image that represent distinct objects. Automatic identification/delineation of various types of objects depicted within 3-D images, automatic labeling of identified/delineated objects, and automatic tracking of objects across various frames of a 3-D video are disclosed. A user may modify and/or refine any automatically generated information. Further, at least some of the techniques described herein are equally applicable to 2-D images.

27 Claims, 21 Drawing Sheets
(10 of 21 Drawing Sheet(s) Filed in Color)

(51) Int. Cl.

| | | |
|---|---|---|
| G06T 19/20 | (2011.01) | |
| G06K 9/00 | (2006.01) | |
| G06T 7/174 | (2017.01) | |
| G06T 15/20 | (2011.01) | |
| G06F 3/01 | (2006.01) | |
| G06K 9/66 | (2006.01) | |
| G06F 3/0484 | (2013.01) | |
| G06T 7/12 | (2017.01) | |
| H04N 13/361 | (2018.01) | |
| G06N 20/00 | (2019.01) | |
| G05D 1/02 | (2006.01) | |
| G06T 17/05 | (2011.01) | |
| G06F 3/0481 | (2013.01) | |
| G06T 11/00 | (2006.01) | |
| G06T 15/30 | (2011.01) | |
| G05D 1/00 | (2006.01) | |
| G06N 5/04 | (2006.01) | |
| G06N 3/08 | (2006.01) | |
| G06N 3/00 | (2006.01) | |
| G06F 3/0486 | (2013.01) | |
| G06F 3/0354 | (2013.01) | |

(52) U.S. Cl.
CPC .......... *G06F 3/011* (2013.01); *G06F 3/04812* (2013.01); *G06F 3/04842* (2013.01); *G06F 3/04845* (2013.01); *G06K 9/00214* (2013.01); *G06K 9/00798* (2013.01); *G06K 9/00805* (2013.01); *G06K 9/6254* (2013.01); *G06K 9/6256* (2013.01); *G06K 9/6289* (2013.01); *G06K 9/66* (2013.01); *G06N 20/00* (2019.01); *G06T 7/12* (2017.01); *G06T 7/174* (2017.01); *G06T 11/001* (2013.01); *G06T 15/20* (2013.01); *G06T 15/205* (2013.01); *G06T 15/30* (2013.01); *G06T 17/05* (2013.01); *G06T 19/00* (2013.01); *G06T 19/20* (2013.01); *H04N 13/361* (2018.05); *G05D 1/0088* (2013.01); *G05D 1/0246* (2013.01); *G05D 2201/0213* (2013.01); *G06F 3/03543* (2013.01); *G06F 3/0486* (2013.01); *G06K 2209/23* (2013.01); *G06N 3/006* (2013.01); *G06N 3/08* (2013.01); *G06N 5/04* (2013.01); *G06T 2200/24* (2013.01); *G06T 2207/10028* (2013.01); *G06T 2207/20081* (2013.01); *G06T 2207/30256* (2013.01); *G06T 2207/30261* (2013.01); *G06T 2210/12* (2013.01); *G06T 2219/004* (2013.01); *G06T 2219/028* (2013.01); *G06T 2219/2016* (2013.01)

(56) References Cited

U.S. PATENT DOCUMENTS

| | | |
|---|---|---|
| 8,996,224 B1 | 3/2015 | Herbach et al. |
| 9,234,618 B1* | 1/2016 | Zhu .......................... G01S 17/10 |
| 2007/0136408 A1 | 6/2007 | Wheeler et al. |
| 2010/0034426 A1 | 2/2010 | Takiguchi et al. |
| 2012/0062732 A1* | 3/2012 | Marman ................. H04N 7/18 348/142 |
| 2012/0316784 A1 | 12/2012 | Chrysanthakopoulos |
| 2013/0093788 A1* | 4/2013 | Liu .......................... G06F 3/011 345/633 |
| 2014/0078144 A1* | 3/2014 | Berriman ................. A63F 13/10 345/426 |
| 2014/0135986 A1 | 5/2014 | Kanehara et al. |
| 2014/0267867 A1* | 9/2014 | Lee .................... H04N 5/23293 348/333.01 |
| 2016/0055268 A1 | 2/2016 | Bell et al. |
| 2017/0109611 A1 | 4/2017 | Luo |
| 2017/0220887 A1 | 8/2017 | Fathi et al. |
| 2017/0262167 A1* | 9/2017 | Sanders .............. G06F 3/04883 |
| 2018/0012082 A1 | 1/2018 | Satazoda et al. |
| 2018/0075666 A1 | 3/2018 | Feng et al. |
| 2018/0089536 A1 | 3/2018 | Feng et al. |
| 2018/0129912 A1 | 5/2018 | Vernaza et al. |
| 2018/0136332 A1 | 5/2018 | Barfield, Jr. et al. |

OTHER PUBLICATIONS

Ruiz-Sarmiento, Jose-Raul, Cipriano Galindo, and Javier Gonzalez-Jimenez. "Olt: A toolkit for object labeling applied to robotic RGB-D datasets." Mobile Robots (ECMR), 2015 European Conference on. IEEE, 2015. (Year: 2015).

Zhang, Richard, et al. "Sensor fusion for semantic segmentation of urban scenes." Robotics and Automation (ICRA), 2015 IEEE International Conference on. IEEE, 2015. (Year: 2015).

Final Office Action dated Oct. 25, 2018 for U.S. Appl. No. 15/906,443.

Non-Final Office Action dated May 14, 2018 for U.S. Appl. No. 15/906,141.

Non-Final Office Action dated May 14, 2018 for U.S. Appl. No. 15/906,676.

Non-Final Office Action dated May 24, 2018 for U.S. Appl. No. 15/906,443.

* cited by examiner

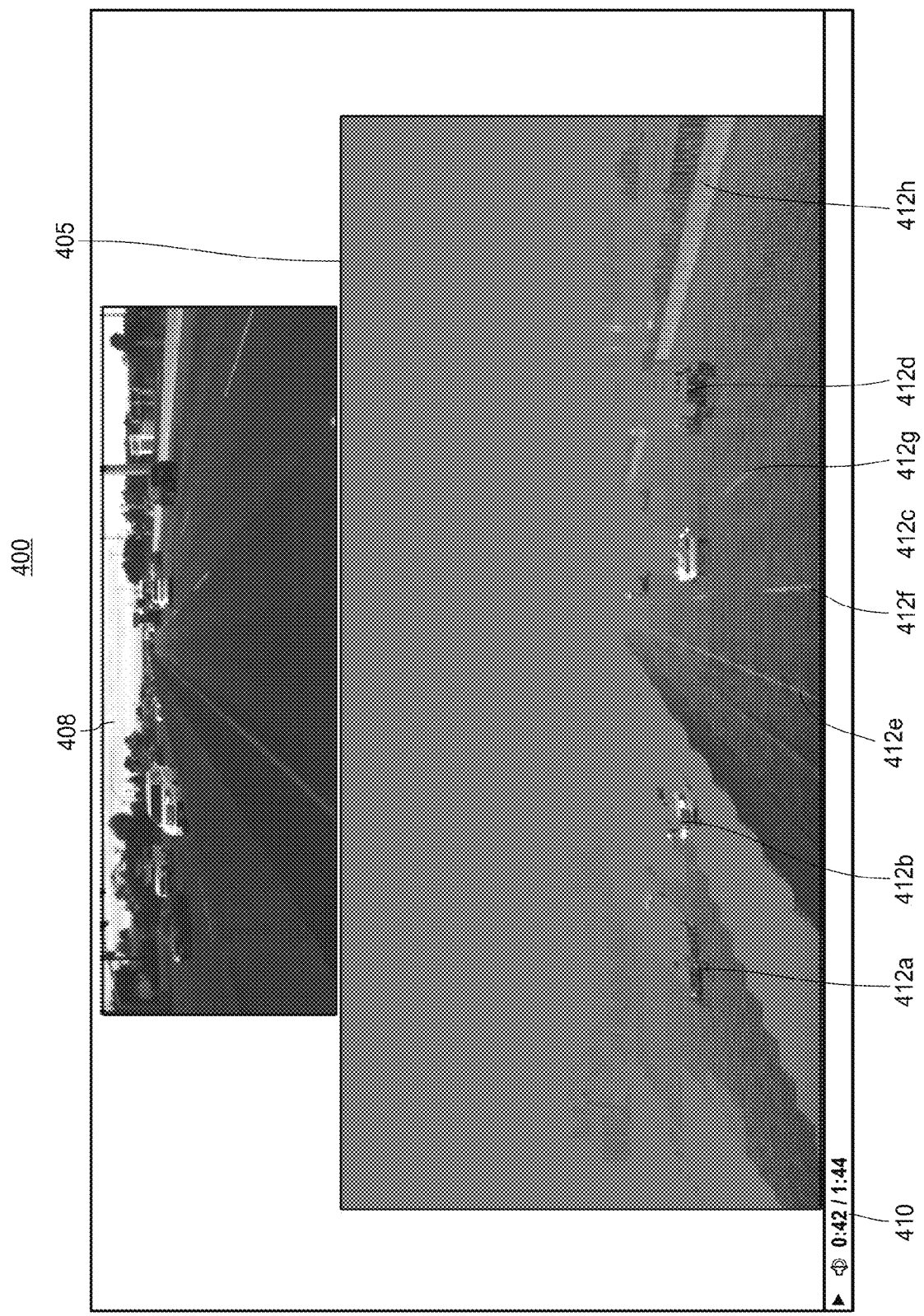

OBJECT IDENTIFICATION AND LABELING TOOL FOR TRAINING AUTONOMOUS VEHICLE CONTROLLERS

CROSS-REFERENCE TO RELATED APPLICATIONS

This application claims priority to and the benefit of U.S. Provisional Patent Application No. 62/609,015 filed on Dec. 21, 2017 and entitled "Object Identification and Labeling Tool for Training Autonomous Vehicle Controllers," the entire disclosure of which is hereby incorporated by reference herein in its entirety for all purposes.

FIELD OF THE DISCLOSURE

This disclosure generally relates to autonomous vehicles and, more particularly, to software-based techniques, tools, and/or graphical user interfaces for labeling distinct objects depicted within source images to generate training data for models that control or operate autonomous vehicles.

BACKGROUND

A vehicle (such as a fully- or partially-autonomous or self-driving vehicle) typically includes one or more sensors to detect and sense an environment in which the vehicle is located and through which the vehicle may be moving. The sensed data (along with other data, in some cases) may be utilized to control vehicle operations and maneuvers. The sensors may be any type or types of sensors which are capable of sensing various objects and/or conditions within the vehicle's environment, such as lidar, radar, cameras, and/or other types of sensors. The vehicle may also include other sensor devices, such as inertial measurement units (IMUs), and/or include other types of devices that provide information on the current position of the vehicle (e.g., a GPS unit).

The data generated by the sensors (and possibly other data) may be processed by a perception component of the autonomous vehicle, which outputs signals indicative of the current state of the vehicle's environment. The output signals generated by the perception component of the vehicle may be utilized to control various driving operations and maneuvers of the vehicle (e.g., steering direction, speed, braking force, etc.). In an example implementation, the perception component may identify (and possibly classify and/or track) objects within the vehicle's environment. As a more specific example implementation, the perception component may include (1) a segmentation module that partitions or distinguishes various objects within images that have been obtained via the various sensors to correspond to probable objects, (2) a classification module that determines labels/classes for the segmented objects, and (3) a tracking module that tracks segmented and/or classified objects over time (e.g., across image frames). For example, based on data provided by one or more of the vehicle sensors, the perception component may discern, identify, classify, and/or track the presence and positions of objects or particular types thereof within the vehicle's environment, and/or may track the configuration of the road (and any objects thereon) ahead of the vehicle. As such, one or more autonomous or self-driving behaviors of the vehicle may be controlled based on the objects that are segmented, classified, and/or tracked by the perception component of the vehicle over time.

In some embodiments, one or more machine-learning based models are trained and utilized by the autonomous vehicle to control the perception component to identify, classify, and/or track objects within the vehicle's environment, and as such, are referred to herein as one or more "perception models." The perception models may be trained using any of various suitable types of learning, such as supervised learning, and may be trained using real-world image data and/or image data generated in a simulated environment that have been labeled according to "correct" outputs of one or more perception functions (e.g., segmentation, classification, and/or tracking). In some configurations, different models are utilized by each of the segmentation module, the classification module, and the tracking module. In some configurations, the segmentation, classification, and/or tracking module utilize one or more common models.

Currently known techniques for identifying and labeling objects for the purposes of generating training data for training autonomous vehicle control models require a human using a computer tool to indicate and label objects within conventional, two-dimensional ("2-D") visual images of vehicle environments, e.g., images that have been generated by a passive imaging device or system, for example, an optical system that uses a lens and a diaphragm and/or filter or other sensors to passively sense, detect, and capture the colors, intensities, etc. of incoming rays of light that are visible to the human eye and that have reflected off of objects within the vehicle environments. For example, conventional, 2-D visual images may be stored in data file formats such as JPEG, Exif, PNG, etc., and conventional dynamic 2-D visual images or videos may be stored in data file formats such as AVI, QuickTime, GIF, etc. Typically, to indicate and label objects that are depicted in conventional, 2-D visual images, a frame of a 2-D image is presented on a user interface. A human may utilize controls provided by the user interface to place a box around an object within the image (e.g., to "bound" the object, or to "place a bounding box around" the object), thereby distinguishing the object from other objects within the image, and provide a respective label for the bounded object (e.g., "car", "person," "bicycle," etc.). A conventional, 2-D visual image may be manipulated by the user in two dimensions, such as by zooming in, zooming out, or translating, to aid the user in bounding the object.

As is commonly known, thousands, if not millions, of labeled image data frames are needed to sufficiently train a vehicle's perception component to be able to identify, classify, and/or track objects within the vehicle's environment with enough accuracy and within a short enough time window to allow for safe control and operation of the vehicle during a variety of driving conditions. Thus, each object depicted within these thousands and millions of training image data frames must be bounded and labeled, one bounding box at a time, by a human using a conventional labeling tool, which is not only time consuming and inefficient, but may also suffer from human errors, inaccuracies, and inconsistencies. Further, two-dimensional images are limited in their accuracy in portraying three-dimensional objects in the respective locations in space. As such, techniques are needed to decrease the time that is needed to label training image data (e.g., over multiple frames and multiple images) as well as to increase the efficiency and accuracy of the labeling itself, thereby increasing both the amount and quality of labeled data used to train the perception component, and ultimately increasing the safety of autonomous operation of a vehicle whose operations and maneuvers are controlled by the trained perception component.

SUMMARY

The present disclosure includes systems, methods, tools, and techniques for efficiently and accurately identifying and labeling objects (e.g., objects that are depicted in images of environments in which vehicles operate) for training machine-learning based models that are used to operate and control vehicles in a fully-autonomous or partially-autonomous manner. In an example usage scenario, the system or tool is used to identify and label distinct objects that are depicted in three-dimensional (3-D) source images, such as point cloud datasets or images generated by active sensing devices and/or systems, e.g., lidar devices, radar devices, sonar devices, infrared devices, etc. Generally speaking, active sensing devices and systems include respective sources of illumination and/or of other types of electromagnetic energy. Active sensing devices and/or systems typically generate and emit, by using their electromagnetic energy sources, one or more electromagnetic waves into the surrounding environment, and measure the backscatter of the emitted waves that is reflected back to the device or system to thereby generate a 3-D image of the environment. In another example usage scenario, the system or tool is used to identify and label distinct objects that are depicted in two-dimensional (2-D) source images, such as those generated by passive sensing devices and systems, e.g., RGB (red-green-blue) cameras, heat sensors, light sensors, etc. Passive sensing devices typically measure electromagnetic energy that is emitted by one or more other, third party sources, such as the sun and/or other light sources, heat sources, etc., and that has been reflected off of various objects located within the environment.

When used to identity and label objects depicted in three-dimensional images, the system or tool may present, on a user interface, a source image that is a 3-D image of an environment in which vehicles operate, and may allow a user to dynamically change and vary the perspective view of the environment depicted in the 3-D source image, e.g., in three dimensions, thereby enabling the user to more accurately visually ascertain, discern and/or identify the boundaries of a particular, distinct object depicted within the 3-D image, and in particular as compared to doing so from only an arbitrary 2-D perspective. That is, a user may dynamically change and vary the virtual, 3-D camera angle from which the 3-D image of the environment is presented on the user interface. In an embodiment, the system or tool may provide the user with a virtual reality representation and interactive experience of the environment depicted by the 3-D image, so that the user/viewer may virtually move or navigate, in three dimensions, through the 3-D spatial environment presented on the user interface.

While viewing the environment that is depicted by the 3-D image from a first perspective view via the system or tool, the user may indicate, define, or identify the boundaries of a particular, distinct object within the image by adding or including a graphical representation (such as a bounding box, a fill treatment, one or more lines, and/or other types of visual properties) thereof to the 3-D source image. Additionally, via the system or tool, the user may associate the identified boundaries of the particular object (e.g., as denoted by the graphical representation) with a respective label that describes, categorizes, and/or classifies the particular, distinct object that is distinguished from other portions of the image via the graphical boundary representation.

In some embodiments, the system or tool may provide an initial or interim draft graphical representation of the object's boundaries, which the user may accept, approve, and/or save without any changes thereto, or which the user may modify/adjust and accept, approve, and/or save with the applied modifications/changes. When the user subsequently changes the presentation of the 3-D image to be from a second perspective view (e.g., changes the virtual 3-D camera angle from which the 3-D image is presented on the user interface), the system/tool automatically maintains, carries forward, and/or presents, within the second perspective view, the graphical representation of the particular object's boundaries that were previously identified or defined in the first perspective view (and its associated label). In some embodiments, the system or tool automatically modifies the graphical representation from the first perspective view to account for the view from the second perspective prior to displaying the graphical boundary representation of the particular object on the second perspective view. The user then may accept the proposed graphical representation of the second perspective view without any changes thereto, or may refine the boundaries of the particular object within the image shown from the second perspective view, e.g., by modifying or adjusting the graphical boundary representation of the particular object within the second perspective view, prior to accepting the modified graphical boundary representation. As such, the system/tool enables a user to define or identify and label the boundaries of a particular object depicted within a 3-D image from multiple perspective views, thereby providing a more accurate identification of the overall boundaries of the particular, distinct object within the 3-D image. Bounding an object as depicted within a 3-D image may be performed as granularly as desired using the techniques disclosed herein. For example, each data point or pixel of the 3-D image may be identified and/or labeled as being included in the image of the particular, distinct object, or as being excluded from the image of the object.

To further aid the user in accurately identifying the boundaries of a particular object represented within a 3-D environment image, one or more 2-D images of different perspective views of the particular object may be simultaneously presented on the user interface (e.g., in a side-by-side configuration) in conjunction with the 3-D source image to thereby help avoid the difficulty and frustration of trying to place or manipulate boundaries when viewing the image from an arbitrary, 2-D perspective. For example, a 2-D side view of the particular object on which the user has focused attention on in the 3-D image (e.g., by selecting or otherwise indicating the particular object within the 3-D image), and/or a 2-D top view of the particular object on which focus is directed may be simultaneously presented on the user interface in conjunction with the presentation of 3-D environment image which the particular object is located. In an example scenario, when a user selects a particular cluster of data points on the 3-D image, one or more corresponding 2-D perspective views of the selected cluster may be automatically presented on the user interface as well. Each 2-D perspective view of the 3-D image may comprise a respective subset of the point cloud dataset comprising the selected cluster included in the 3-D image, in an embodiment. The displayed 2-D images may be linked to the displayed 3-D image so that objects and graphical representations of object boundaries that are presented on one of the images (e.g., on a particular 2-D image perspective view, or on the 3-D image) are automatically presented on the other image(s), and so that any user alterations or modifications to a graphical boundary representation that is displayed on one of the images are automatically reflected on the other images.

The system or tool may also provide various features that allow more efficient and accurate discernment, distinguishing, identification, and labeling of distinct objects that are located in vehicle environments depicted by 3-D images and/or by 2-D images. One such feature is the ability to automatically track an object across multiple frames of a video, where each frame is a different, static source image captured at a different moment in time. Generally speaking, each frame may include a respective image of the environment at a different instance in time, and collectively the multiple frames may provide a time-sequenced video of the environment. After a user has identified and labeled the boundaries of a particular object as depicted in a first frame depicting a vehicle's environment at a first time, e.g., via a first graphical representation, the system or tool may track the object in two a second frame depicting the vehicle's environment at a second time, and automatically maintain, carry forward, and/or present the first graphical representation into the second frame in conjunction with its label. The second frame may correspond to a later time or to an earlier time than the time corresponding to the first frame (that is, the object may be tracked in forward time or in reverse time). With either forward or reverse tracking, though, the user may refine the boundaries of the particular object as depicted in the second frame if necessary or desired, e.g., by modifying or adjusting the first graphical boundary representation of the particular object within the second frame, thereby forming a second graphical representation of the boundary of the object within the second frame, and thereby tracking the labeled, particular object between the first and the second frames. Indeed, the system or tool may automatically track an object across multiple frames to a frame in which only a single data point or pixel is tracked, identified, and labeled as being the particular object, such as when a car drives into the distance out of the field of view of the camera(s).

Another feature of the system or tool that allows a user to more efficiently and accurately identity and label objects located in vehicle environments that are depicted by 2-D and/or 3-D source environment is a paint feature. The paint feature includes a user control that provides a virtual paintbrush via which the user may paint over areas of an image to thereby indicate or identify a distinct object or type of object depicted therein (and/or to thereby indicate or identify its boundaries as depicted within the image), and associate the painted-over areas with a respective label. Typically, a user would use the paint feature to indicate an essentially planar surface area, such as a road, a driveway, or the side of a retaining wall, for example. Painting-over an area generally results in distinguishing the painted-over area within the source image via a different visual property, such as different fill color, pattern, or dynamic property. Different paint visual properties may uniquely correspond to different object types and/or labels, if desired. The paint feature particularly enables users to quickly and accurately identify surfaces and/or surface conditions depicted within an image, such as road surfaces, ice on a road surface, potholes, etc. Additionally, to further aid in quick and accurate identification, the width of the virtual paintbrush may be modified by the user as desired. For example, individual pixels or data points may be painted by using a thin or narrow brush size, or negative spaces of an image (e.g., areas of the image that do not include any objects that need to be identified and labeled for training a model) may be painted by using a wider or larger brush size. Additionally or alternatively, different implementations of painting, such as point-and-fill (e.g., a user pointing a cursor or other electronic pointer or indicator at a particular location and activating the point-and-fill user control while the cursor or electronic pointer is pointing to (or hovering over) the particular location, and the system or tool automatically filling in the entire surface area of which the pointed location is a part with the modified visual property), spilling paint, etc. may be provided by the paint feature to provide additional flexibility and convenience during object identification and labeling.

Yet another feature of the system or tool that allows a user to more efficiently and accurately identity and label objects located in vehicle environments that are depicted by 2-D environment images or by 3-D environment images is a lane-marking feature. The lane-marking feature is a user control that allows a user to easily and quickly identify and label the sides or edges of lanes and/or roads as depicted within a source image. In an example implementation, the user may indicate two points on the source image and activate the lane-marking feature. In response, the tool may automatically generate and present a graphical line between the two selected points to thereby distinguish or signify a portion of the side or edge of a lane or a road within the source image. The user may provide or indicate a label for the identified portion of the side or edge of the lane/road, or the system/tool may automatically generate a corresponding label. Of course, similar to the other types of object identification, the sides and edges of lanes/roads may be automatically tracked by the tool across frames. Accordingly, with the lane-marking feature, lane delineators, lane dividers, and edges of roads are easily identified and labeled with the lane-marking feature.

In some implementations, the system or tool may perform one or more image processing analyses of a source image to automatically discover or determine a subset of the total set of data points of which the source image is comprised that represents a distinct object, and/or to automatically determine the boundaries of the discovered distinct object as depicted within the source image. In some implementations, the system or tool may additionally or alternatively determine an initial label for an indicated object within a source image. The initial identification and/or the initial label may be presented, for example, on the user interface as a draft graphical representation of the object's boundaries and a draft label for the object, respectively. The user may then refine and/or modify the automatically generated, draft boundaries and/or labels using any one or more of the features disclosed herein.

Generally speaking, identified and labeled objects within an image of an environment in which vehicles operate are included in or incorporated into a set of training data utilized to train one or more machine-learning models that operate (or will operate) within a vehicle to autonomously control and/or operate the vehicle in various environments. The systems, methods, and techniques disclosed herein provide improvements in computer-related technology that previously were produced by human actions at a generic computer. Specifically, the systems, methods, and techniques disclosed herein provide specific, structured graphical user interfaces paired with prescribed functionality that is directly related to the specific, structured graphical user interface, as well as that provides additional specific ways to solve the problem of accurate identification and labeling of objects for use as training data for autonomous vehicle operation and control. For example, using the techniques disclosed herein, an object which appears across different perspective views and/or different frames of environment images (such as a neighboring vehicle, a traffic lane, a road, etc.) is able to be automatically identified and labeled across the different perspective views and/or frames. In contrast, existing identification and labeling techniques, while performed using a generic computer, nonetheless still require a person or human being to visually search for the object within each of the different perspective views and/or frames, manually identify the object's boundaries within each of the different perspective views and/or frames, and manually assign a label to the object in each view and/or frame.

For example, existing or known object identification and labeling tools generally present a two-dimensional (2-D) image on a user interface of a computer, where the 2-D image has been captured using an RGB camera (e.g., a camera that utilizes three independent sensors to detect red, green, and blue color signals) or other type of passive imaging device or system, e.g., by passively detecting light waves that are present within an environment via an open aperture. A person or user studies the 2-D image, visually discerns or identifies a particular object of interest depicted therein (e.g., another car, a pedestrian, the side of the road, etc.), and then manually "bounds" or "boxes" the particular object by using user controls provided by the known tools to draw line segments around the particular object within the 2-D image based on the user's visual perception. The user then applies a label to the bounded, particular object, e.g., by selecting from a drop-down list. The identified and labeled particular object within the 2-D image is stored and used as part of a set of training data for the autonomous vehicle machine-learning based models. In some cases, the 2-D source image is a first frame included in a 2-D video that has been captured by an RGB camera mounted on a vehicle. Thus, when a subsequent frame of the 2-D video is presented on the user interface, the user must then repeat the process for objects depicted in the subsequent frame (e.g., study the subsequent frame, visually identify particular objects, manually bound or box the identified objects, and manually apply respective labels). As such, a same vehicle that appears in multiple frames must be manually identified and labeled anew by the user in each frame.

These known techniques suffer from numerous drawbacks. For example, the requirement on a user to newly identify and label a particular object across each of multiple frames while using the known techniques increases the time and the cost that are incurred to identify and label the multiple (e.g., thousands or millions) of images that are necessary to sufficiently train a model to safely operate and/or control a vehicle in an autonomous manner. Further, and importantly, these known techniques introduce inaccuracies into the identification and labeling process, which then are absorbed into the training data that is used to train the machine-learning based models, which then are absorbed into the decisions made by the machine-learning based models to control and operate the autonomous vehicle. As such, due to these inaccuracies, the time and resources required to train the models may be increased to mitigate these inherent inaccuracies provided by existing labeling tools and techniques. More importantly, due to these inaccuracies, the accuracy and/or the safety of autonomous vehicle control and/or operation decisions made by the trained models may suffer, thereby increasing the risk to passengers, pedestrians, and other people and/or vehicles that are located within an autonomous vehicle's operational environment.

In particular, the known identification and labeling techniques rely on a user's personal judgment to visually identify objects within a 2-D image, and again rely on the user's personal judgment to consistently identify and label the same object across multiple frames. As such, inaccuracies may occur, such as when a user is identifying and labeling a plethora of objects within a first frame, and forgets to identify/label one of the many objects in a subsequent frame. Another example of the occurrence of inaccuracies is when a particular object decreases in size across multiple frames, such as when a passing vehicle disappears into the distance. In this example, in the later frames, the passing vehicle may be depicted in a very small size within the later frames; however, the user may not be able to discern the presence of the passing vehicle's image therein, such as when the passing vehicle is only depicted by a few pixels.

Yet another example of inaccuracies may be introduced by the known bounding techniques. As discussed above, a user bounds a particular object by drawing line segments around the object, or by placing a predefined box around the particular object and resizing the box to "fit" the image of the particular object according to the user's judgment. In these situations, as user discernment is used to bound the particular object, the boundaries of the image of the particular object within the 2-D image may be inaccurate, and may even inadvertently identify other image data as being included in the particular object, such as in images in which one object is partially obscured by another object, when the user mistakes a shadow as being included in the particular object, and the like. Further, different users may bound a same object differently, thus introducing still further inconsistencies within the training data used to train the models.

On the other hand, the systems, methods, and techniques disclosed herein greatly reduce the time needed to generate training data (which is significant, as thousands, if not millions, of labeled image data frames are needed to sufficiently train a vehicle's perception component to be able to identify, classify, and/or track objects within the vehicle's environment with enough accuracy and within a short enough time window to allow for safe control and operation of the vehicle during a variety of driving conditions), as well as greatly increase the accuracy of the training data itself. Both of these advantages significantly improve the safety of autonomous vehicles. For example, as the time needed to generate training data is decreased, more training data (e.g., more identified and labeled objects) can be produced in the same number of people-hours and then utilized to train models that are used to control and/or operate autonomous vehicles, thereby increasing the accuracy of trained models in their control and/or operation of autonomous vehicles due to the increased volume of training data. Additionally, as the accuracy of the identification and labeling of objects for training data is increased, the accuracy of the trained models in their control and/or operation of autonomous vehicles—and thus the degree or level of safe control and/or operation of autonomous vehicles—is further increased as well.

It is noted that for ease of reading herein, the term "autonomous vehicle" may refer to a vehicle that is controlled and/or operated in a fully-autonomous manner, and/or may refer to a vehicle that is controlled and/or operated in a semi-autonomous manner. As such, the term "autonomous," as used herein, generally may be interpreted as "fully-autonomous and/or partially-autonomous."

One example embodiment of the techniques of this disclosure is a computer-implemented method for identifying and labeling objects within images for training machine-learning based models that are used to autonomously operate or control vehicles, e.g., in a fully-autonomous or partially-autonomous manner. The method includes displaying, on a user interface, a three-dimensional (3-D) image of an environment in which vehicles operate, where the 3-D environment image depicts one or more physical objects located in the environment, and the 3-D environment image is presented on the user interface from a first perspective view. The method also includes receiving, via one or more user controls provided by the user interface, an indication of a first graphical representation of a boundary of a particular object as depicted within the 3-D environment image from the first perspective view; generating, based on the first graphical representation, data indicative of the boundary of the particular object within the 3-D environment image from the first perspective view; obtaining an indication of a particular label for the particular object; generating, based on the data indicative of the boundary of the particular object within the 3-D environment image from the first perspective view, an association between the particular label and a 3-D image of the particular object within the 3-D environment image, thereby distinguishing the 3-D image of the particular object within the 3-D environment image; and storing an indication of the association between the particular label and the 3-D image of the particular object within the 3-D environment image in one or more tangible, non-transitory memories as a part of a training data set utilized to train one or more machine-learning based models, where the one or more machine-learning based models are used to at least partially autonomously control and/or operate one or more vehicles. Further, the method includes receiving, via the one or more user controls, an instruction to present the 3-D environment image on the user interface from a second perspective view different than the first perspective view and, based on the received view perspective instruction, adjusting a presentation of the 3-D environment image on the user interface to be from the second perspective view. Still further, the method includes receiving, via the one or more user controls, an indication of a second graphical representation of the boundary of the particular object as depicted within the 3-D environment image from the second perspective view; generating, based on the second graphical representation, data indicative of the boundary of the particular object within the 3-D environment image from the second perspective view; and updating, based on the data indicative of the boundary of the particular object within the 3-D environment image from the second perspective view, the stored indication of the association between the particular label and the 3-D image of the particular object within the 3-D environment image, thereby refining the distinguishing of the 3-D image of the particular object within the 3-D environment image.

Another example embodiment of the techniques of this disclosure is a system for identifying and labeling objects within images for training machine-learning based models that are used to autonomously operate or control vehicles, e.g., in a fully-autonomous or partially-autonomous manner. The system comprises a communication module, one or more processors, and one or more non-transitory, tangible memories that are coupled to the one or more processors and that store computer executable instructions thereon. The computer executable instructions, when executed by the one or more processors, cause the system to display, on a user interface, a three-dimensional (3-D) image of an environment in which vehicles operate, where the 3-D environment image depicting one or more physical objects located in the environment, and the 3-D environment image is presented on the user interface from a first perspective view. The instructions are executable to additionally cause the system to receive, via the communication module, an indication of a first graphical representation of a boundary of a particular object as depicted within the 3-D environment image from the first perspective view, where the first graphical representation is generated via one or more user controls provided by the user interface; generate, based on the first graphical representation, data indicative of the boundary of the particular object within the 3-D environment image from the first perspective view; obtain an indication of a particular label for the particular object; generate, based on the data indicative of the boundary of the particular object within the 3-D environment image from the first perspective view, an association between the particular label and a 3-D image of the particular object within the 3-D environment image, thereby distinguishing the 3-D image of the particular object within the 3-D environment image; and store an indication of the association between the particular label and the 3-D image of the particular object within the 3-D environment image in the one or more tangible, non-transitory memories as a part of a training data set utilized to train one or more machine-learning based models, where the one or more machine-learning based models are used to autonomously control or operate vehicles, e.g., in a fully-autonomous or partially-autonomous manner. The instructions are executable to cause the system further to receive, via the communication module, a user instruction to present the 3-D environment image on the user interface from a second perspective view different than the first perspective view, and based on the received view perspective user instruction, adjust a presentation of the 3-D environment image on the user interface to be from the second perspective view. Additionally, the instructions are executable to cause the system to receive, via the communication module, an indication of a second graphical representation of the boundary of the particular object as depicted within the 3-D environment image from the second perspective view, where the second graphical representation is generated via the one or more user controls provided by the user interface; generate, based on the second graphical representation, data indicative of the boundary of the particular object within the 3-D environment image from the second perspective view; and update, based on the data indicative of the boundary of the particular object within the 3-D environment image from the second perspective view, the stored indication of the association between the particular label and the 3-D image of the particular object within the 3-D environment image, thereby refining the distinguishing of the 3-D image of the particular object within the 3-D environment image.

Yet another example embodiment of the techniques of this disclosure is a computer-implemented method for identifying and labeling objects within images for training machine-learning based models that are used to control or operate vehicles in a fully- or partially-autonomous manner. The method includes presenting, on a user interface of one or more computing devices, (i) a first frame comprising an image of an environment, at a first time, in which vehicles operate, the first frame depicting one or more physical objects located in the environment, and (ii) a first graphical representation indicating a boundary of a particular object located in the environment as depicted in the first frame at the first time, wherein an association of data indicative of the boundary of the particular object as depicted within the first frame at the first time and a particular label of the particular object (i) distinguishes an image of the particular object within the first frame, and (ii) is stored in one or more tangible, non-transitory memories as a part of a training data set utilized to train one or more machine-learning based models, where the one or more machine-learning based models are used to fully- or partially-autonomously control vehicles. The method also includes presenting, on the user interface, a second frame comprising an image of the environment at a second time different than the first time, the second frame depicting at least a portion of the particular object; automatically generating, based on the first graphical representation of the boundary of the particular object as depicted in the first frame, an interim graphical representation of the boundary of the particular object as depicted within the second frame, and presenting the interim graphical representation within the second frame. Additionally, the method includes receiving, via the user interface, an indication of a user modification to the interim graphical representation; altering, based on the received user modification, the interim graphical representation to thereby generate a second graphical representation of the boundary of the particular object as depicted in the second frame at the second time; generating data indicative of the second graphical representation of the boundary of the particular object as depicted within the second frame; and storing, in the one or more tangible, non-transitory memories, an association of the data indicative of the boundary of the particular object as depicted in the second frame at the second time and the particular label of the particular object as another part of the training data set.

Another example embodiment of the techniques of this disclosure is a system of for identifying and labeling objects within images for training machine-learning based models that are used to autonomously operate or control vehicles, e.g., in a fully-autonomous or semi-autonomous manner. The system comprises a communication module, one or more processors, and one or more non-transitory, tangible memories coupled to the one or more processors and storing computer-executable instructions thereon. The computer executable instructions, when executed by the one or more processors, cause the system to present, on a user interface of one or more computing devices, (i) a first frame comprising an image of an environment, at a first time, in which vehicles operate, the first frame depicting one or more physical objects located in the environment, and (ii) a first graphical representation indicating a boundary of a particular object located in the environment as depicted in the first frame at the first time, wherein an association of data indicative of the boundary of the particular object as depicted within the first frame at the first time and a particular label of the particular object (i) distinguishes an image of the particular object within the first frame, and (ii) is stored in one or more tangible, non-transitory memories as a part of a training data set utilized to train one or more machine-learning based models, where the one or more machine-learning based models used to fully- or partially-autonomously control or operate vehicles. The computer executable instructions are executable to cause the system further to present, on the user interface, a second frame comprising an image of the environment at a second time different than the first time, the second frame depicting at least a portion of the particular object; automatically generate, based on the first graphical representation of the boundary of the particular object as depicted in the first frame, an interim graphical representation of the boundary of the particular object as depicted within the second frame; and present the interim graphical representation within the second frame. Additionally, the computer executable instructions are executable to cause the system to receive, via the communication module, an indication of a user modification to the interim graphical representation; alter, based on the received user modification, the interim graphical representation to thereby generate a second graphical representation of the boundary of the particular object as depicted in the second frame at the second time; generate data indicative of the second graphical representation of the boundary of the particular object as depicted within the second frame; and store, in the one or more tangible, non-transitory memories, an association of the data indicative of the boundary of the particular object as depicted in the second frame at the second time and the particular label of the particular object as another part of the training data set.

Another example embodiment of the techniques of this disclosure is a computer-implemented method for identifying and labeling objects within images for training machine-learning based models that are used to autonomously operate or control vehicles, e.g., in a fully- or partially-autonomous manner. The method includes displaying, on a user interface of one or more computing devices, an image of an environment in which vehicles operate, the image depicting one or more physical objects located in the environment, and providing, the user interface, a paint user control for use by a user to indicate areas within images displayed on the user interface. The method further includes receiving, via a user activation of the paint user control, an indication of a location within the image; and based upon the indicated location, (i) automatically determining without any additional user input aside from the user activation, an area within the image, and (ii) automatically modifying, by the one or more computing devices based upon the received indication of the area, a visual property of the automatically determined area. The automatically determined area within the image is a subset of the total area of the image, includes both the indicated location and other locations within the image, and represents a surface area that is depicted within the image of the environment. Additionally, the method includes obtaining, by the one or more computing devices, an indication of a particular label for the indicated area of the image; and storing, by the one or more computing devices in one or more tangible, non-transitory memories, an indication of an association between data indicative of the indicated area of the image and the particular label, thereby distinguishing the indicated area from other areas of the image.

Still another example embodiment of the techniques of this disclosure is a system for identifying and labeling objects within images for training machine-learning based models that are used to autonomously operate vehicles, e.g., in a fully autonomous or partially autonomous manner. The system comprises a communication module, one or more processors, and one or more non-transitory, tangible memories coupled to the one or more processors and storing computer executable instructions thereon that, when executed by the one or more processors, cause the system to display, on a user interface, an image of an environment in which vehicles operate, the image depicting one or more physical objects located in the environment, and provide, on the user interface, a paint user control for use by a user to indicate areas within the image. Additionally, the computer executable instructions are executable to cause the system further to receive, via the communication module, an indication of a user activation of the paint user control thereby indicating a location within the image. Based upon the indicated location, the system may (i) automatically determine, without any additional user input aside from the user activation, an area within the image, and (ii) modify a visual property of the automatically determined area. The automatically determined area within the image is a subset of the total area of the image, includes the indicated location and additional locations within the image, and represents a surface area that is depicted in the image of the environment. The computer executable instructions are executable to cause the system to further obtain an indication of a particular label for the indicated area of the image; and store, in the one or more tangible, non-transitory memories, an indication of an association between data indicative of the indicated area of the image and the particular label, thereby distinguishing the indicated area from other areas of the image.

Another example embodiment of the techniques of this disclosure is a computer-implemented method for identifying and labeling objects depicted within images for training machine-learning based models that are used to autonomously control or operate vehicles, e.g., in a fully- or semi-autonomous manner. The method includes displaying, on a user interface of one or more computing devices, an image of an environment in which vehicles operate, the image depicting one or more physical objects located in the environment; and providing, on the user interface, a lane-marking user control for use by a user to indicate lane markings within the image. Additionally, the method includes receiving, via the lane-marking user control, a user selection of a first location within the image that is non-adjacent to a second location within the image, the first location and the second location indicating respective endpoints of a segment of an edge of a traffic lane depicted within the image of the environment; and based upon the second location and the received user selection of the first location, automatically generating and displaying on the image, by the one or more computing devices, a marking indicative of the segment of the edge of the traffic lane. Additionally, the method includes storing, by the one or more computing devices in one or more tangible, non-transitory memories, an indication of an association between a particular label for the traffic lane and data indicative of the segment of the edge of the traffic lane, thereby distinguishing the traffic lane from other areas and/or objects depicted within the image.

Another example embodiment of the techniques of this disclosure is a system for identifying and labeling objects depicted within images for training machine-learning based models that are used to autonomously control vehicles, e.g., in a semi- or fully-autonomous manner. The system comprises a communication module, one or more processors, and one or more non-transitory, tangible memories coupled to the one or more processors and storing computer executable instructions thereon that, when executed by the one or more processors, cause the system to display, on a user interface, an image of an environment in which vehicles operate, the image depicting one or more physical objects located in the environment; and provide, on the user interface, a lane-marking user control for use by a user to indicate lane markings within the image. Additionally, the computer executable instructions are executable to cause the system further to receive, via the communication module, an indication of a user selection, via the lane-marking user control, of a first location within the image that is non-adjacent to a second location within the image, the first location and the second location indicating respective endpoints of a segment of an edge of a traffic lane depicted within the image of the environment; based upon the second location and the received user selection of the first location, automatically generate and display on the image, by the one or more computing devices, a marking indicative of the segment of the edge of the traffic lane; and store, in the one or more tangible, non-transitory memories, an indication of an association between a particular label for the traffic lane and data indicative of the segment of the edge of the traffic lane, thereby distinguishing the traffic lane from other areas and/or objects depicted within the image.

Yet another example embodiment of the techniques of this disclosure is a computer-implemented method for identifying and labeling objects within images for training machine-learning based models that are used to fully- or partially-autonomously operate or control vehicles. The method comprises displaying, on a user interface, a three-dimensional (3-D) image of an environment in which vehicles operate, where the 3-D environment image includes respective 3-D images of one or more physical objects located in the environment, and the 3-D environment image is displayable from multiple perspective views on the user interface in response user input; and layering at least a portion of a two-dimensional (2-D) image of the environment with the 3-D environment image. The 2-D environment image includes a 2-D image of a particular physical object included in the one or more physical objects depicted in the 3-D environment image, thereby the layering of the 2-D image and the 3-D image generates a composite image of the particular physical object, where the composite image of the particular physical object includes a portion of the 2-D image of the particular physical object (e.g., from the 2-D environment image) and a portion of the 3-D image of the particular physical object (e.g., from the 3-D environment image); and displaying, on the user interface, the composite image of the particular object within the 3-D environment image of the environment. The method also includes receiving, via one or more user controls provided by the user interface, an indication of a boundary of the particular physical object depicted by the composite image within the 3-D environment image; generating data indicative of the boundary of the particular physical object within the 3-D environment image; receiving an indication of a particular label for the particular physical object; associating the particular label for the particular physical object in association with the data indicative of the boundary of the particular physical object within the 3-D environment image, thereby distinguishing a set of data points that are representative of the particular physical object within the 3-D environment image from other data points included in the 3-D environment image; and storing an indication of the association between the particular label and the data indicative of the boundary of the particular physical object within the 3-D environment image in one or more tangible memories as a part of a training data set utilized to train one or more machine-learning based models, where the one or more machine-learning based models are used to autonomously operate or control vehicles, e.g., in semi- or fully-autonomous manner.

Another example embodiment of the techniques of this disclosure is a system for identifying and labeling objects within images for training machine-learning based models that are used to operate or control vehicles, such as in a fully-autonomous or partially-autonomous manner. The system includes a communication module, one or more processors, and one or more non-transitory, tangible memories coupled to the one or more processors and storing computer executable instructions thereon that, when executed by the one or more processors, cause the system to display, on a user interface, a three-dimensional (3-D) image of an environment in which vehicles operate, where the 3-D environment image includes respective 3-D images of one or more physical objects located in the environment, and the 3-D environment image is displayable from multiple perspective views on the user interface in response user input; and layer at least a portion of a two-dimensional (2-D) image of at least a portion of the environment with the 3-D environment image, where the 2-D environment image includes a 2-D image of a particular physical object that is included in the one or more physical objects depicted in the 3-D environment image. The layering thereby generating a composite image of the particular physical object, where the composite image of the particular physical object includes a portion of the 2-D image of the particular physical object (e.g., from the 2-D environment image) and a portion of the 3-D image of the particular physical object (e.g., from 3-D environment image). The computer executable instructions are executable to cause the system further to display, on the user interface, the composite image of the particular object within the 3-D environment image of the environment; receive, via the communication module, an indication of a boundary of the particular physical object depicted by the composite image within the 3-D environment image, the indication of the boundary of the particular physical object provided by a user via the user interface; generate data indicative of the boundary of the particular physical object within the 3-D environment image based on the received indication of the boundary of the particular physical object depicted by the composite image within the 3-D environment image; and store, in the one or more non-transitory, tangible memories, data indicative of a particular label descriptive of the particular physical object in association with the data indicative of the boundary of the particular physical object within the 3-D environment image, thereby distinguishing a set of data points that are representative of the particular physical object within the 3-D environment image from other data points included in the 3-D environment image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5A-5K depict example screenshots of graphical user interfaces that may be provided by the systems, methods, and techniques disclosed herein.

DETAILED DESCRIPTION

As previously noted, for ease of reading herein, and not for limitation purposes, the term "autonomous vehicle," as used herein, may refer to a vehicle that is controlled and/or operated in a fully-autonomous manner, that is, a vehicle that is entirely self-driving. Additionally or alternatively, the term "autonomous vehicle" as used herein, may refer to a vehicle that is controlled and/or operated in a semi-autonomous manner or that is partially self-driving. Accordingly, the term "autonomous vehicle," as used herein, is applicable to vehicles that operate at Level 1, Level 2, Level 3, Level 4, or Level 5 of SAE (Society of Automotive Engineers) International Standard J3016. As such, the term "autonomous," as used herein, generally may be interpreted as "fully-autonomous and/or partially-autonomous" and/or as "entirely self-driving and/or partially self-driving."

Example Self-Driving Control Architecture for Autonomous Vehicles

Figure 1A:
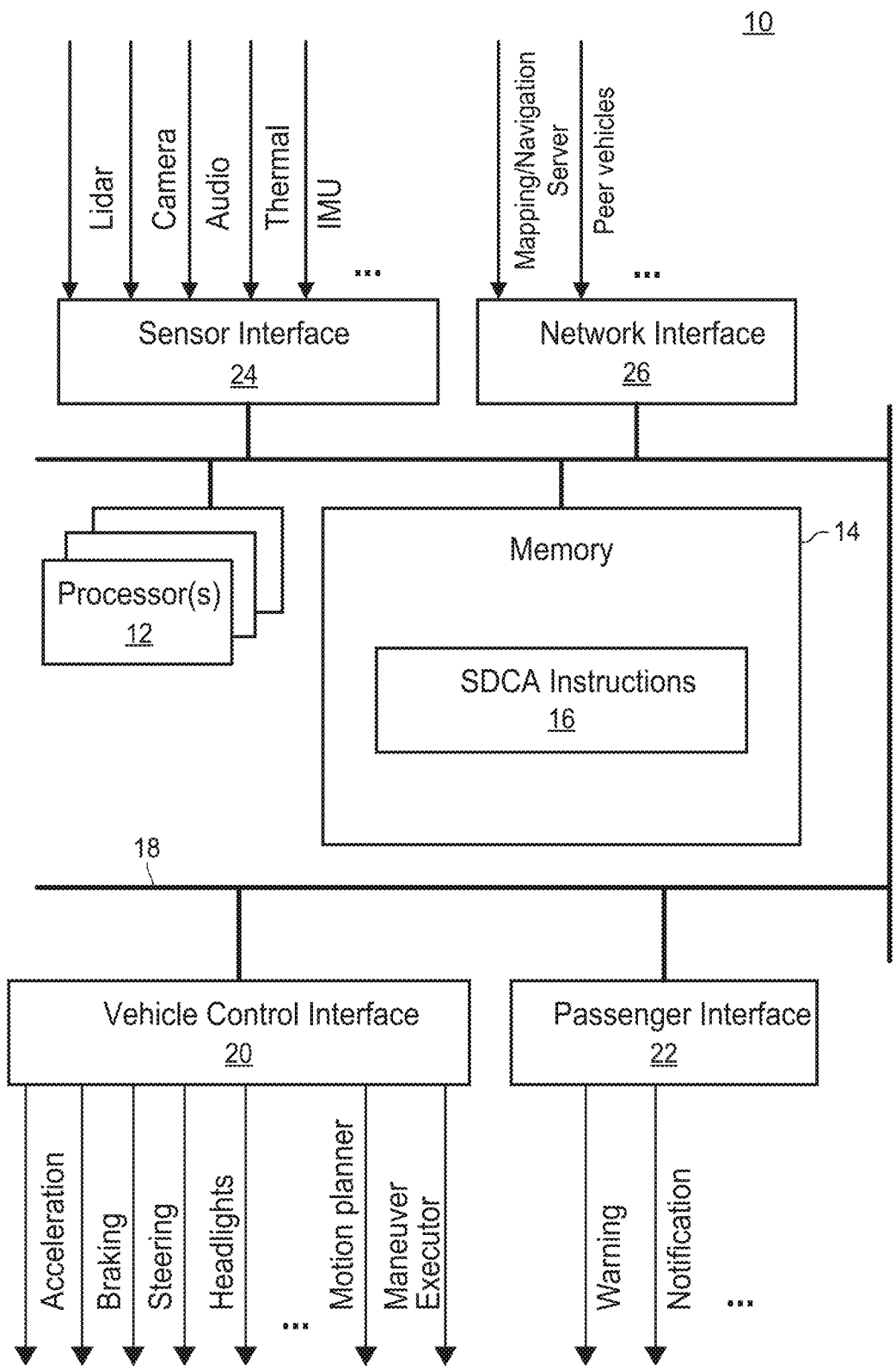
FIG. 1A is a block diagram of an example computing system for controlling an autonomous vehicle.

FIG. 1A includes a block diagram of an example computing system 10 for controlling and/or operating an autonomous vehicle. The computing system 10 may be integrated within an autonomous vehicle in any suitable manner, and at any suitable location or locations within the vehicle. For example, the computing system 10 may be included, or partially included, within a vehicle controller that is on-board an autonomous vehicle, where the vehicle controller controls and/or operates at least some of the vehicle's driving subsystems that include mechanical components (e.g., accelerator, brakes, steering mechanism, lights, etc.) in a fully- or semi-autonomous manner. The computing system 10 includes one or more processors 12 and one or more tangible, non-transitory memories 14 storing thereon vehicle subsystem control and/or operation instructions 16, which are referred to herein as self-driving control architecture ("SDCA") instructions 16. Generally speaking, the SDCA instructions 16 generate decisions for controlling various operations, behaviors, and maneuvers of the autonomous vehicle.

In embodiments where the processor(s) 12 include more than a single processor, each processor may be a different programmable microprocessor that executes software instructions stored in the memory 14. Alternatively, each of the processor(s) 12 may be a different set of such microprocessors, or a set that includes one or more microprocessors and one or more other processor types (e.g., ASICs, FPGAs, etc.) for certain functions.

The memory 14 may include one or more physical memory devices with non-volatile memory. Any suitable memory type or types may be used, such as ROM, solid-state drives (SSDs), hard disk drives (HDDs), and so on. The processor(s) 12 are coupled to the memory 14 via a bus or other network 18. The network 18 may be a single wired network, or may include any suitable number of wired and/or wireless networks. For example, the network 18 may be or include a controller area network (CAN) bus, a Local Interconnect Network (LIN) bus, and so on.

Also coupled to the network 18 are a vehicle control interface 20, a passenger interface 22, a sensor interface 24, and a network interface 26. Each of the interfaces 20, 22, 24 and 26 may include one or more processors (e.g., ASICs, FPGAs, microprocessors, etc.) and/or other hardware, firmware and/or software to enable communication with systems, subsystems, devices, etc., that are external to the computing system 10.

The vehicle control interface 20 is generally configured to provide control data generated by the processor(s) 12 executing the SDCA instructions 16 to the appropriate operational subsystems of the autonomous vehicle, such that the appropriate subsystems can effectuate driving decisions made by the processor(s) 12. For example, the vehicle control interface 20 may provide control signals to the appropriate driving-related subsystem(s) that include mechanical components, e.g., accelerator, brakes, steering mechanism, lights, etc. As another example, the vehicle control interface 20 may output or signals to appropriate subsystem(s) that plan the motion of the vehicle (e.g., a motion planner), and/or that control the execution of driving maneuvers (e.g., a maneuver executor). In some embodiments, the vehicle control interface 20 includes separate interface hardware, firmware and/or software for different operational subsystems.

The passenger interface 22 is generally configured to provide alerts, warnings, notifications, and/or other information to one or more passengers of the autonomous vehicle. In some embodiments where the vehicle is not fully autonomous (e.g., allowing human driving in certain modes and/or situations), the interface 22 may specifically provide such information to the driver (e.g., via dashboard indicators, etc.). As just one example, the passenger interface 22 may cause a display and/or speaker in the vehicle to generate an alert when the processor(s) 12 (executing the SDCA instructions 16) determine that a collision with another object is likely. As another example, the passenger interface 22 may cause a display in the vehicle to show an estimated time of arrival (ETA) to passengers. In some embodiments, the passenger interface 22 also permits certain user inputs. If the vehicle supports passenger selection of specific driving styles, for example, the passenger interface 22 may cause a display to present a virtual control (e.g., button) that a passenger may activate (e.g., touch, scroll through, etc.) to select a particular driving style.

The sensor interface 24 is generally configured to convert raw sensor data obtained by one or more sensor devices (e.g., lidar, camera, microphones, thermal imaging units, IMUs, etc.) to a format that is consistent with a protocol of the network 18 and that is recognized by one or more of the processor(s) 12. The sensor interface 24 may be coupled to an on-board lidar system and/or other type of active sensing system, for example, with the sensor interface 24 converting point cloud data generated by such system(s) into an appropriate format. In some embodiments, the sensor interface 24 includes separate interface hardware, firmware and/or software for each sensor device and/or each sensor type.

The network interface 26 is generally configured to convert data received from one or more devices or systems external to the autonomous vehicle to a format that is consistent with a protocol of the network 18 and is recognized by one or more of the processor(s) 12. In some embodiments, the network interface 26 includes separate interface hardware, firmware and/or software for different external sources. For example, a remote mapping/navigation server may send mapping and navigation/route data (e.g., mapping and navigation signals) to the computing system 10 via a first type of wireless network interface included the network interface 26, e.g., a cellular network interface, while one or more peer vehicles (e.g., other autonomous vehicles) may send data (e.g., current positions of the other vehicles) to the computing system 10 via a different type of wireless network interface included in the network interface 26, e.g., a WiFi network interface. Other types of external data may also, or instead, be received via the network interface 26. For example, the computing system 10 may use the network interface 26 to receive data representing rules or regulations (e.g., speed limits), object positions (e.g., road rails, overhanging signage, etc.), and/or other information from various infrastructure devices or systems.

In some embodiments, no sensor data (or only limited sensor data) of the autonomous vehicle is received via the sensor interface 24. Instead, the processor(s) 12 execute the SDCA instructions 16 using, as input, only (or primarily) data that is received by the network interface 26 from other vehicles, infrastructure, and/or other external devices/systems. In such an embodiment, the external data may include raw sensor data that is indicative of the vehicle environment (but was generated off-board the vehicle), and/or may include higher-level information that was generated externally using raw sensor data (e.g., occupancy grids).

Although not illustrated in FIG. 1A, the network 18 may also couple to other types of interfaces and/or components. Additionally, in some embodiments, one or more of the interfaces shown in FIG. 1A may be omitted (e.g., the sensor interface 14, as discussed above). Moreover, it is understood that the computing system 10 represents just one possible configuration for supporting the software architectures, functions, features, etc., described herein, and that others are also within the scope of this disclosure.

Figure 1B:
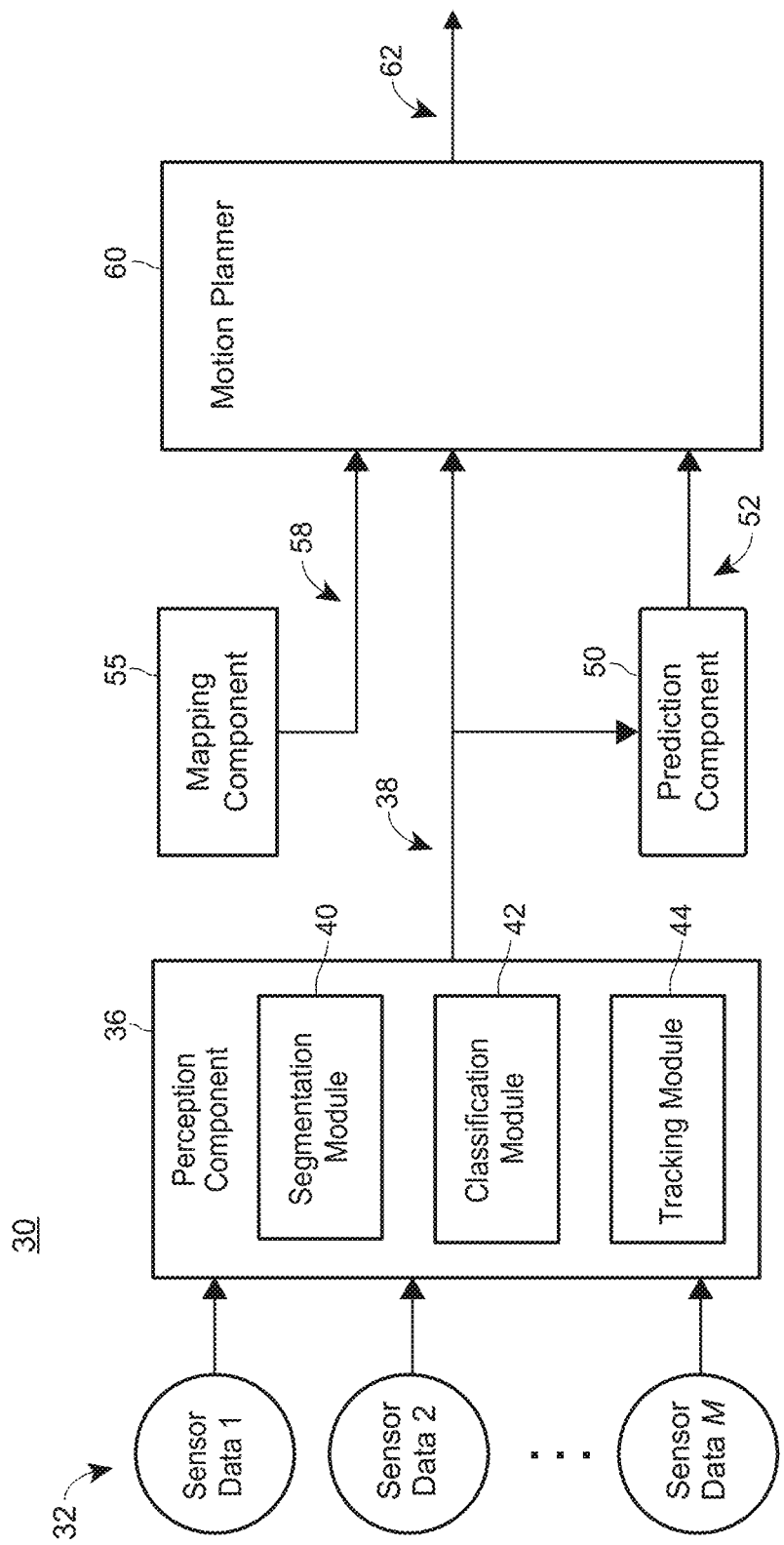
FIG. 1B is a block diagram of an example self-driving control architecture that may be used in the autonomous vehicle control system of FIG. 1A.

FIG. 1B illustrates an example SDCA or self-driving control architecture 30 of an autonomous vehicle. The SDCA 30 may be implemented by the SDCA instructions 16 of FIG. 1A, in an embodiment. The SDCA 30 receives as input M sets of sensor data 32 generated by M different sensors, with M being any suitable integer equal to or greater than one. The sensor data 32 may be received via the sensor interface 24 of FIG. 1A, in an embodiment. As just one example, "sensor data 1" may include frames of point cloud data generated by a first lidar device, "sensor data 2" may include frames of point cloud data generated by a second lidar device, "sensor data 3" (not shown in FIG. 1B) may include frames of digital images generated by an RGB (red, green, and blue) camera, and so on. As discussed above with respect to FIG. 1A, the sensors may include one or more lidar devices, cameras, radar devices, thermal imaging units, IMUs, and/or other sensor types. Generally speaking, the SDCA 30 is configured to process point cloud data and, in some embodiments, is also configured to process two-dimensional image data, such as RGB data.

The sensor data 32 is input to a perception component 36 of the SDCA 30, and is processed by the perception component 36 to generate perception signals 38 descriptive of a current state of the environment in which the autonomous vehicle is located. It is understood that the term "current" may actually refer to a very short time prior to the generation of any given perception signals 38, e.g., due to the short processing delay introduced by the perception component 36 and other factors. To generate the perception signals, the perception component may include a segmentation module 40, a classification module 42, and a tracking module 44.

The segmentation module 40 is generally configured to identify distinct objects within the sensor data representing the sensed environment. Depending on the embodiment and/or scenario, the segmentation task may be performed separately for each of a number of different types of sensor data, or may be performed jointly on a fusion of multiple types of sensor data. In some embodiments where lidar devices are used, the segmentation module 40 analyzes frames that include point cloud datasets therein to identify subsets of points within each frame that correspond to probable physical objects located in the environment. In other embodiments, the segmentation module 40 jointly analyzes lidar point cloud data frames in conjunction with RGB camera image frames to identify objects that are located in the environment. Other suitable techniques, and/or data from other suitable sensor types, may also be used to identify objects. It is noted that, as used herein, references to different or distinct "objects" may encompass physical things that are entirely disconnected (e.g., with two vehicles being two different "objects," and the road on which the vehicles are traveling as yet a different "object"), as well as physical things that are connected or partially connected (e.g., with a vehicle being a first "object" and the vehicle's hitched trailer being a second "object"). The segmentation module 40 may use predetermined rules or algorithms to identify objects. For example, the segmentation module 40 may utilize one or more neural networks that have been trained to identify distinct objects within the environment (e.g., using supervised learning with generated labels for different objects within test data point clouds, etc.), or may utilize one or more other types of machine-learning based models that have been trained, by using test or training data, to discern, distinguish, and/or identify probably distinct objects within a source image.

The classification module 42 is generally configured to determine classes (labels, categories, etc.) for different objects that have been identified or distinguished by the segmentation module 40. Like the segmentation module 40, the classification module 42 may perform classification separately for different sets of the sensor data 32, or may classify objects based on data from multiple sensors, etc. Moreover, and also similar to the segmentation module 40, the classification module 42 may utilize one or more neural networks or other machine-learning based models to classify objects, where the neural networks and/or machine-learning models have been trained, by using a set of test or training data, to perform object classification.

The tracking module 44 is generally configured to track distinct objects over time (e.g., across multiple lidar point cloud or RGB camera image frames). The tracked objects are generally objects that have been identified by the segmentation module 40, but may or may not be objects that were classified by the classification module 42, depending on the embodiment and/or scenario. The segmentation module 40 may assign identifiers to identified objects, and the tracking module 44 may associate existing identifiers with specific objects where appropriate (e.g., for lidar data, by associating the same identifier with different clusters of points, at different locations, in successive point cloud frames). Like the segmentation module 40 and the classification module 42, the tracking module 44 may perform separate object tracking based on different sets of the sensor data 32, or may track objects based on data from multiple sensors. Moreover, and also similar to the segmentation module 40 and the classification module 42, the tracking module 44 may utilize one or more neural networks or other machine-learning models to track objects, where the neural networks and/or machine-learning models have been trained, by using a set of test or training data, to perform object tracking across frames and/or images.

The SDCA 30 also includes a prediction component 50, which processes the perception signals 38 to generate prediction signals 52 descriptive of one or more predicted future states of the autonomous vehicle's environment. For a given object, for example, the prediction component 50 may analyze the type/class of the object (as determined by the classification module 42) along with the recent tracked movement of the object (as determined by the tracking module 44) to predict one or more future positions of the object. As a relatively simple example, the prediction component 50 may assume that any moving objects will continue to travel on their current direction and with their current speed, possibly taking into account first- or higher-order derivatives to better track objects that have continuously changing directions, objects that are accelerating, and so on. In some embodiments, the prediction component 50 also predicts movement of objects based on more complex behaviors. For example, the prediction component 50 may assume that an object that has been classified as another vehicle will follow rules of the road (e.g., stop when approaching a red light), and will react in a certain way to other dynamic objects (e.g., attempt to maintain some safe distance from other vehicles). The prediction component 50 may inherently account for such behaviors by utilizing a neural network or other machine learning model, for example. The prediction component 50 may be omitted from the SDCA 30, in some embodiments.

In some embodiments, the perception signals 38 include data representing "occupancy grids" (e.g., one grid per T milliseconds), with each occupancy grid indicating object positions (and possibly object boundaries, orientations, etc.) within an overhead view of the autonomous vehicle's environment. Within the occupancy grid, each "cell" (e.g., pixel) may be associated with a particular class as determined by the classification module 44, possibly with an "unknown" class for certain pixels that were not successfully classified. Similarly, the prediction signals 52 may include, for each such grid generated by the perception component 36, one or more "future occupancy grids" that indicate predicted object positions, boundaries and/or orientations at one or more future times (e.g., 1, 2 and 5 seconds ahead).

A mapping component 55 obtains map data (e.g., a digital map including the area currently being traversed by the autonomous vehicle) and/or navigation data (e.g., data indicating a route for the autonomous vehicle to reach the destination, such as turn-by-turn instructions), and outputs the data (possibly in a converted format) as mapping and navigation signals 58. In some embodiments, the mapping and navigation signals 58 include other map- or location-related information, such as speed limits, traffic indicators, and so on. The signals 58 may be obtained from a remote server (e.g., via a cellular or other communication network of the autonomous vehicle, or of a smartphone coupled to the autonomous vehicle, etc.), and/or may be locally stored in a persistent memory of the autonomous vehicle.

A motion planner 60 processes the perception signals 38, the prediction signals 52, and the mapping and navigation signals 58 to generate decisions 62 regarding the next movements of the autonomous vehicle. Depending on the type of the motion planner 60, the decisions 62 may include operational parameters (e.g., braking, speed and steering parameters) and/or particular maneuvers (e.g., turn left, move to right lane, move onto shoulder of road, etc.). The decisions 62 may be provided to one or more operational subsystems of the autonomous vehicle (e.g., if the decisions 62 indicate specific operational parameters for subsystems that include mechanical components, such as steering mechanisms, accelerator, brakes, lights, etc.), or may be provided to one or more intermediate stages that convert the decisions 62 into operational parameters (e.g., if the decisions indicate specific maneuvers to be performed by a maneuver executor).

The motion planner 60 may utilize any suitable type(s) of rules, algorithms, heuristic models, machine learning models, or other suitable techniques to make driving decisions based on the perception signals 38, prediction signals 52, and mapping and navigation signals 58. For example, the motion planner 60 may be a "learning based" planner (e.g., a planner that is trained using supervised learning or reinforcement learning), a "search based" planner (e.g., a continuous A*planner), a "sampling based" planner (e.g., a planner that performs random searches in a space that represents a universe of possible decisions), a "predictive control based" planner (e.g., a model predictive control (MPC) planner), and so on. In some embodiments, the motion planner 60 includes multiple, different motion planner types in order to provide a more diverse set of mechanisms for generating driving decisions, and thereby improve safety and/or other performance aspects of the autonomous vehicle.

Example Active Sensing System

Figure 2:
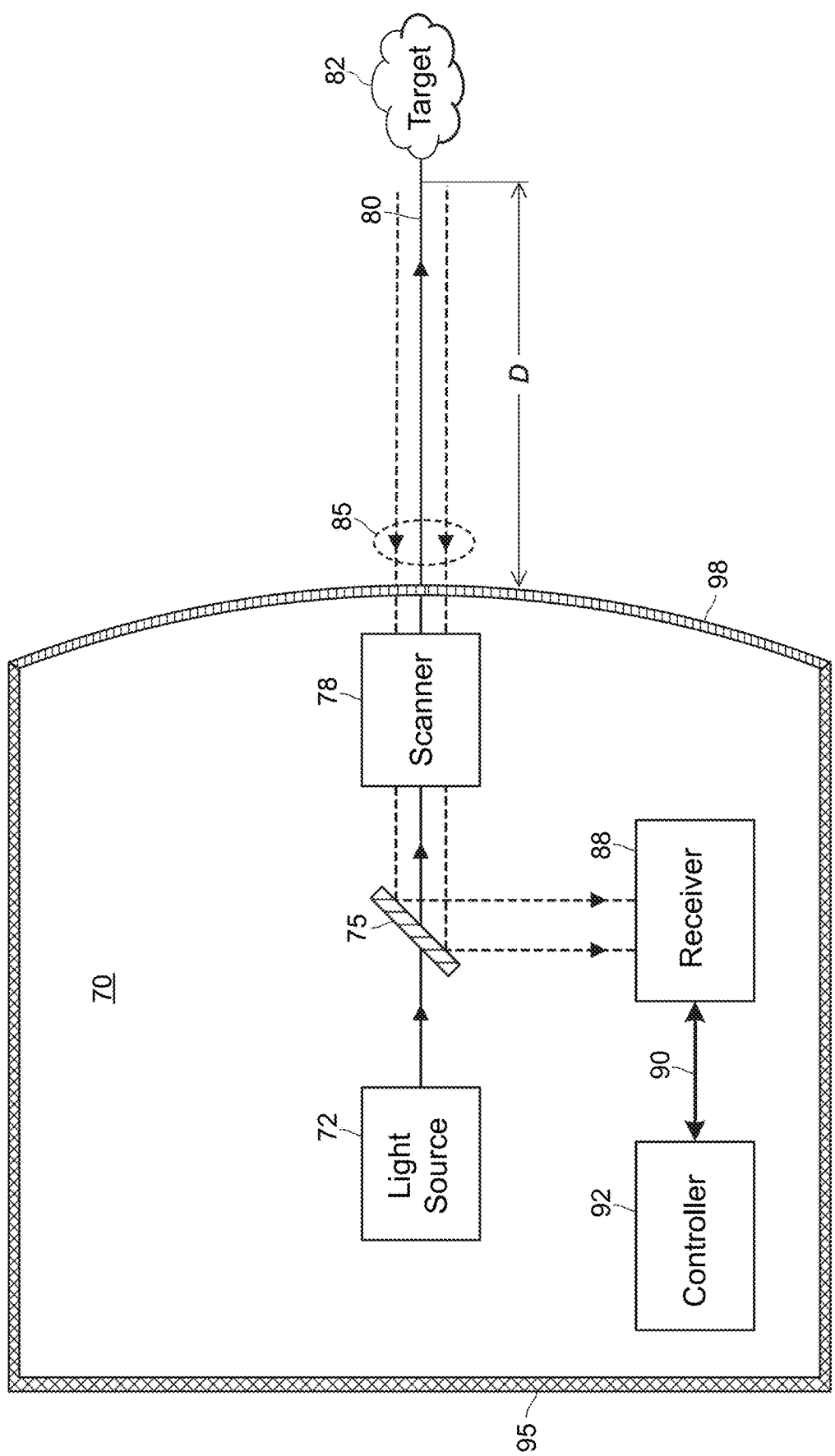
FIG. 2 is a block diagram of an example light detection and ranging (lidar) system that may be used to provide sensor data to the self-driving control architecture(s) of FIGS. 1A and 1B, and/or may be used to generate source images from which training data for autonomous vehicle control models may be mined.

FIG. 2 depicts an example of an active sensing system that may be used to provide at least a portion of the sensor data, such as sensor data 32 of FIG. 1B, and/or sensor data that is received via the sensor interface 24 of FIG. 1A. In particular, the example active sensing system depicted in FIG. 2 is an example lidar system 70. It is noted that while various lidar system components and characteristics are described herein, it is understood that any suitable lidar device(s) or system(s), and/or any other suitable types of sensors, may provide sensor data for processing using the software architectures described herein.

The example lidar system 70 may include a light source 72, a mirror 75, a scanner 78, a receiver 88, and a controller 92. The light source 72 may be, for example, a laser (e.g., a laser diode) that emits light having a particular operating wavelength in the infrared, visible, or ultraviolet portions of the electromagnetic spectrum. In operation, the light source 72 emits an output beam of light 80 which may be continuous-wave, pulsed, or modulated in any suitable manner for a given application. The output beam of light 80 is directed downrange toward a remote target 82 located a distance D from the lidar system 70 and at least partially contained within a field of regard of the system 70.

Once the output beam 80 reaches the downrange target 82, the target 82 may scatter or, in some cases, reflect at least a portion of light from the output beam 80, and some of the scattered or reflected light may return toward the lidar system 70. In the example of FIG. 2, the scattered or reflected light is represented by input beam 85, which passes through the scanner 78, which may be referred to as a beam scanner, optical scanner, or laser scanner. The input beam 85 passes through the scanner 78 to the mirror 75, which may be referred to as an overlap mirror, superposition mirror, or beam-combiner mirror. The mirror 75 in turn directs the input beam 85 to the receiver 88.

The input beam 85 may include light from the output beam 80 that is scattered by the target 82, light from the output beam 80 that is reflected by the target 82, or a combination of scattered and reflected light from target 82. According to some implementations, the lidar system 70 can include an "eye-safe" laser that present little or no possibility of causing damage to a person's eyes. The input beam 85 may contain only a relatively small fraction of the light from the output beam 80.

The receiver 88 may receive or detect photons from the input beam 85 and generate one or more representative signals. For example, the receiver 88 may generate an output electrical signal 90 that is representative of the input beam 85. The receiver may send the electrical signal 90 to the controller 92. Depending on the implementation, the controller 92 may include one or more instruction-executing processors, an application-specific integrated circuit (ASIC), a field-programmable gate array (FPGA), and/or other suitable circuitry configured to analyze one or more characteristics of the electrical signal 90 in order to determine one or more characteristics of the target 82, such as its distance downrange from the lidar system 70. More particularly, the controller 92 may analyze the time of flight or phase modulation for the beam of light 80 transmitted by the light source 72. If the lidar system 70 measures a time of flight of T (e.g., T representing a round-trip time of flight for an emitted pulse of light to travel from the lidar system 70 to the target 82 and back to the lidar system 70), then the distance D from the target 82 to the lidar system 70 may be expressed as D=c*T/2, where c is the speed of light (approximately $3.0 \times 10^8$ m/s).

The distance D from the lidar system 70 is less than or equal to a maximum range $R_{MAX}$ of the lidar system 70. The maximum range $R_{MAX}$ (which also may be referred to as a maximum distance) of a lidar system 70 may correspond to the maximum distance over which the lidar system 70 is configured to sense or identify targets that appear in a field of regard of the lidar system 70. The maximum range of lidar system 70 may be any suitable distance, such as 50 m, 200 m, 500 m, or 1 km, for example.

In some implementations, the light source 72, the scanner 78, and the receiver 88 may be packaged together within a single housing 95, which may be a box, case, or enclosure that holds or contains all or part of the lidar system 70. The housing 95 includes a window 98 through which the beams 80 and 85 pass. The controller 92 may reside within the same housing 95 as the components 72, 78, and 80, or the controller 92 may reside outside of the housing 95. In one embodiment, for example, the controller 92 may instead reside within, or partially within, the perception component 36 of the SDCA 30 shown in FIG. 1A. In some implementations, the housing 95 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, for example, depending on the implementation.

With continued reference to FIG. 2, the output beam 80 and input beam 85 may be substantially coaxial. In other words, the output beam 80 and input beam 85 may at least partially overlap or share a common propagation axis, so that the input beam 85 and the output beam 80 travel along substantially the same optical path (albeit in opposite directions). As the lidar system 70 scans the output beam 80 across a field of regard, the input beam 85 may follow along with the output beam 80, so that the coaxial relationship between the two beams is maintained.

Generally speaking, the scanner 78 steers the output beam 80 in one or more directions downrange. To accomplish this, the scanner 78 may include one or more scanning mirrors and one or more actuators driving the mirrors to rotate, tilt, pivot, or move the mirrors in an angular manner about one or more axes, for example. While FIG. 2 depicts only a single mirror 75, the lidar system 70 may include any suitable number of flat or curved mirrors (e.g., concave, convex, or parabolic mirrors) to steer or focus the output beam 80 or the input beam 85. For example, the first mirror of the scanner may scan the output beam 80 along a first direction, and the second mirror may scan the output beam 80 along a second direction that is substantially orthogonal to the first direction.

A "field of regard" of the lidar system 70 may refer to an area, region, or angular range over which the lidar system 70 may be configured to scan or capture distance information. When the lidar system 70 scans the output beam 80 within a 30-degree scanning range, for example, the lidar system 70 may be referred to as having a 30-degree angular field of regard. The scanner 78 may be configured to scan the output beam 80 horizontally and vertically, and the field of regard of the lidar system 70 may have a particular angular width along the horizontal direction and another particular angular width along the vertical direction. For example, the lidar system 70 may have a horizontal field of regard of 10° to 120° and a vertical field of regard of 2° to 45°.

The one or more scanning mirrors of the scanner 78 may be communicatively coupled to the controller 92, which may control the scanning mirror(s) so as to guide the output beam 80 in a desired direction downrange or along a desired scan pattern. In general, a scan (or scan line) pattern may refer to a pattern or path along which the output beam 80 is directed. The lidar system 70 can use the scan pattern to generate a point cloud with points or "pixels" that substantially cover the field of regard. The pixels may be approximately evenly distributed across the field of regard, or distributed according to a particular non-uniform distribution.

In operation, the light source 72 may emit pulses of light which the scanner 78 scans across a field of regard of the lidar system 70. The target 82 may scatter one or more of the emitted pulses, and the receiver 88 may detect at least a portion of the pulses of light scattered by the target 82. The receiver 88 may receive or detect at least a portion of the input beam 85 and produce an electrical signal that corresponds to the input beam 85. The controller 92 may be electrically coupled or otherwise communicatively coupled to one or more of the light source 72, the scanner 78, and the receiver 88. The controller 92 may provide instructions, a control signal, or a trigger signal to the light source 72 indicating when the light source 72 should produce optical pulses, and possibly characteristics (e.g., duration, period, peak power, wavelength, etc.) of the pulses. The controller 92 may also determine a time-of-flight value for an optical pulse based on timing information associated with when the pulse was emitted by light source 72 and when a portion of the pulse (e.g., the input beam 85) was detected or received by the receiver 88.

As indicated above, the lidar system 70 may be used to determine the distance to one or more downrange targets 82. By scanning the lidar system 70 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a point cloud frame) may be rendered as an image or may be analyzed to identify or detect objects or to determine a shape or distance of objects within the field of regard. For example, a depth map may cover a field of regard that extends 60° horizontally and 15° vertically, and the depth map may include a frame of 100-2000 pixels in the horizontal direction by 4-400 pixels in the vertical direction.

The lidar system 70 may be configured to repeatedly capture or generate point clouds of a field of regard at any suitable frame rate between approximately 0.1 frames per second (FPS) and approximately 1,000 FPS, for example. The point cloud frame rate may be substantially fixed or dynamically adjustable, depending on the implementation. In general, the lidar system 70 can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 70 can overlap, encompass, or enclose at least a portion of the target 82, which may include all or part of an object that is moving or stationary relative to lidar system 70. For example, the target 82 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

As discussed above, 3-D point cloud images generated by the lidar system 70 may be utilized by the SDCA 16 and/or the SDCA 30 to make decisions and generate/transmit corresponding signals to appropriate vehicle subsystems to thereby operate and/or control various real-time behaviors of the autonomous vehicle. In some embodiments, point clouds generated by the lidar system 70 may be processed to obtain or mine training data therefrom for training control models utilized by (or that are to be utilized by) the autonomous vehicle and/or by other autonomous vehicles for real-time control and operations. For example, point clouds that are obtained continuously over time by the lidar system 70 may be saved as a 3-D video whose frames are processed to mine training data therefrom.

Example Vehicle with On-Board Lidar System

Figure 3:
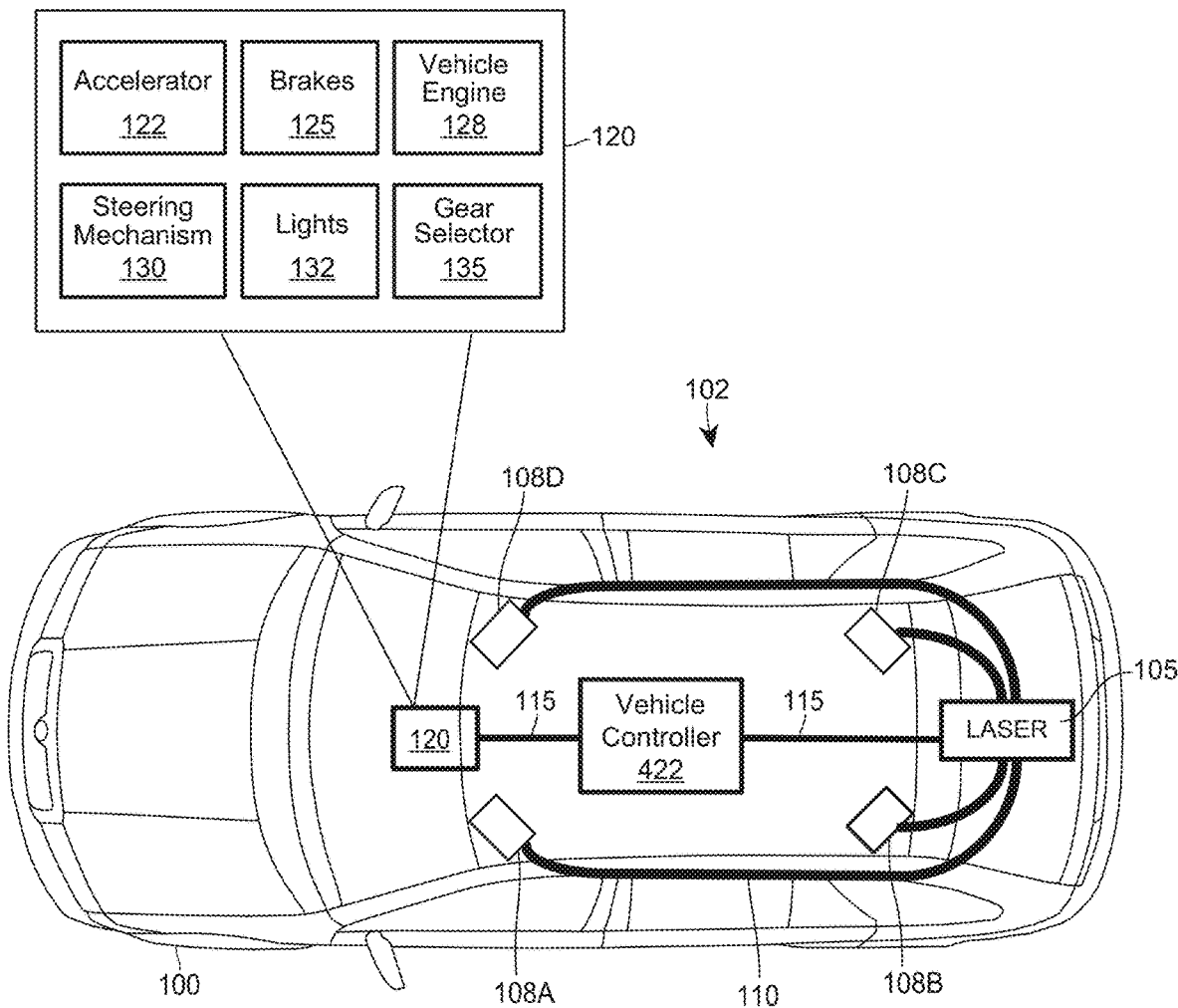
FIG. 3 illustrates an example vehicle in which the lidar system of FIG. 2 may operate.

FIG. 3 illustrates an example vehicle 100 with a lidar system 102. The lidar system 102 includes a laser 105 with multiple sensor heads 108A-D coupled to the laser 105 via multiple laser-sensor links 110. Each of the sensor heads 108 may include some or all of the components of the lidar system 70 illustrated in FIG. 2, or may include components of other types of lidar systems.

Each of the laser-sensor links 110 may include one or more optical links and/or one or more electrical links. The sensor heads 108 in FIG. 3 are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 108 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 3, four sensor heads 108 are positioned at or near the four corners of the vehicle (e.g., each of the sensor heads 108 may be incorporated into a light assembly, side panel, bumper, or fender), and the laser 105 may be located within the vehicle 100 (e.g., in or near the trunk). The four sensor heads 108 may each provide a 90° to 120° horizontal field of regard (FOR), and the four sensor heads 108 may be oriented so that together they provide a complete 360-degree view around the vehicle. As another example, the lidar system 102 may include six sensor heads 108 positioned on or around the vehicle 100, where each of the sensor heads 108 provides a 60° to 90° horizontal FOR. As yet another example, the lidar system 102 may include eight sensor heads 108, and each of the sensor heads 108 may provide a 45° to 60° horizontal FOR. As yet another example, the lidar system 102 may include six sensor heads 108, where each of the sensor heads 108 provides a 70° horizontal FOR with an overlap between adjacent FORs of approximately 10°. As another example, the lidar system 102 may include two sensor heads 108 which together provide a forward-facing horizontal FOR of greater than or equal to 30°.

Data from each of the sensor heads 108 may be combined or stitched together to generate a point cloud that covers a greater than or equal to 30-degree horizontal view around a vehicle. For example, the laser 105 may include a controller or processor that receives data from each of the sensor heads 108 (e.g., via a corresponding electrical link 115) and processes the received data to construct a point cloud covering a 360-degree horizontal view around a vehicle or to determine distances to one or more targets. The point cloud or information from the point cloud may be provided to a vehicle controller 118 via a corresponding electrical, optical, or radio link 115. The vehicle controller 118 may include one or more CPUs, GPUs, and a non-transitory memory with persistent components (e.g., flash memory, an optical disk) and/or non-persistent components (e.g., RAM). In an embodiment, the vehicle controller 118 is implemented by the SDCA instructions 16 of FIG. 1A.

In some implementations, the point cloud is generated by combining data from each of the multiple sensor heads 108 at a controller included within the laser 105, and is provided to the vehicle controller 118. In other implementations, each of the sensor heads 108 includes a controller or processor that constructs a point cloud for a portion of the 360-degree horizontal view around the vehicle and provides the respective point cloud to the vehicle controller 118. The vehicle controller 118 then combines or stitches together the point clouds from the respective sensor heads 108 to construct a combined point cloud covering a 360-degree horizontal view. Still further, the vehicle controller 118 in some implementations communicates with a remote server to process point cloud data.

In any event, the vehicle 100 may be an autonomous vehicle where the vehicle controller 118 provides control signals to various components 120 within the vehicle 100 to maneuver and otherwise control operation of the vehicle 100. The components 120 are depicted in an expanded view in FIG. 3 for ease of illustration only. The components 120 may include an accelerator 122, brakes 125, a vehicle engine 128, a steering mechanism 130, lights 132 such as brake lights, head lights, reverse lights, emergency lights, etc., a gear selector 135, and/or other suitable components that effectuate and control movement of the vehicle 100. The gear selector 135 may include the park, reverse, neutral, drive gears, etc. Each of the components 120 may include an interface via which the component receives commands from the vehicle controller 118 such as "increase speed," "decrease speed," "turn left 5 degrees," "activate left turn signal," etc. and, in some cases, provides feedback to the vehicle controller 118.

In some implementations, the vehicle controller 118 receives point cloud data from the sensor heads 108 via the link 115 and analyzes the received point cloud data, using any one or more of the aggregate or individual SDCAs disclosed herein, to sense or identify targets 82 (see FIG. 2) and their respective locations, distances, speeds, shapes, sizes, type of target (e.g., vehicle, human, tree, animal), etc. The vehicle controller 118 then provides control signals via the link 115 to the components 120 to control operation of the vehicle based on the analyzed information. One, some or all of the components 120 may be the operational subsystems, or may be included within the operational subsystems, that receive the control signals generated by the SDCA 16 of FIG. 1A, or receive the decisions 62 of FIG. 1B, for example.

In addition to the lidar system 102, the vehicle 100 may also be equipped with other sensors such a camera, a thermal imager, a conventional radar (none illustrated to avoid clutter), etc. The sensors can provide additional data to the vehicle controller 118 via wired or wireless communication links. Further, the vehicle 100 in an example implementation includes a microphone array operating as a part of an acoustic source localization system configured to determine sources of sounds.

In some implementations, the point cloud generated from the sensor data obtained from the sensors 108 is a source image from which training data is discovered and/or mined to use in training control models that are utilized by (or that are to be utilized by) autonomous vehicles for real-time control and operations. In these implementations, the vehicle 100 may or may not be autonomously operated. As such, the combining or stitching together of the data generated by the multiple sensor heads 108 to thereby generate the point cloud image may be performed by the vehicle controller 118 on-board the vehicle 100, by another controller that is on-board the vehicle 100, and/or by an off-board computing device or system to which a communication system on-board the vehicle 100 is communicatively connected, e.g., via one or more wireless links (not shown).

Figure 4:
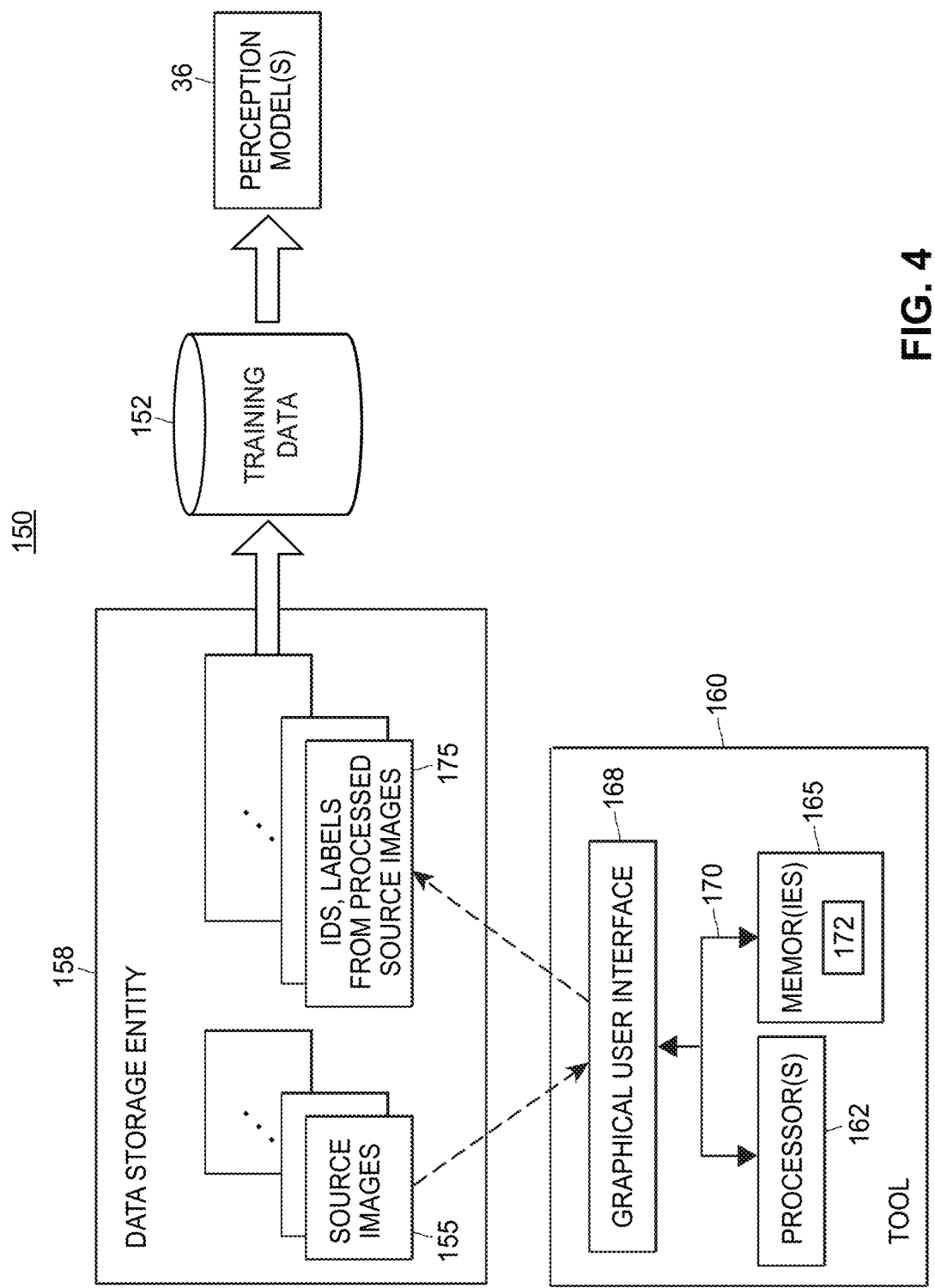
FIG. 4 illustrates an example data flow diagram illustrating the generation of training data for training machine-learning based models that are used to autonomously operate and/or control vehicles.

Example Data Flow Diagram of the Generation of Training Data for Autonomous Vehicle Control Models Now turning to FIG. 4, FIG. 4 illustrates an example data flow diagram 150 illustrating the mining, discovery, and/or generation of training data 152 that is used to train one or more machine-learning based models that control and/or operate autonomous vehicles according to the techniques disclosed herein. For example, as shown in FIG. 4, and with simultaneous reference to FIG. 1B, at least some of the training data 152 may be utilized to train the perception component or model 36 of the SDCA 30, and/or portions thereof, such as the segmentation module 40, classification module 42, and/or the tracking module 44.

As depicted in FIG. 4, source images 155 that are to be processed to generate training data 152 for the perception model 36 are stored in a data storage entity 158, such as a database, databank, data cloud, or any suitable data storage implementation. The source images 155 may include 2-D images of environments in which vehicles operate (e.g., that have been generated by one or more passive imaging devices or systems) and/or may include 3-D images of environments in which vehicles operate (e.g., that have been generated by one or more active imaging devices or systems, such as the lidar system 70 of FIG. 3). For example, the source images 155 may include RGB camera images, thermal images, lidar data images, other types of point cloud data images, and/or other types of 2-D and/or 3-D images that have been captured by passive and/or active imaging devices or systems. In an embodiment, the source images 155 include only 3-D images. In another embodiment, the source images 155 include both 3-D and 2-D images of a particular environment, where the 2-D images and the 3-D images were captured or obtained at the same time or at a similar time. In some embodiments, the source images 155 include multiple frames of a 2-D video and/or of a 3-D video of a vehicle's environment.

The source images 155 are processed by using a tool or system 160 that utilizes at least a portion of the systems, methods, and/or techniques disclosed herein for identifying and labeling objects to thereby generate training data 152 used to train one or more machine-learning models that are, in turn, used by the perception model(s) 36 to autonomously control and/or or operate vehicles. The tool 160 may be implemented as one or more computing devices, including one or more processors 162, one or more tangible, non-transitory memories 165, and one or more user interfaces 168 (e.g., one or more specific, particularly structured graphical user interfaces 168) that are communicatively coupled via one or more communication buses or networks 170 (which may be, for example, any combination of one or more wired and/or wireless networks). At least some of the graphical user interface(s) 168 may be remotely located from the tool 160, in an embodiment. The graphical user interface(s) 168 are specifically structured and paired with one or more prescribed functionalities 172 directly related to the graphical user interface(s) 168, where the functionalities 172 include identifying and/or labeling particular objects depicted within the source images 155 in a specific manner or way via the specific graphical user interface 168. Details of the specific graphical user interface(s) 168, the prescribed functionalities 172, and their interactions/relationships are provided in other sections of this disclosure.

At any rate, the specific graphical user interface(s) 168 and the prescribed functionality 172 may be implemented as one or more sets of computer executable instructions that are stored on the one or more memories 165 and that are executable by the one or more processors 162 to cause the tool 160 to perform the prescribed functionality 172 on the source frames 155 using the specific graphical user interface(s) 168. The output 175 of the prescribed functionality 172 comprises identified objects that are depicted within the source images 155 and that are respectively labeled for the purposes of training the perception model 36. The output 175 may be stored as processed image frames (e.g., each of which may include a respective source image 155 as well as the identifications and labels of particular objects depicted thereon). Additionally or alternatively, the output 175 may be stored as indications of the associations between respective identified object/label pairs, and/or may be stored using any other suitable format.

The output data 175 may be incorporated into or included in the training data set 152. For example, the one or more processors 162 of the tool 160 (and/or one or more other processors which are not shown in FIG. 4) may push and/or pull at least some of the stored output 175 and store it with the training data 152. Subsequently, the training data 152 including the output data 175 may be utilized to train the perception model 36, e.g., to train one or more models included in the perception model 36, using any desired training technique.

It is understood that the data flow diagram 150 and the components associated therewith as illustrated in FIG. 4 is only one of many possible embodiments. For example, the tool 160 may be implemented by a network of the multiple computing devices, and/or by a cloud computing system. In some embodiments, at least one of the graphical user interfaces 168 may be implemented at a computing device that is remote from at least some of the one or more processors 162 and/or at least some of the one or more memories 165, such as when the user interface 168 is implemented on a client device while the one or more processors 162 and the one or more memories 165 are implemented at one or more servers or back-end computing devices (for example, in a web service or other type of client/server application). In some embodiments, the one or more processors 162, the one or more memories 165, and/or the set of instructions 172 are implemented in a distributed manner. For example, a remote client device may include a first portion of the processors 162, the memories 165, and/or the instructions 172, and one or more servers or back-end computing devices communicatively connected to the remote client device may include a second portion of the processors 162, the memories 165, and/or the instructions 172. For ease of reading herein, the one or more processors 162, one or more memories 165, one or more graphical user interfaces 168, and one or more functionalities 172 are referred to herein using the singular tense; however it is understood that this is for ease of reading purposes only, and is not limiting.

In some embodiments, the tool 160 accesses the data storage entity 158 via one or more wired and/or wireless networks (not shown in FIG. 4). In a similar manner, the output data 175 may be provided for storage in the training data set 152 via one or more wired and/or wireless networks (not shown). Further, although the output 175 is shown in FIG. 4 as being stored in the data storage entity 155 along with the source frames 155, this is only one exemplary implementation, as the output 175 may be additionally or alternatively be stored as desired in one or more other separate and distinct data storage entities (not shown).

Example Graphical User Interfaces

FIGS. 5A-5K depict screen shots of example graphical user interfaces that are specifically structured and provided by the systems, methods, and techniques disclosed herein. For example, each of the example graphical user interfaces described herein may be provided by the system or tool 160 and/or may be paired with and/or operate in conjunction with at least some of the prescribed functionality 172 of FIG. 4. For ease of discussion, and not for limitation purposes, FIGS. 5A-5K are discussed with simultaneous reference to FIGS. 1-4, although other systems and methods may produce and/or operate in conjunction with each of the example graphical interfaces discussed below.

Figure 5A:
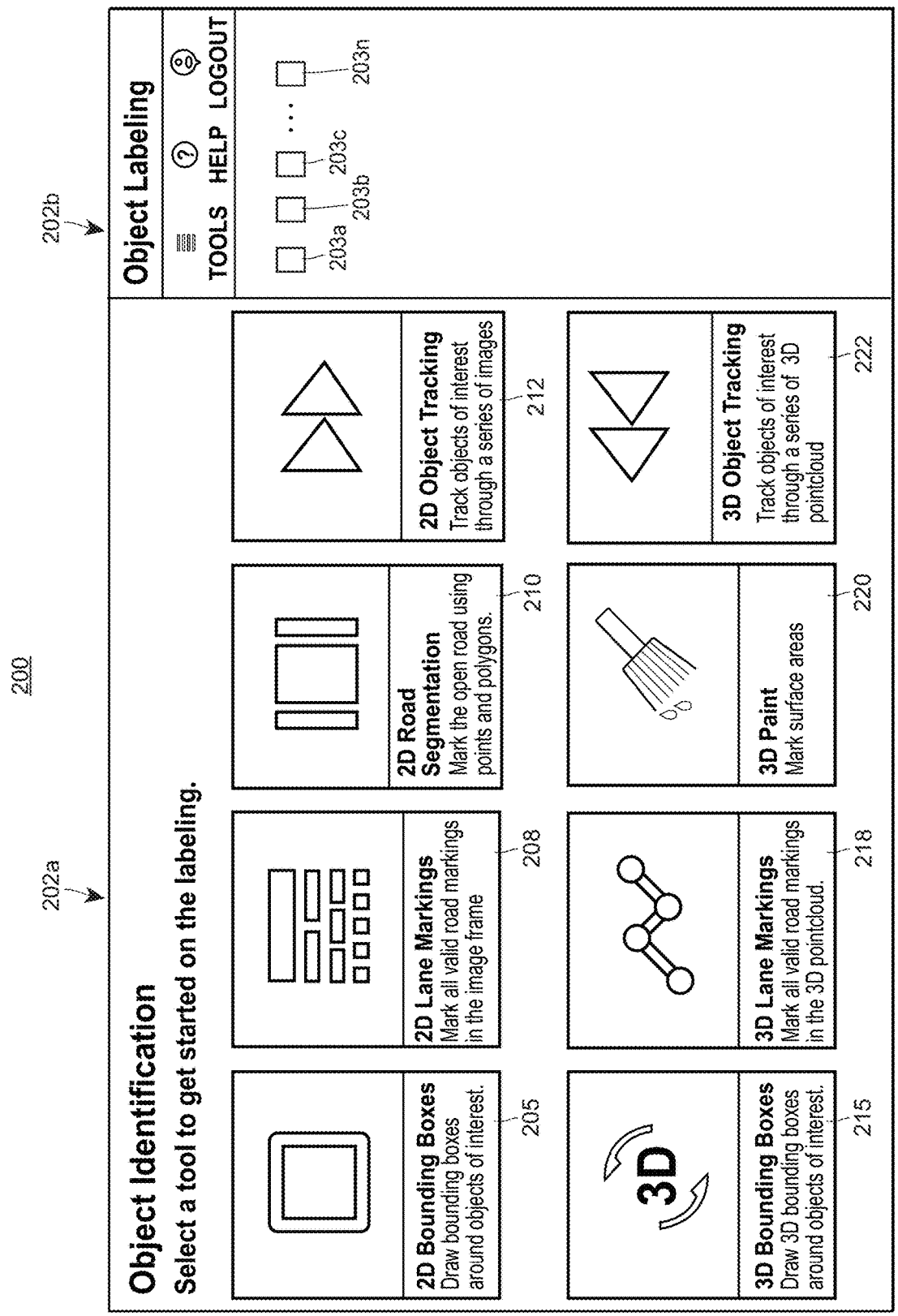

FIG. 5A depicts a screen shot of an example display 200 presented by the tool 160 via the graphical user interface 168, e.g., by executing at least some of the instructions 172. As depicted in FIG. 5A, the specifically structured display 200 serves as a home screen (or, splash screen and/or menu screen) of the tool 160. In particular, in a first portion 202a of the display 200, various object identification features 205-222 enable a user to discern, distinguish, and/or identify particular objects depicted in source images and/or to adjust or verify automatically-identified objects depicted in source images. On a second portion 202b of the display 200, one or more object labeling user controls 203a-203n are provided via which the user is able to obtain, select, create, and/or edit labels for depicted objects.

The object identification portion 202a of the display 200 includes a number of selectable user controls thereon that respectively correspond to a number of features via which the user may use to discern, distinguish, and/or identify objects within 2-D images, for example, 2-D Bounding Boxes 205, 2-D Lane Markings 208, 2-D Paint 210, 2-D Object Tracking 212, and/or other 2-D object identification features (not shown). Additionally or alternatively, the tool 160 may a number of selectable user controls displayed on the object identification portion 202a of the display 200 that respectively correspond to features via which the user may user to discern, distinguish, and/or identify objects within 3-D images, for example, 3-D Bounding Boxes 215, 3-D Lane Markings 218, 3-D Paint 220, 3-D Object Tracking 222, and/or other 3-D object identification features (not shown). Each of the identification feature icons/user controls 205-222 that is included on the display 200 is user-selectable, to thereby indicate the feature which the user desires to employ for identifying particular objects within images. It is noted that the use and/or activation of each of the features 205-222 is not mutually exclusive. For example, a user might may select 3-D Bounding Boxes user control 215 to identify objects included within a particular 3-D image, and while the particular 3-D image is being presented on the user interface 168 for bounding purposes, the user may invoke the 3-D Object Tracking feature 222 and/or the 3-D Lane Markings feature 218 therefrom. As such, the home screen 200 is only one of many embodiments via which the features 205-222 may be invoked.

Figure 5B:
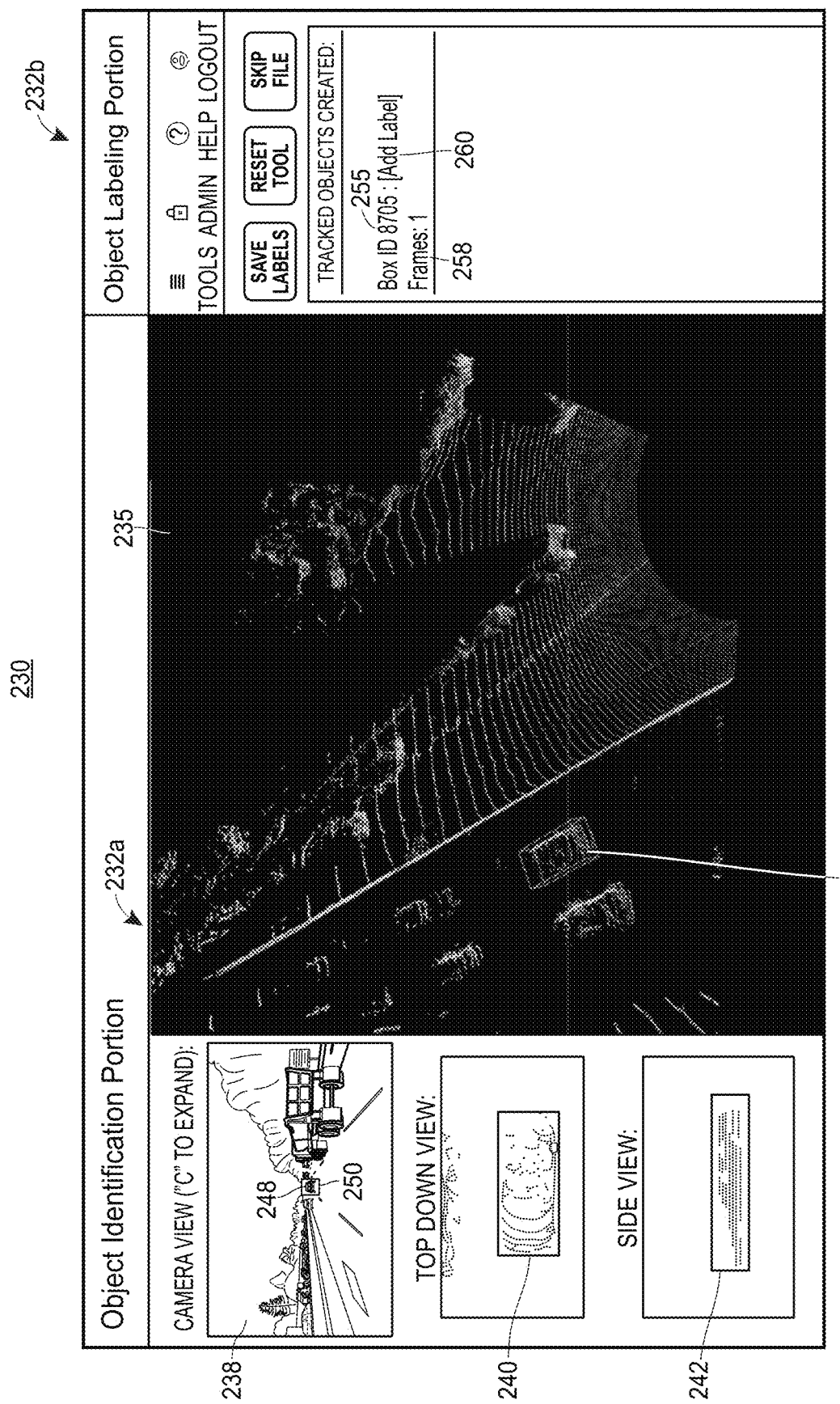

FIG. 5B illustrates a screen shot of an example display 230 depicting an example usage scenario of the 3-D Bounding Boxes feature 215 of the tool 160. The example display 230 may be presented by the tool 160 via the graphical user interface 168, e.g., by executing at least some of the instructions 172, for example, the display 230 may be presented at the user interface 168 in response to a user selecting the 3-D Bounding Boxes 215 user control included on the display 200 of FIG. 5A.

As illustrated in FIG. 5B, the display 230 includes a first portion 232a via which a user may discern, distinguish, and/or identify objects, and/or via which the user may verify or adjust automatic identifications of objects depicted within a 3-D image. The display 230 includes a second portion 232b via which the user may label objects and/or verify or adjust automatic labeling of the objects. The object identification portion 232a of the display 230 is itself divided into multiple parts or sections 235-242. In section 235, a 3-D source image of an environment in which vehicles operate is displayed so that it can be processed for object identification and labeling purposes. The 3-D image 235 depicted in FIG. 5B is a point cloud image or dataset that was generated using multiple lidar devices mounted on a vehicle (for example, as previously discussed with respect to FIG. 3), however any type of 3-D environment image, lidar or otherwise, may be presented in the section 235. In section 238 of the display 230, a corresponding 2-D image of the environment that was obtained at nearly the same time as the 3-D image of the environment is displayed in section 238, so that the 2-D image and the 3-D image are presented on the display 230 in a side-by-side manner. For example, the 2-D image 238 and the 3-D image 235 may have respective time-stamps that are identical or within a short time interval of each other (e.g., within a quarter of a second, within a half of a second, within one second, within two seconds, etc.). As depicted in FIG. 5B, the 2-D image 238 is an RGB image captured via an RGB camera mounted on a vehicle along with the lidar devices that captured the 3-D image 235, however any type of 2-D environment image, RGB or otherwise, may be presented in the section 238. Furthermore, it is noted that the display of the corresponding 2-D image 238 on the display 230 is an optional feature and may be omitted from some implementations of the display 230.

As shown in FIG. 5B, the 3-D image 235 is a 3-D point cloud data set or image included in a 3-D video which was obtained by several lidar devices onboard a vehicle, such as the lidar device 70 of FIG. 2 and/or the lidar devices 108a-108d of FIG. 3. Significantly, as the image 235 is a three-dimensional image, a user is able to be manipulate the presentation of the image 235 on the user interface 168 in three dimensions (e.g., by using one or more respective user controls, not shown in FIG. 5B). For example, the 3-D image 235 may be rotated, translated, and/or scaled along any combination of the x, y, and z axes of the field of view so that the 3-D image is able to be presented in section 235 from any desired viewing perspective.

As depicted in FIG. 5B, the 2-D image 238 is an RGB image included in a 2-D video which was obtained by an RGB camera mounted on the same vehicle as the lidar devices. In some embodiments, the user may translate and/or scale the 2-D image 238 in two-dimensions, e.g., along the x and y axes of the image, if desired.

The RGB camera and the lidar devices were operational on the vehicle at the same time, and therefore simultaneously captured respective videos of the environment of the vehicle as the vehicle traveled along a road. Accordingly, on the example display 230, the 3-D video 235 is presented in an essentially time-synchronized or congruent manner with the presentation of the 2-D video 238, e.g., in a side-by-side manner. That is, for any moment in time of the videos 235, 238 during which both the RGB camera and the lidar devices mounted on the vehicle were capturing respective images of the environment, the 3-D section 238 displays the environment as captured by the lidar devices at that moment in time, and the 2-D section 238 displays the environment as captured by the RGB camera at that moment in time. A user is able to pause, forward, and rewind the video 235, 238 synchronously between and/or across multiple frames, as desired. That is, due to the videos' synchronized or congruent presentations on the display 230, pausing, forwarding, rewinding, and/or playing one of the videos 235, 238 will cause the same action to take effect in the other video 235, 238 at the same rate. As such, frames of the 3-D video that are displayed in the section 235 are aligned, with respect to time of capture, with respective frames of the 2-D video that are displayed in the 2-D video 238, in an embodiment. Notably, the simultaneous, synchronous display of 3-D images/videos and 2-D images/videos on the display 230 is a specific, structured graphical user interface that provides a technological solution to help the user to better and more accurately discern or visually identify various objects within a vehicle environment. Point cloud and other types of 3-D images may be more abstract to the human eye then are RGB camera images, and thereby may be more difficult for user to visually (and accurately) discern and identify various distinct objects therein. The simultaneous, synchronous display of the 3-D images and the 2-D images on the screen 230 allows a user to verify that a cluster of points within the 3-D image is indeed the particular object that he or she wishes to bound, e.g., by viewing the presented, time-synchronized images 235, 238 in conjunction with each other.

Another useful feature illustrated by the example usage scenario of FIG. 5B is "one-click" bounding boxes. As previously discussed, with known or existing object identification techniques, a user must visually identify as subset of the data points included in a source image as representing a particular object of significance (e.g., another car, a pedestrian, a cyclist, etc.), and the user must manually draw a set of individual lines (or drag and drop a box template) to form a box that surrounds a subset of data points to thereby distinguish the subset of data points represent the particular object of significance from other data points of the source image. The size and configuration of the manually-generated box is based on the user's judgment as to where the boundaries of the image of the particular object are located within the image. As such, the placement of a bounding box is based upon a user's visual acuity as well as the user subjective judgment, and thus is subject to wide variations in accuracy. Further, the manual drawing and placement of bounding boxes requires multiple user actions to apply each bounding box which, when producing a sufficiently large training data set, can add up to hundreds or thousands of person-hours.

In contrast, the "one-click" bounding box feature provided by the tool 168 allows a user to single-click anywhere on a cluster of points included in a 3-D source image (or single-click anywhere on a visual depiction of some object included in a 2-D source image), to thereby select an intended object for bounding. The tool 168 then automatically determines the boundaries of the object indicated by the single click within the source image, and automatically presents, on the source image, a corresponding bounding box that reflects the boundaries of the object within the source image. Thus, with "one-click" bounding boxes, a single user action results in the generation and placement of a bounding box. In FIG. 5B, the bounding box 245 has been automatically generated and located on the source image 235 in response to the user single-clicking on one of the data points of the cluster bounded by the box 245.

It is noted that while the present disclosure utilizes the term "one-click" bounding boxes, using only a single-click is only an exemplary embodiment and as such the term "one-click" is utilized herein for ease of reading and not for limitation purposes. Indeed, a "one-click" bounding box need not be generated via a single mouse click, but may be generated by any suitable single or lone user activation of a user control. It is further noted that only a single click (or a single user activation of another type) is necessary to cause the tool 168 to automatically generate and present a bounding box that distinguishes, on the source image, the depiction of the object that includes the location that the user indicated.

In an embodiment, the automatic "one-click" bounding box utilizes an image processor, which may be implemented, for example, by the computer executable instructions 172 of the tool 160. The tool 160 may utilize different image processors for 2-D images and 3-D images, in some configurations. Generally speaking, image processors that are used by "one-click" bounding boxes employ one or more types of statistical and/or computational rules and/or analyses, e.g., by using learning techniques that are based, at least in part, on historical image processing training data (which is different than the training data 152 used to train models for controlling autonomous vehicles), by using maximum distances between all points in a cluster, etc. Thus, an image processor included in the tool 160 may receive, as an input, the location within the source image indicated by the user's single click, determine a particular set of data points surrounding the indicated location that is most likely to represent a particular, distinct object, and automatically display a bounding box that is particularly sized and oriented to encompass the particular set of data points, thereby distinguishing the particular, distinct object within the source image. Subsequently, the user may simply accept the bounding box which was automatically determined and proposed by the tool 160 and indicate a respective label for the particular, distinct object identified by the tool-generated bounding box. Alternatively, for some objects, the user may treat the proposed bounding box as a draft or interim bounding box, and may manually apply particular modifications or adjustments thereto.

When a bounding box is to a user's liking, the user may, via the user control 260 included in the object labeling portion 232b of the display 230, associate the bounding box with a label to thereby identify the particular, distinct object distinguished within the source image by the 3-D bounding box. Typically, the label is one of a plurality of categories and/or classifications via which the perception model 36 utilizes to learn what types of groupings of data points represent different categories/classifications. An example set of labels includes "car", "large vehicle", "pedestrian", "cyclist", "motorcyclist", "traffic sign", "road", "traffic light", etc. Examples of labels that are more granular include "bus", "semi-trailer truck", "animal", "ice patch", "pothole", etc. In an embodiment, the user may activate the user control 260, thus causing a drop-down menu to appear, and the user may select one of the labels displayed in the drop-down menu to be associated with the bounding box 245. In another embodiment, the user may activate the user control 260 to enter free-form text to generate a new label for a category or classification of the object that is identified or distinguished by the bounding box.

The automatic bounding box techniques that include image processing discussed herein address several of the drawbacks of known identification techniques. For example, unlike the human eye, an image processor is able to determine, by using one or more statistical and/or computational rules and/or analyses, that an abstract cluster of points within the point cloud image 235 does indeed represent a distinct object, and in some cases, based on how the image processor was trained, a type of object (e.g., car, person, traffic sign, etc.). Further, as the tool 160 has knowledge of which particular subset of data points of the source image represent the distinct object, the application of the bounding box may be accurate down to a level that is not consistently achievable by using the human eye and human judgment. For example, trained image processors may be able to distinguish between data points that represent a car and adjacent data points that represent a shadow. In another example, when a distinct object is represented by only a few data points of an image (such as when a car drives off into the distance), trained image processors of the tool 160 are able to statistically ascertain that the car is indeed represented by the few data points, which is also not achievable by the human eye and human judgment.

In some embodiments, a single user command or activation may result in multiple bounding boxes being generated and displayed on the screen 230, and as such, is interchangeable referred to herein as group, batch, or categorical bounding. For example, a user may enter a single command to apply bounding boxes to all pedestrians displayed within the source image 235. In these embodiments, the image processor(s) of the tool 160 may discover or determine all clusters of points included in the image 235 that respectively correspond to pedestrian, and may automatically generate, position, and display a respective bounding box for each pedestrian that is included in the source image. Thus, with the group bounding box feature, the person-hours required to produce a sufficiently sized set of training data may be still further reduced.

To discuss the work flow of 3-D bounding boxes 215 in more detail, and referring to the display 230 of FIG. 5B, the user has single-clicked on a location within a cluster of points within the 3-D point cloud image 235, and the tool 160 has automatically generated and placed a bounding box 245 around the subset of points within the vicinity of the indicated location which the tool 160 has determined to be representing a particular, distinct object within the 3-D image 235, in this case, a particular car. Note that as the image 235 is a 3-D image, the bounding box 245 is correspondingly three-dimensional. On the display 230, the car which is bounded 245 within the 3-D image 235 (e.g., via the "one-click" feature) is also simultaneously depicted within the 2-D image 238, as indicated by the reference 248. As shown in FIG. 5B, the placement of the 3-D bounding box 245 on the 3-D image 235 causes a corresponding 2-D bounding box 250 to be automatically generated and placed on the 2-D image 238 by the tool 160, in an embodiment. If the user subsequently re-sizes and/or re-positions either one of the automatically generated bounding boxes 245, 250, corresponding re-sizing and/or re-positioning may be automatically reflected on the other one of the bounding boxes 240, 245.

In embodiments in which the "one-click" bounding box features is not available or is not turned on, when a user manually generates a bounding box on either the 2-D image 238 or the 3-D image 235 (e.g., by visually identifying a particular object and manually drawing the sides of the bounding box around the identified object), the tool 160 may still automatically generate and present a corresponding bounding box in the other image 235, 238. As such, the tool 160 conveniently provides confirmation to the user (e.g., via the automatic generation and placement of the corresponding bounding box) that the bounded and abstractly represented object within the 3-D image 235 represents the same object as is represented by the RBG object 248 within the 2-D image 238. Additionally, in these embodiments, when the user re-sizes and/or re-positions either one of the bounding boxes 245, 250 (whether manually or automatically generated), corresponding re-sizing and/or re-positioning may be automatically reflected on the other one of the bounding boxes 240, 245.

To further aid the user in accurately bounding a distinct object within the 3-D image 235 (e.g., when the "one-click" feature is turned off or unavailable, and/or when the user desires to make modifications to automatically-generated bounding boxes), the object identification portion 232a of the display 230 may include one or more other sections 240, 242, each of which displays a different, 2-D perspective view of the 3-D image shown in section 235. The particular 2-D perspective view of the 3-D image or type thereof that is presented in each section 240, 242 may be selectable by the user, in some embodiments. In FIG. 5B, a top-down, 2-D view of the bounded 3-D point cloud image of the car in the section 235 is presented in section 240, and a side 2-D view of the bounded 3-D point cloud image of the car in the section 235 is presented in section 242. Any bounding box that is generated and applied (either automatically and/or manually) to one of the areas 235 or 238 may be automatically generated and positioned in each of the sections 240, 242. The user may then manipulate the bounding box presented in the sections 240 and/or 242 to better refine and/or indicate the boundaries of the image of the particular object within the 3-D image 235. Any modifications to a bounding box displayed within one of the sections 240, 242 of the display 230 may be automatically reflected in the other one of the sections 240, 242, as well as in the sections 235 and 238 (and vice versa). Further, if the user shifts focus to another bounded object displayed within the source image 235 (not shown), a corresponding top-down, 2-D view and a corresponding side 2-D view of the other bounded object may be automatically presented in the sections 240, 242, respectively. As such, the user is able to simultaneously view the particular object of focus and its bounding box 245 from three different perspectives 235, 240, 242, and make adjustments to the bounding box 245 in any of the three perspectives to better refine the 3-D boundary of the particular object of focus within the 3-D source image.

Via the object labeling portion 232b of the display 230, the user is able to apply an appropriate or desired label to the bounding box 245. As illustrated in the second portion 232b, an identifier 255 of the bounding box 245 (e.g., "Box ID 8705") has been automatically generated by the tool 160 and associated with the box 245. The identifier 255 uniquely identifies, within the 3-D video, the particular, distinct object (in this scenario, the car) indicated by the bounding box 245 (e.g., as opposed to other cars and other objects which may be depicted within the 3-D video). The frame number of the 3-D video to which the source image 235 corresponds is indicated in the object labeling portion 232b via a frames field 258 (e.g., "1"). A user selectable control 260 is provided to allow the user to generate, select, create, edit, and/or approve a label for the particular, distinct object identified by the bounding box 245 and by its identifier 255. For example, upon activation of the user control 260, a drop-down list may be presented from which the user may select a desired label (e.g., car, large vehicle, pedestrian, cyclist, motorcyclist, traffic sign, road, traffic light, etc.) for the bounded object 245. Additionally or alternatively, upon activation of the user control 260 a free-form text entry box or field may be presented, via which the user may provide a custom label for the particular, distinct object 245. In some embodiments, a label (e.g., a draft or interim label) may be automatically generated by the tool 168 in conjunction with automatically generating the bounding box 245, for example, "car." Via the second portion 232b, the user may accept or approve the draft/interim label as proposed by the tool 168, or the user may modify and/or edit the draft label as desired, for example, change "car" to "SUV." When the user is satisfied with both the bounding box 245 and the label 260 associated therewith, the user may cause an indication of association between the bounding box 245 and the label 260 to be stored as training data 152 for autonomous vehicle perception models 36.

It is noted that although the above discussion describes a workflow in which the user first applies a bounding box 245 and then adds a label 260 thereto, in other workflows, the label 260 may be generated before the bounding box 245. For example, a user may first indicate, via the labeling portion 232b of the display 230, a particular label, e.g., "pedestrian." The user may then single-click on all clusters of data points within the image 235 that are to be labeled "pedestrian." Alternatively, the user may enter a command (not shown) for the tool 160 to automatically identify all clusters of data points within the image 235 that are likely to depict "pedestrians." In response, the tool 160 may automatically generate a respective bounding box for each of the single-clicked or automatically determined clusters that depict "pedestrians," and the tool 160 may automatically generate a respective instance of the label pedestrian 260 associated with each bounding box. Each instance of the label pedestrian 260 may include the frame or source image number/identifier 258 and a unique bounding box identifier 255, for example.

Figure 5C:
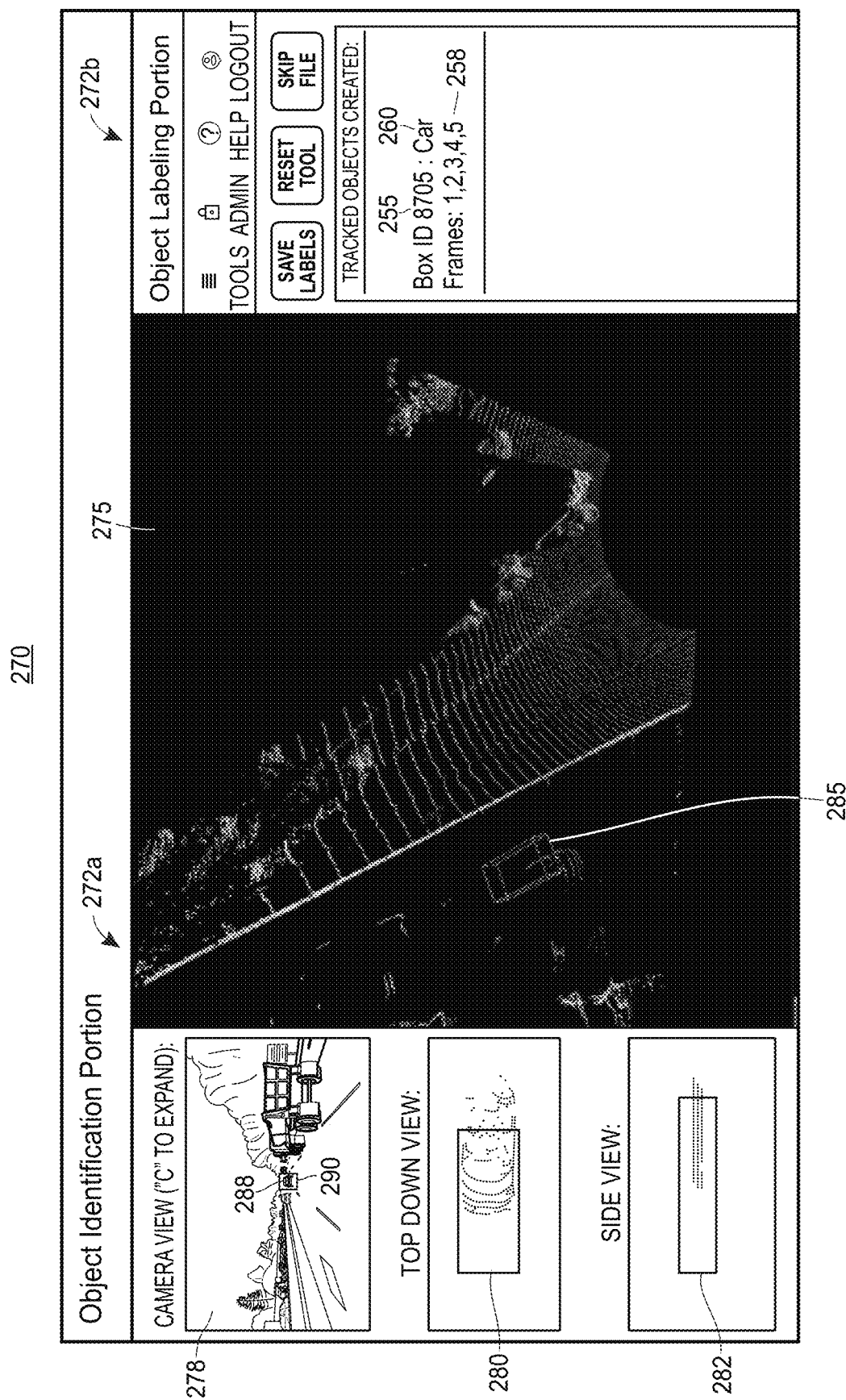

FIG. 5C illustrates a screen shot of an example display 270 depicting an example usage scenario of the 3-D Object Tracking feature 222 of the tool 160, in which the tool 160 automatically tracks a distinct object across multiple frames of a 3-D video. The display 270 may be presented on the graphical user interface 168 of the tool 160 (e.g., by executing at least some of the instructions 172 stored on the memory 165), for example. In the example usage scenario illustrated by FIG. 5C, the display 270 is a later frame of a 3-D video in which the display 230 of FIG. 5B is also included, e.g., the display 230 of FIG. 5B is Frame 1 of the 3-D video, and the display 270 of FIG. 5C is Frame 5 of the same 3-D video. The display 270 may presented on the user interface 168 in response to a user selecting the 3-D Object Tracking 222 user control of the home screen 200, in some scenarios. However, in the example usage scenario depicted in FIG. 5C, the user has advanced the 3-D video from Frame 1 (which is depicted in section 235 of the display 230 of FIG. 5B) forward in time to Frame 5, thereby automatically invoking the 3-D Object Tracking feature 222. As such, within the object identification portion 272a of the display 270, the first part or section 275 displays Frame 5 of the 3-D video, and the second part or section 278 displays a corresponding 2-D image captured by the RGB camera at the time that Frame 5 of the 3-D source video was captured by the lidar devices. (It is noted that although the example scenario discussed with respect to FIG. 5C describes the 3-D video as being forwarded, the techniques, features, and concepts discussed herein equally apply to scenarios in which the 3-D video is rewound.)

In the display 270, tool 160 has automatically tracked the particular car that was identified and distinguished in Frame 1 (e.g., by the bounding box 245 and uniquely identifier "Box ID 8705") to its updated location at the time at which Frame 5 was captured. For example, in the 3-D image 275 that comprises Frame 5, a draft bounding box 285 corresponding to the particular car "Box ID 8705" from other data points of the 3-D image 275 is automatically generated and presented by the tool 160 based on the previous bounding box 245. When the user focuses attention on the draft bounding box 285 in the section 275 of the object identification portion 272*a* of the display 270, its corresponding indicia is displayed within the object labeling portion 272*b* of the display 270. For example, the unique identifier "Box ID 8705" (reference 255) and its associated label "car" (reference 260) indicates the car of interest in the portion 272*b*, and the frames field 258 indicates that said car has been tracked across Frames 1 through 5 of the 3-D video.

In the example scenario of FIG. 5C, the draft bounding box 285 is automatically generated by the tool 160 upon displaying Frame 5 of the 3-D video on the display 270. In particular, the draft bounding box 285 is automatically generated by the tool 160 based on the sizes, orientations, and/or locations of previous bounding boxes distinguishing the car identified as "Box ID 8705" within previous frames, such as the bounding box 245. Additionally or alternatively, the tool 160 may perform image processing on Frame 5 to verify or determine the accuracy of the particular cluster of data points representing the car identified by "Box ID 8705," and the output of the image processing may inform the size, orientation, and/or location of the draft bounding box 285. Any image processing of Frame 5 may be based on particular configurations and locations of clusters of data points that represented Box ID 8705 in previously identified and labeled frames, or at least some of the image processing may be independently performed without consideration to other frames.

Similar to that discussed above of the display 230 corresponding to Frame 1 of the 3-D video, in the display 270 corresponding to Frame 5 of the 3-D video, a corresponding 2-D image of the car "Box ID 8705" (reference 288) may be automatically distinguished within the 2-D image 278 by respective 2-D bounding box 290, and various 2-D perspective views of the cluster of data points that is representative of the car of interest "Box ID 8705" may be presented in sections 280 and 282 of the display 270. Also similar to that discussed above with respect to the display 230, in the display 270, any user adjustments to any of the bounding boxes displayed in any of the portions 275, 278, 280, 282 of the display 270 may be automatically reflected in the bounding boxes displayed in the other portions 275, 278, 280, 282.

Also similar to that discussed above for the display 230, within the display 270, any of the automatically generated bounding boxes on any of the sections 275, 278, 280, 282 may be considered to be a draft or interim bounding box that the user may either accept, or modify and accept. When the user is satisfied with the bounding box 285, the user may cause an indication of the association between the bounding box 245 corresponding to the representation of the car "Box ID 8705" in Frame 5 and its respective label 260 to be stored as additional training data 152 for autonomous vehicle perception model 36.

Figure 5D:
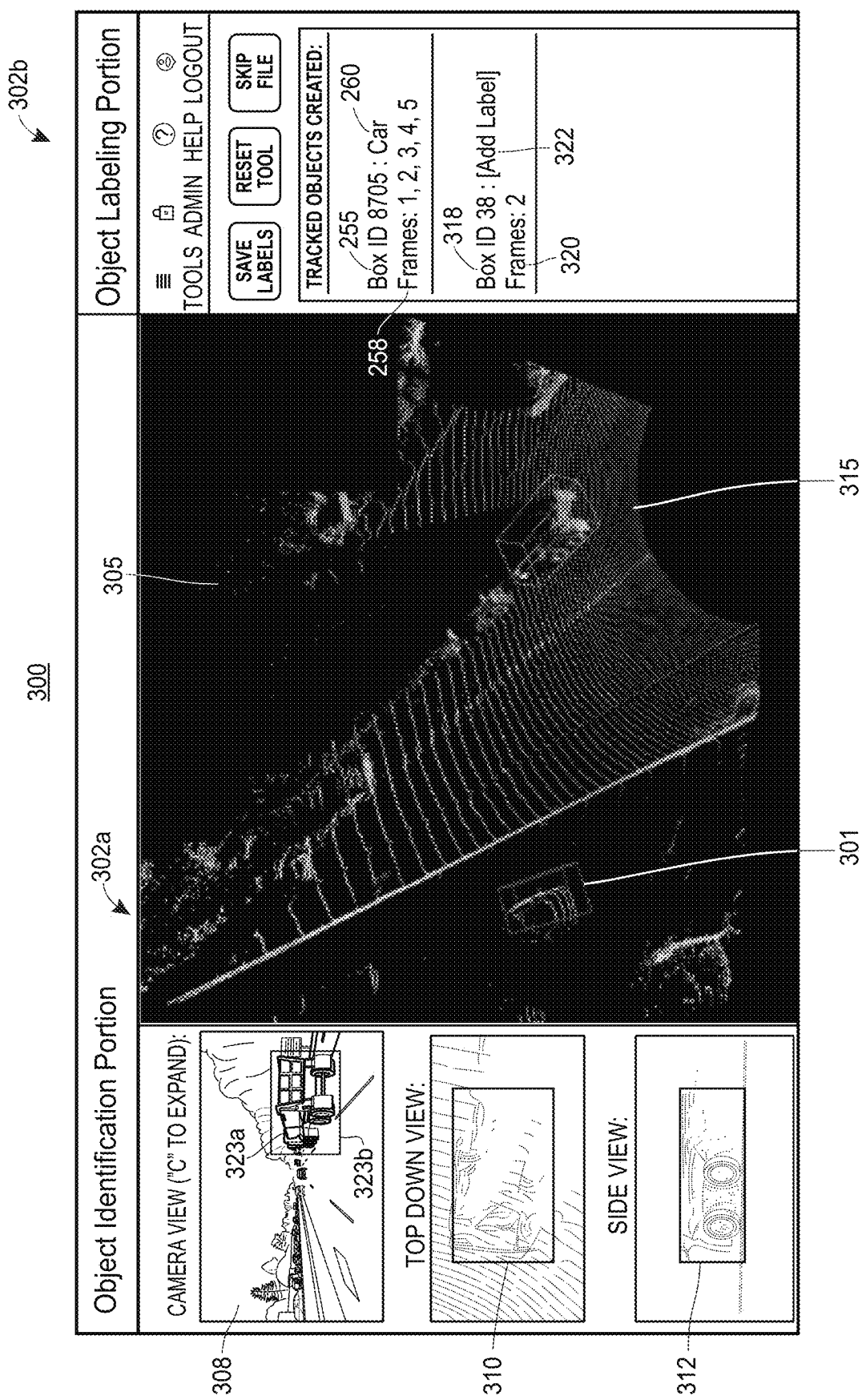
Figure 5E:
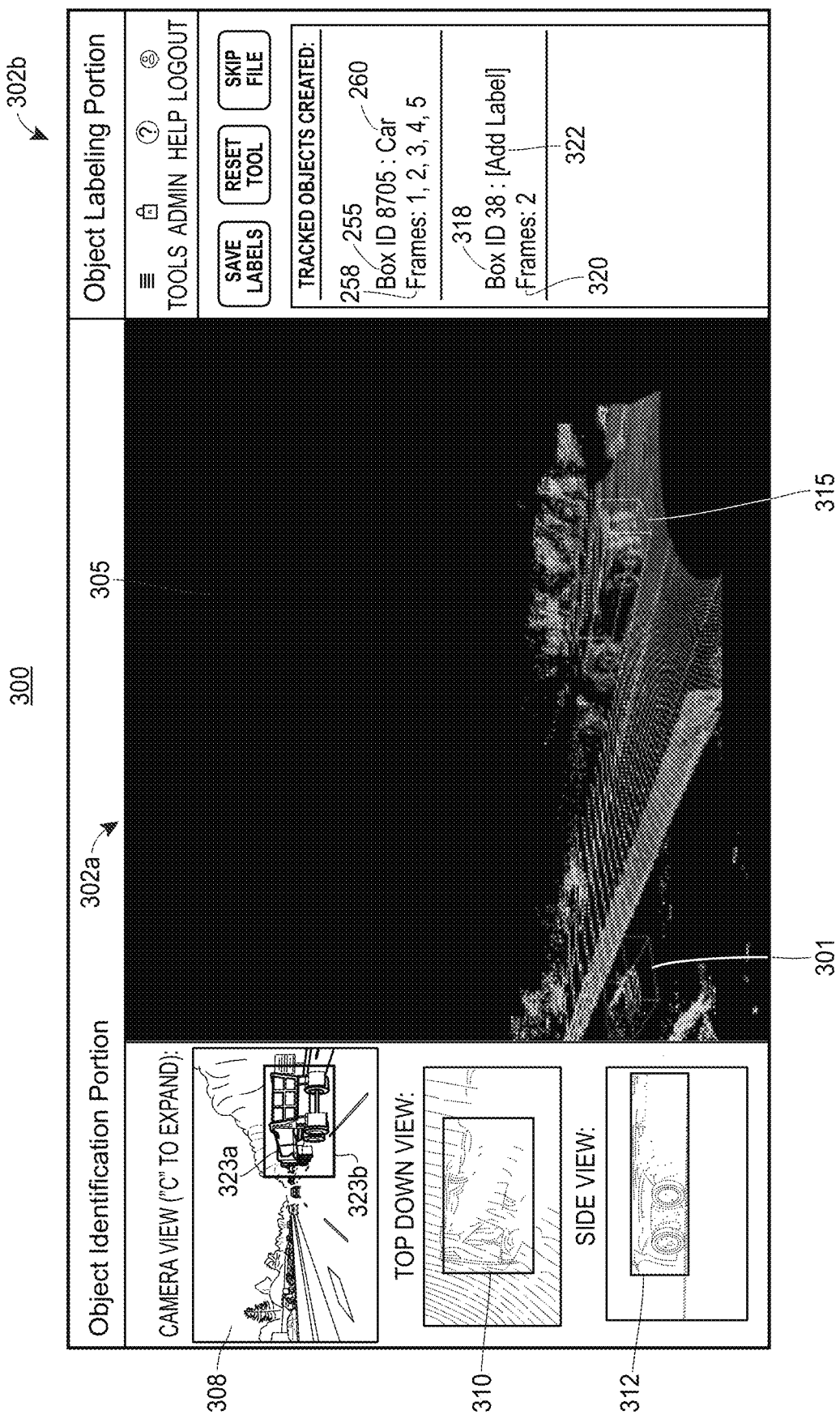

FIGS. 5D and 5E illustrate an example usage scenario of the 3-D bounding boxes feature 215 provided by the tool 160 in which a user refines a draft 3-D bounding box across multiple perspective views of a 3-D source image. In particular, FIG. 5D depicts a screenshot of a display 300 that is presented on the graphical user interface 168 of the tool 160, e.g., by executing at least some of the instructions 172 stored on the memory 165 of the tool 160. The display 300 presents, on the user interface, Frame 2 of the 3-D video in which Frame 1 of FIG. 5B and Frame 5 of FIG. 5C are also included. In FIG. 5D, the user has finished identifying and labeling the car "Box ID 8705" (reference 301) across Frames 1 through 5 of the 3-D video, as is indicated in the object tracking portion 302*b* of the display 300 by references 255, 258 and 260, and the user has navigated back to Frame 2 (reference 320) of the 3-D video to identify and label another object that is depicted within the 3-D video.

In the display 300, similar to the displays 230 and 270, an object identification portion 302*a* of the display 300 includes a first section 305 in which Frame 2 of the 3-D video is presented, a second section 308 in which a corresponding 2-D image that was captured by the RGB camera at the time that Frame 5 was captured by the lidar devices is presented, and third and fourth sections 310, 312 each of which respectively displays a different 2-D perspective view of a 3-D cluster of data points to which focus is directed within the 3-D image 305, e.g., by selection of the user or by other suitable means of focus. In the example usage scenario depicted by FIG. 5D, in the first section 305 of the display, focus is directed to a 3-D cluster of data points that represent a truck, and the cluster has been indicated (e.g., automatically by the tool 160 and/or manually by the user, such as in a manner discussed above) by a draft 3-D bounding box 315. The draft 3-D bounding box 315 has been assigned the identifier "Box ID 38", as illustrated by reference 318 in the object labeling section 302*b* of the display 300. In conjunction with the identifier "Box ID 38", the corresponding frame number of the 3-D video is indicated (reference 320), however, the user has not yet associated a label with the object identified as "Box ID 38" (reference 322).

Accordingly, the corresponding 2-D image displayed in the second section 308 of the display 300 includes a 2-D representation of the same truck (reference 323*a*) and its corresponding bounding box (reference 323*b*). The third section 310 displays a top-down, 2-D perspective view of the 3-D cluster of data points indicated by the draft bounding box 315 (e.g., the truck), and the fourth section 312 of the display 300 presents a 2-D side view of the same.

In FIG. 5E, the user has changed the perspective view from which the 3-D environment image 305 is presented on the display 300. The indicia 318, 320, 322 for "Box ID 38" in the object labeling portion 302*b* of the display 300 remains the same as in FIG. 5D, as the user is still the process of identifying and labeling the distinct object "Box ID 38" and has not yet assigned a label 322 thereto. Similarly, the corresponding 2-D RGB image of the environment shown in section 308 of the object identification portion 302*a* also remains the same as depicted in FIG. 5D, as the 2-D image 308 is not able to be manipulated by the user in a third dimension.

In FIG. 5E, the draft 3-D bounding box 315 that was presented on the first perspective view is included in the section 305 now displaying the environment from the second perspective view, and both the bounding box 315 and the cluster of data points that the draft bounding box 315 distinguishes from the remainder of the data points of the 3-D source image are displayed in the section 305 from the second perspective view. From the second perspective view, the user is able to further modify and/or adjust the draft bounding box 315 to refine the location, position, sizing, orientation, etc. of the box 315 to more accurately indicate the particular data points that the box 315 encompasses, as compared to only using the first particular perspective view to do so. For example, the second perspective view may visually display a part of a particular boundary of the object that was not visible from the first perspective view, and the user may refine the bounding box characteristics based on the now visible part of the particular boundary. Similar to that discussed above for the displays 230 and 270, corresponding presentations of the draft 3-D bounding box 315 may be simultaneously presented in the portion 308, 310, and 312. Note that in the portions 310 and 312, the different 2-D perspective views of the cluster of data points representing "Box ID 38" are depicted in FIG. 5B with reference to the presentation of said cluster of data points from the second perspective view of the 3-D environment image 305.

The user is able to change the perspective view of the 3-D environment image 305 to any number of three-dimensional perspective views, as desired, and may further refine the draft bounding box 315 on each different perspective view, if desired. When the user is satisfied with the draft bounding box 315 corresponding to the representation of the truck "Box ID 38" in Frame 2, the user may accept or approve the draft bounding box 315, associate a label 322 therewith, and store an indication of the association between the cluster of data points identified as "Box ID 38" by the now-approved bounding box 315 and the label 322 for use as still additional training data 152 for autonomous vehicle perception models 36.

Figure 5F:
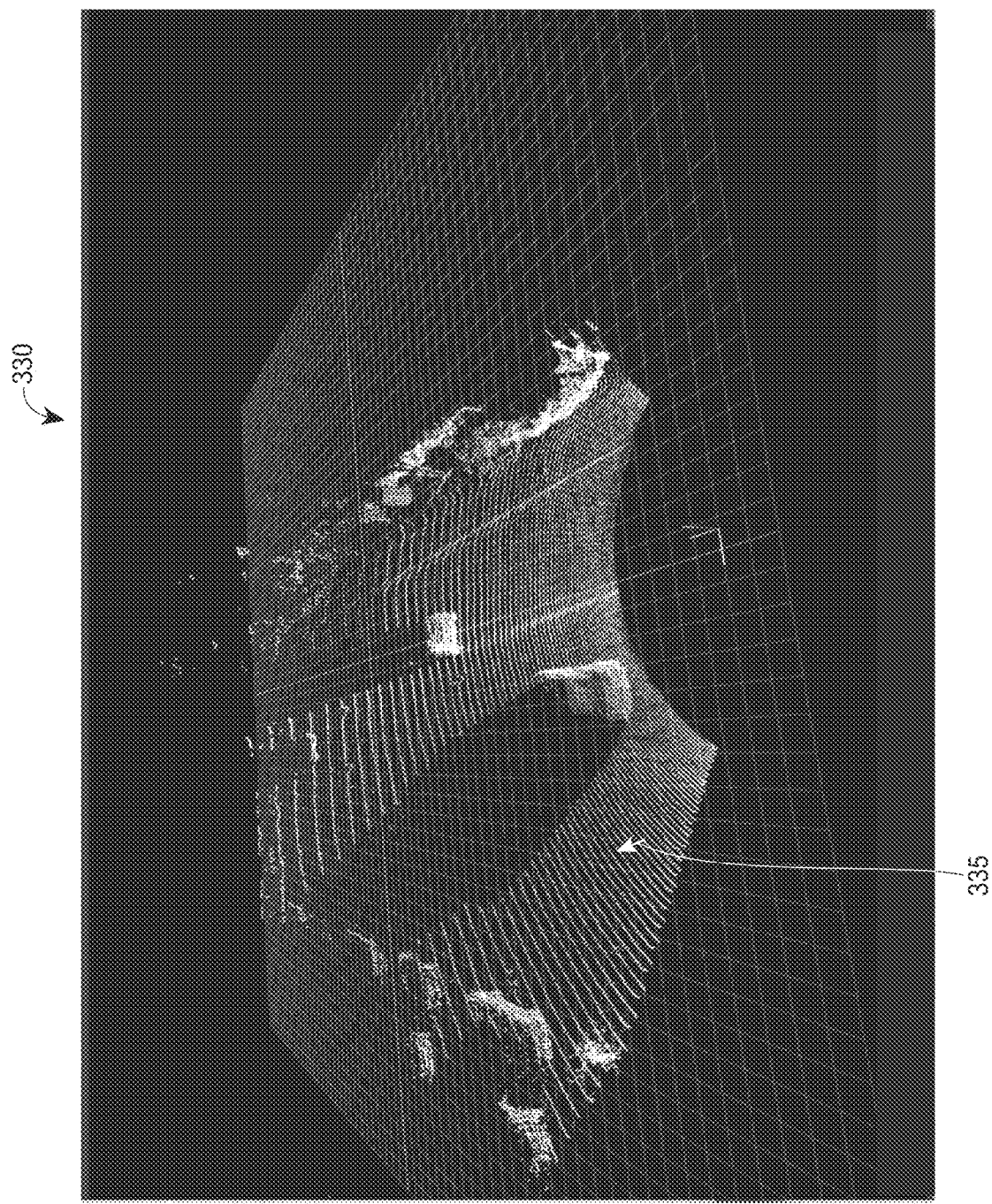
Figure 5G:
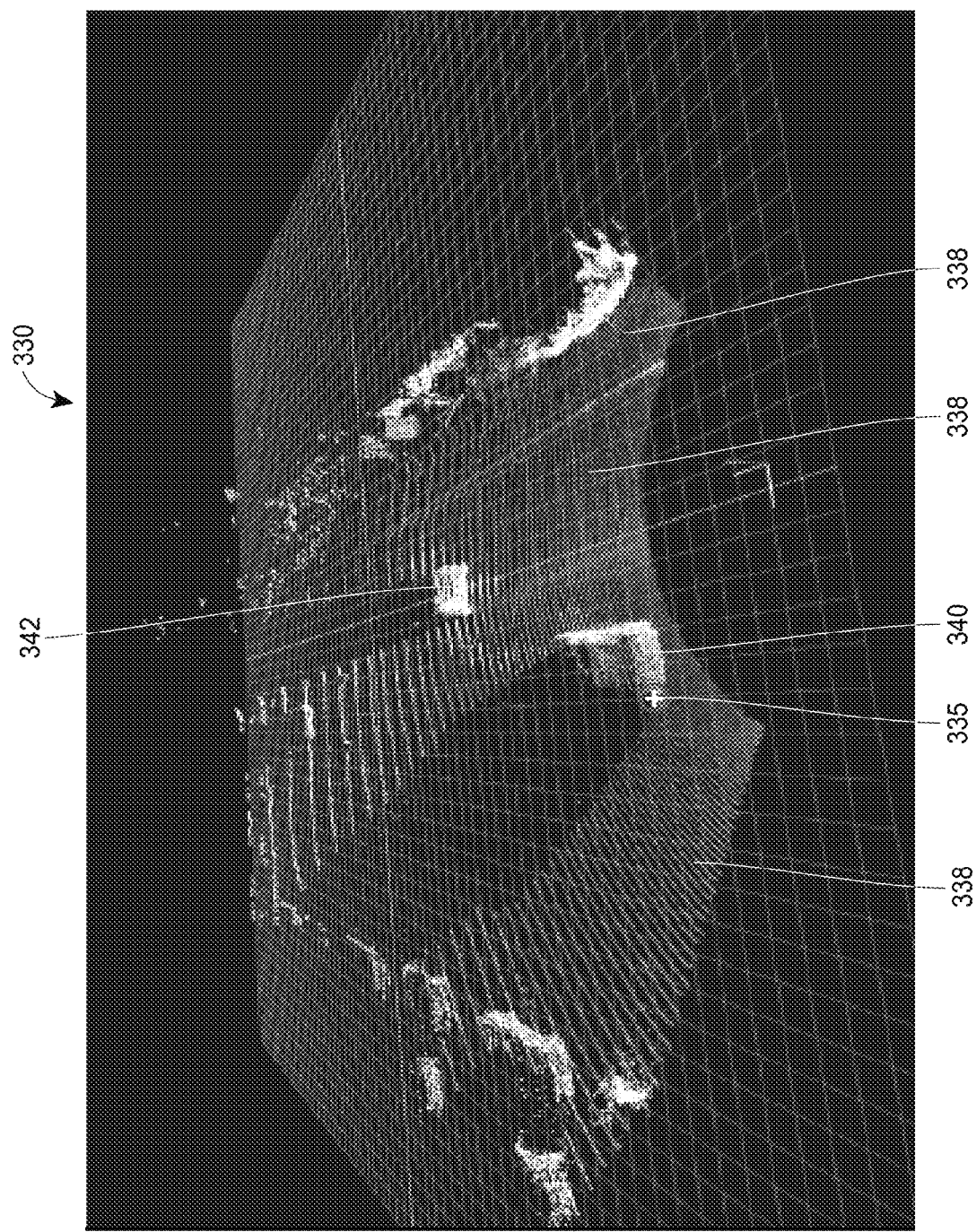

FIGS. 5F and 5G illustrate an example usage scenario in which the user utilizes the 3-D Paint feature 222 of the tool 160 to distinguish and identify various objects depicted within a 3-D source image. FIG. 5F depicts a screenshot of a 3-D source image 330 that is being presented on the graphical user interface 168 of the tool 160, e.g., by executing at least some of the instructions 172 stored on the memory 165. The 3-D source image 330 may be displayed, for example, on any portion of a graphical user interface that is designated for presenting 3-D images thereon, such as previously referenced portions 235, 275, and/or 305 included respectively on displays 230, 270, and 300. In FIG. 5F, the user has invoked the 3-D Paint feature 220, e.g., by activating the 3-D Paint 220 user control of the home screen 200. The 3-D Paint feature 220 allows a user to easily indicate (or otherwise cause to be distinguished), within a 3-D source image, surface areas that are essentially planar, such as roads, center medians, lawns, driveways, parking lots, the ground, sides of retaining walls or barrier walls, etc.

In one of several features included in the 3-D Paint tool 220, and similar to the "one-click" bounding box feature discussed above with respect to FIG. 5B, the 3-D Paint feature 220 allows a user to single-click anywhere on a cluster or grouping of points included in a 3-D image to thereby automatically select and visually distinguish/identify an intended surface area depicted therein. As such, said feature is referred to here is "one-click" or "point-and-fill" painting. For example, as shown in FIG. 5F, the user is hovering a cursor 335 over a particular location within the lower left portion of a 3-D source image 330. Upon entering a single click, the tool 168 then automatically determines the surface area comprising a set of data points surrounding the clicked location and other data points that are contiguous thereto that are mostly likely to represent a same surface (which, in this image 330, is a road), and automatically changes or modifies a visual property, on the source image, of the data points that are included in the contiguous surface area. The resulting visual property modification of the user invoking "point-and-fill" painting at the location 335 (which in this example scenario is a color change) is shown by reference 338 in FIG. 5G. That is, in response to only the single click at the particular location, the tool 160 automatically paints over or fills the contiguous surface area in which the particular location is included 338 with the changed visual property. In the example shown in FIG. 5G, the modified or changed visual property of the contiguous service area is a change in color, however any change in visual property may be utilized to distinguish surface areas within 3-D source images, e.g., color change, pattern change, dynamic treatment such as blinking, removal of a particular visual property, etc. In some implementations of the tool 160, different visual properties of the 3-D Paint feature 220 may signify different types of surfaces. For example, the color red may denote a road, a flashing white may denote an ice patch, gray may denote a vertical surface such as a side of a retaining wall, etc.

Note that in FIG. 5G, while the changed visual property is applied to the group of points 338 representing the road, the changed visual property is not applied to the clusters of points that are representative of cars or other objects that are on or next to the road (denoted by references 340, 342), as the tool 160 has automatically determined that said clusters 340, 342 do not represent the road. To that end, the data points identified by the tool 160 as being contiguous and representing a same surface may be determined, at least in part, based upon respective, relative levels of virtual elevations of surrounding data points. Thus, for some environments, the data points that are mostly likely to represent a same surface may be essentially planar (such as when said data points represent a vertical wall or a flat stretch of road). In other environments, the data points that are mostly likely to represent a same surface may have relative maximum differences of relative elevations therebetween (such as when said data points represent a road that goes up and down steep hills).

In an embodiment, the tool 160 invokes one or more image processors (e.g., in a manner similar to that discussed with respect to FIG. 5B) to ascertain which subsets of points included in the source image 300 are statistically likely to represent a road or other type of planar surface and therefore to which the changed visual property is to be applied, e.g., by using neural networks, trained machine-learning models, etc. In some implementations, the tool 160 may provide a one-to-many, group, or batch painting option, where a single point-and-fill user command causes the tool 160 to paint over (e.g., change a visual property of) all data clusters within the 3-D source image 330 that are most likely to represent roads or other essentially two-dimensional surfaces.

Thus, with the 3-D Paint tool 220, a single user action (and only the single, user action) results in the automatic coverage of a surface area indicated by the single user action, e.g., via the application (or removal) of a visual property to data points representing the surface area. Similar to the "one-click" bounding boxes, it is noted that while the present disclosure refers to the user selecting a particular surface area using a single click, this is only an exemplary embodiment and worded as such for ease of reading and not limitation purposes. Indeed, a selection and painting of a particular surface area need not be generated via a single mouse click, but may be generated by any suitable single user activation of a corresponding user control.

In addition to the one-click or point-and-fill painting feature, the 3-D Paint tool 220 provides other features that may be useful to the user. For example, a user may select an option to utilize the cursor as a virtual paint brush, so that as a user moves the cursor/paint brush across a particular area of the source image, the visual property of the data points over which the paintbrush is moved is modified accordingly to thereby indicate or identify the surface (e.g., similar to virtually applying the visual property to the area with a brush). In another example, the user may select an option to switch the 3-D Paint feature 220 into an erase mode to thereby remove a visual property from a desired area of the source image. For instance, in a "one-click" or "point-and-fill" erase mode, a single click or selection of a location within the desired area may automatically cause the entirety of the contiguous area to be cleared of the visual property. In "custom" or "paint brush" erase mode, the user may move the cursor/paint brush across the desired area, thereby virtually erasing the visual property from the data points over which the cursor/paint brush is moving. The erase mode is especially useful for modifying or editing a previous single-click 3-D Paint command. For example, in FIG. 5G, a portion of the cluster of data points 340 representing a car that is traveling on the road 338 were "splashed" by paint as a result of the "one-click" user action of FIG. 5F. The user may switch the 3-D Paint feature 220 to the erase mode (as visually denoted by the change of the cursor 335 from being a pointer as in FIG. 5F to being a plus sign as in FIG. 5G), and use the virtual paint brush to remove or clean up the undesired visual property from selected data points included in the cluster 340 representing the car.

When the user is satisfied with the indications of the surface areas within the 3-D source image 330 (e.g., is satisfied with the sub-areas of the image 330 that have been "painted over," the user may accept or approve said indications, associate one or more labels therewith, and store the indication the association between the surface areas identified the respective labels for use as training data 152 for autonomous vehicle perception models 36, e.g., via an object labeling portion of the display on which the image 330 is presented (not shown in FIGS. 5F and 5G). Example labels for surfaces may include "road", "shoulder", "median", "ground," "driveway", "wall", and like. As such, a contiguous surface area that is identified and indicated within a 3-D source image via the graphical representation of a modified visual property may be considered as a distinct object within the source image and may be labeled as such.

Another useful feature provided by the system or tool 160 to help a user in identifying and labeling distinct objects within source images is Hide/Unhide. A user may select any objects represented on a source image (e.g., on sections of the displays 230, 270, 300, 330, or another display screen) that have been previously distinguished and identified (e.g., by a respective bounding box, paint, or some other graphical means of indication), and the user may instruct the tool 160 to hide the selected objects. In response, the tool 160 may render the selected objects as being non-visible or greyed-out within the source image. In an implementation, the tool 160 hides both the data points that have been indicated as representing the distinct object and the object's respective bounding box. Of course, with another instruction, the user may instruct the tool 160 to unhide distinct objects that were previously hidden. The Hide/Unhide tool is particularly useful for a user to reduce clutter while he or she is working on identifying and labeling the source image. For instance, a user may instruct the tool 160 to hide all objects that have been identified and labeled as "car", thereby rendering such objects non-visible on the working display, and then the user may apply the Paint feature 220 as desired without inadvertently painting over any identified/labeled cars or portions thereof. In a sense, by using the hide feature, the user may ensure that the Paint feature does not splash onto other types of objects.

Figure 5H:
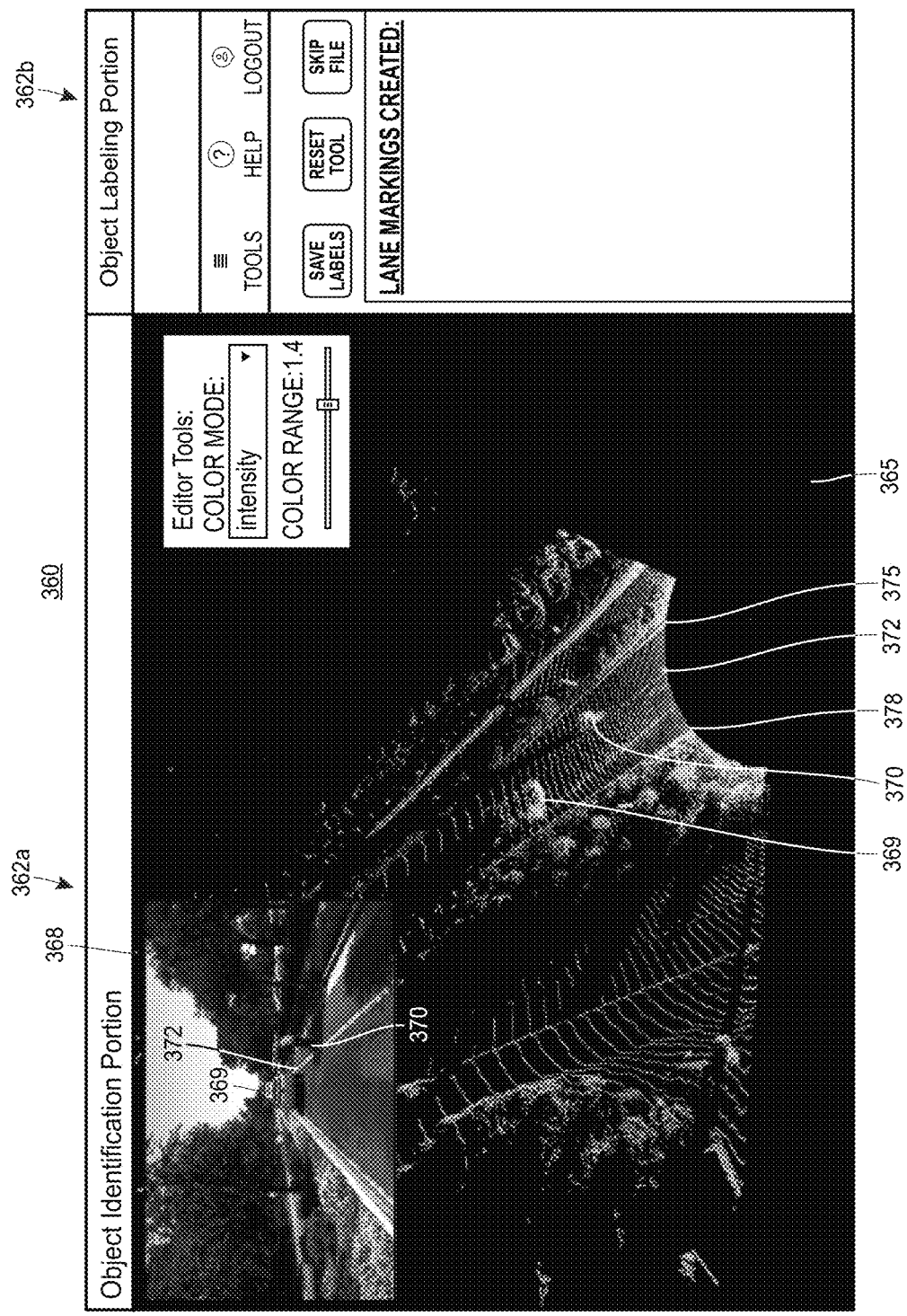
Figure 5I:
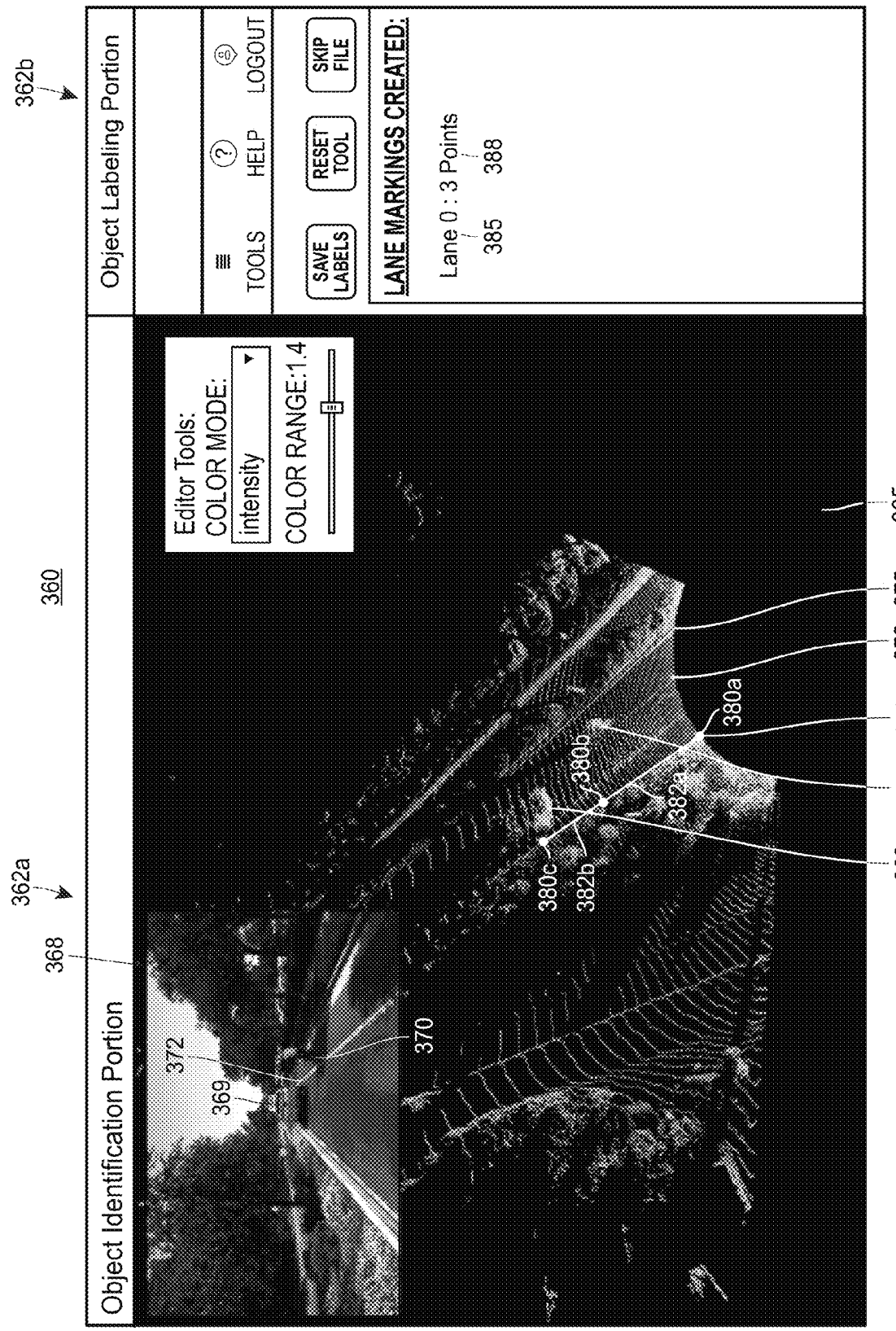

FIGS. 5H and 5I illustrate an example usage scenario of the 3-D Lane Marking feature 218 provided by the system or tool 160. The 3-D Lane Marking 218 feature allows a user to quickly and easily mark, delineate, or indicate the edge of a traffic lane within a source image, e.g., the side of a road, separate lanes of opposite-moving traffic, separate lanes of traffic moving in the same direction, etc. FIG. 5H depicts a screenshot of a display 360 that is presented on the graphical user interface 168 of the tool 160 (e.g., by executing at least some of the instructions 172 stored on the memory 165 of the tool 160). Similar to the displays 230, 270, and 300, the display 360 includes an object identification portion 362a and an object labeling portion 362b. Within the object identification portion 362a, a first section 365 presents thereon a 3-D source image of an environment that was captured by lidar devices mounted on a vehicle, and a second section 368 presents thereon a corresponding 2-D source image that was captured by an RGB camera mounted on the same vehicle at a similar time at which the 3-D source image 365 was captured. The 3-D source image 365 depicts therein respective representations of a truck 369 and a cyclist 370 that are traveling in the same direction in respective, separate traffic lanes that are separated by a lane marker 372. With respect to the direction of travel of the truck 369 and the cyclist 370, the far right edge of the two lanes is depicted by the linear set of data points 375, and the far left edge of the two lanes abutting the center median is depicted by the linear set of data points 378.

FIG. 5I depicts the display 360 in which the user has used the 3-D Lane Marking feature 218 to explicitly distinguish, identify, or indicate the lane marker 372 within the source image 365. Specifically, a first location 380a is initially designated within the source image 365 as being included in the edge of a lane or included in a lane marker 372 that is physically located within the environment, as is indicated by the round dot or point. The first location 380a may be manually designated by the user via the 3-D Lane Marking tool 218 (e.g., via a mouse click or the activation of some other suitable user control) or, in some implementations, the first location 380a may be automatically designated by the tool 160 (e.g., by utilizing one or more image processors in a manner such as described above for other features of the tool 160). The user may subsequently designate one or more other locations 380b, 380c depicted within the source image 365 that correspond to respective other locations along the edge of the lane, e.g., that are included in the lane marker 372. In most cases, the subsequent other locations 380b, 380c are non-adjacent to the location 380a; however, the distance between the indicated locations 380a, 380b, 380c may vary as a user desires and/or as needed. For example, if a road curves to an extreme degree, the indicated locations of the edge of the road may be nearer to one another, whereas for a relatively straight stretch of road, the indicated locations of the edge of the road may be spaced further apart. At any rate, upon the user indicating one or more locations 380a-380c of the source image 365, the user may activate a respective user control of the 3-D Lane Marking feature 218 that causes the tool 160 to interconnect the indicated locations 380a-380c using respective graphical line segments 382a, 382b, thereby distinguishing, designating, or identifying the edge of the lane or the lane marker 372 from other distinct objects represented on the source image 365. When the user is satisfied with the graphical representation of the lane marker 372, the user may generate and associate a label for the lane marker 372, e.g., via the object labeling portion 362b of the display 360. The labels for lane markers may be as simple as "Lane <<number>>", as shown by reference 385 in FIG. 5I. In another embodiment (not shown), the lane marking labels may have a syntax similar to that of the binding boxes, e.g., "Lane ID <<alphanumeric ID>>: [Add Label]", where the label may be designated via a drop-down menu, such as "median," "shoulder", "bike lane", "opposite-traffic", "same-direction traffic", etc., or the label may be entered by the user using free-form text. Note that as shown in FIG. 5I, an indication of the number of indicated locations/points along the marked lane edge 372 may also be provided (reference 388). The user may cause an indication of the association between the marked Lane 372 and its label 385 to be added to the training data 152 that is to be used for trading autonomous vehicle perception models 36.

It is noted that while the example usage scenario depicted in FIGS. 5H and 5I uses the 3-D Lane Marking tool 218 to identify a lane 372 that is physically marked within the physical environment by paint, reflective pavement markers, non-reflected pavement markers, raised pavement markers, lane delineators, lane dividers, etc. (e.g., as denoted by reference 382 in section 368 of the display 360), the 3-D Lane Marking tool 218 may also be used to mark lanes or edges of roads that are not physically delineated within the physical environment, for example, the edges of dirt roads or gravel roads.

Figure 5K:
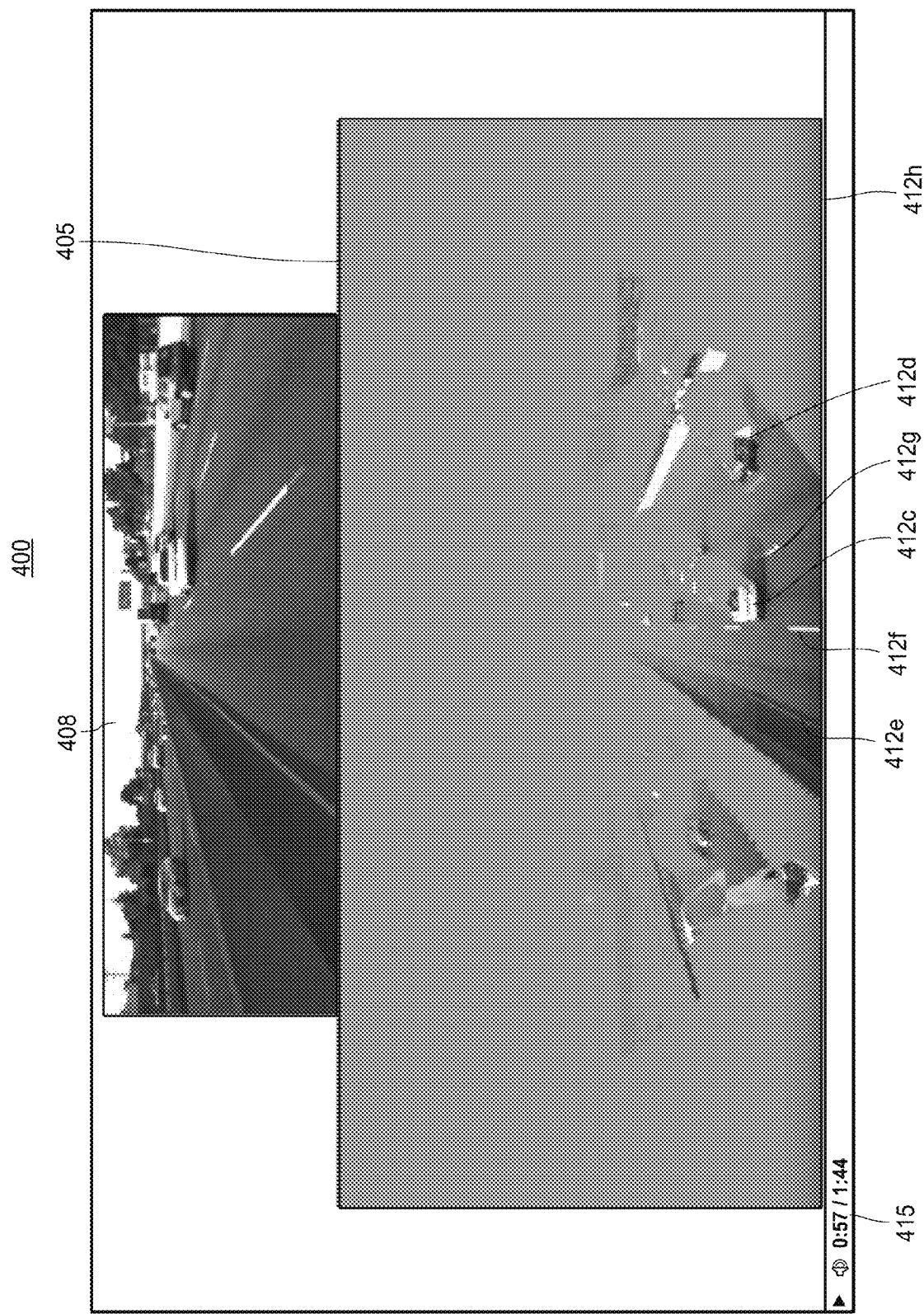

FIGS. 5J and 5K illustrate an example of another particular graphical user interface technique provided by the tool 160 that a user may use for identifying and labeling distinct objects within 3-D images for use in training machine-learning based models that are used to autonomously control vehicles, e.g., that of layering the 2-D and 3-D source images. Turning to FIG. 5J, the example display 400 includes a first portion 405 in which a 3-D video of an environment in which vehicles operate is presented or played, and includes the second portion 408 in which a 2-D video of the same environment is presented or played. In the embodiment depicted in FIG. 5J, a set of lidar devices mounted on a vehicle captured the 3-D video 405 and an RGB camera mounted on the vehicle simultaneously captured the 2-D video 408. Thus, the videos 405, 408 are presented or played on the display 400 in a side-by-side and synchronous manner, as denoted by the timestamps and progress bar at the bottom of the display 400 (reference 410). As such, the 3-D video 405 may advance or rewind in a synchronous manner with the 2-D video 408. For example, as shown in FIG. 5J, the RGB image of the environment that was being captured in the 2-D video at the time 0:42/1:44 (reference 410) is displayed in the portion 408, and the point cloud image of the environment that was being captured in the 3-D video at 0:42/1:44 is displayed in the portion 405. In FIG. 5K, the user has advanced the videos and has paused them at the subsequent time 0:57/1:44 (reference 415). Accordingly, the RGB image of the environment that was captured in the 2-D video at the time 0:57/1:44 is displayed in the portion 408, and the point cloud image of the environment that was captured in the 3-D video at 0:57/1:44 is displayed in the portion 405.

Significantly, within the display 400, the tool 160 layers at least a portion of the 2-D video with the 3-D video, and displays the layered videos within the first portion 405. In the embodiment illustrated in FIG. 5J, in the first portion 405 of the display 400, several respective representations of respective distinct objects from the 2-D video have been layered with (e.g., overlaid on top of) the corresponding objects as represented within the 3-D video, thereby representing the distinct objects in the first portion by respective composite object images, each of which is comprised of both respective representative data points from the 2-D image and respective representative data points from the 3-D image. For example, in FIG. 5J, the two oncoming vehicles 412a, 412b, the two vehicles 412c, 412d that are traveling in the same direction as the vehicle on which the 2-D and 3-D cameras are mounted, various lane markers 412e-412g, and a guardrail 412h are depicted within the portion 405 of the display 400 by respective composite images as distinct objects. Importantly, the layered, 3-D image/video 405 and composite representation of distinct objects thereon allows the user to more easily visually interpret the more abstract 3-D source image 405 to thereby perform desired object identification and labeling of data points included therein. As composite object images include 2-D data points that are specifically associated with or tied to 3-D data points, as a 3-D source image is manipulated or explored on the display 400 in three dimensions, any 2-D data points included in a composite object image may be subject to the three dimensional manipulation/exploration in conjunction with the integrate or associated 3-D data points also included in the composite object image, thus may be displayed within the composite object image from different three-dimensional perspective view.

To illustrate, in FIG. 5K, the user has changed the perspective from which the 3-D video is being viewed in the portion 405 from the perspective view that was presented in FIG. 5J to a different perspective view. That is, the user has changed the virtual, 3-D camera angle from which the vehicle environment is presented in the portion 405 of the display 400 to being slightly elevated above the scene as compared to the perspective view shown in FIG. 5J. Note that, in FIG. 5K, the perspective view of the 2-D video in portion 408 of the display 400 remains the same as in FIG. 5J, as the 2-D video is not inherently able to be manipulated in a third dimension to vary the 3-D perspective view from which it is presented. However, the composite object images 412c-412h depicted in FIG. 5J do appear in accord with the changed perspective view now displayed in FIG. 5K. (The composite object images representing the cars 412a and 412b in FIG. 5J are no longer depicted in FIG. 5K, as they have passed out of the field of view of the cameras.) This convenience is possible as, as discussed above, the composite object images 412c-412h are formed by associating, combining, integrating, or linking respective 2-D data points of the 2-D source image with/to respective 3-D data points of the 3-D source image. As such, when a perspective view of the 3-D source image is modified, thereby presenting the 3-D data points that represent the distinct object from a different perspective view, the 2-D data points that are integrated therewith follow the 3-D data points in accordance with their layered, composite configuration. This layering feature allows the user to more easily ascertain, discern, and/or identify a same distinct object across multiple frames of the 3-D video 405.

Further, not only does the tool 160 allows the user to change the perspective view of the 3-D, layered video being presented in the portion 405, the tool 160 allows a user to dynamically vary the perspective view of the 3-D, layered video presented in the portion 405 while the video is being executed (e.g., played or dynamically advanced) on the display 400. That is, while the 3-D video is being played, the user may, a respective user controls, virtually and dynamically navigate within the 3-D environment to view various compositely-represented objects therein from different perspective angles. For example, if the user is in the process of distinguishing and labeling the car 412c, the user may dynamically change the virtual perspective view of the 3-D cameras (and therefore, the perspective views of the car 412c and any other composite and non-composite object images depicted within the 3-D video) to find the most suitable perspective(s) via which the user may identify and distinguish the car 412c from other data points of the 3-D video. For example, the user may dynamically cause the virtual 3-D camera to "fly" above a car 412c (as shown in FIG. 5K), zoom in, zoom out, move to look at the left side of the car 412c, move to look at the right side of the car 412c and/or dynamically perform any other virtual movement within the displayed 3-D environment, all while the 3-D video continues to play. The user may pause the video(s) at any desired time and from any perspective view, and may define and/or refine the boundaries of the car 412c within the displayed frame of the 3-D video 405.

The layering of at least portions of a 2-D image with respective, time synchronized 3-D image may be performed by the tool 160 on any 3-D source image, irrespective of whether the 3-D source images is simultaneously displayed with a corresponding 2-D image or not. For example, in some implementations, the portion 408 may be omitted from the display 400. The user thus is able to utilize said layering feature when he or she finds it useful to do so.

Any one or more of the techniques and features described above with respect to FIGS. 5A-5K that are provided by the system or tool 164 for identifying/distinguishing distinct objects within source images and associating respecting labels therewith for generating training data for training machine-learning based models that are used to autonomously control vehicles may be utilized individually or in combination when processing a source image. For example, a user may utilize the 3-D Bounding Boxes tool 215 and the 3-D Lane Markings tool 218 to initially distinguish and identify various cars and lanes depicted within a first frame of a 3-D video, and then may utilize 3-D Object Tracking 222 through subsequent frames to automatically carry forward the bounding boxes, lane markings, and associated labels that were approved in The first frame. Additionally, it is noted that although the techniques and features described above have been described with respect to 3-D source images, the majority of the above-discussed features may be individually and/or applied in combination to 2-D source images. For example, 2-D Bounding Boxes 205 may be applied to 2-D images in a manner similar to that described above for 3-D Bounding Boxes 215, 2-D Lane Markings 208 may be applied to 2-D images in a manner similar to that described above for 3-D Lane Markings 218, 2-D Object Tracking 212 may be applied to 2-D images in a manner similar to that described above for 3-D Object Tracking 222, and 2-D Paint 210 may be applied to 2-D source images in a manner similar to that described above for 3-D Paint 220. However, certain features described above may be applicable only to 3-D source images due to the inherent nature of 2-D images. For example, a user will typically not be able to manipulate a 2-D environment image to be viewed from different 3-D perspective views.

Example Methods and Functionalities

FIGS. 6A-6E depict flow diagrams of example methods and/or functionalities that may be provided by the systems, methods, and techniques disclosed herein, e.g., as provided by the tool 160 and/or its prescribed functionalities 172 of FIG. 4. For ease of discussion, and not for limitation purposes, each of FIGS. 6A-6E is discussed below with simultaneous reference to FIGS. 1-4 and 5A-5K. In embodiments, at least a portion of each of the methods of FIGS. 6A-6E may be performed in conjunction with and/or by at least a part of any one or more of the systems described elsewhere herein. Additionally or alternatively, in embodiments, at least a portion of each of the methods of FIGS. 6A-6E may be performed in conjunction with at least a portion of any one or more of the other methods of FIGS. 6A-6E, and/or as described elsewhere herein.

Generally speaking, each of the methods discussed with respect to FIGS. 6A-6E is directed to identifying and labeling distinct objects within source images for training machine-learning based models that are used to autonomously control and/or operate vehicles. A source image may be one of a plurality of source images that are processed to generate or mine training data therefrom for training the models that (or that will) operate and/or control autonomous vehicles, for example. The processing of each of the source images includes distinguishing and/or identifying respective subsets of data points included in a total set of data points of which the source image comprises as being representative of respective, distinct objects located within the environment depicted by the source image, and associating respective labels therewith, thereby indicating various categories, classifications, or other indications of types of distinct objects represented by the respective subsets of data points.

Figure 6A:
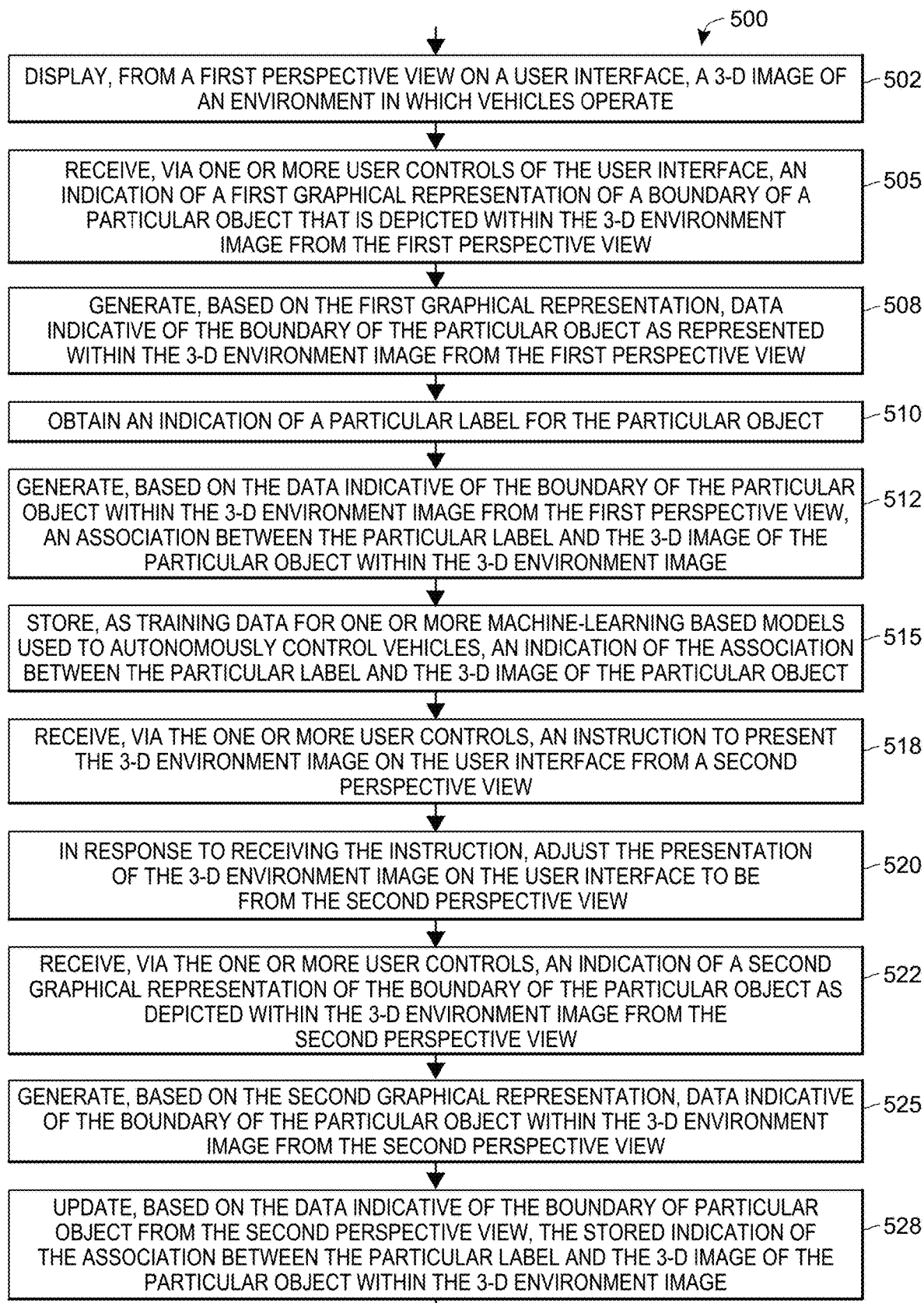
FIGS. 6A-6E each include a respective flow chart of a respective, exemplary method of identifying and labeling objects within images for training machine-learning based models that are used to autonomously operate and/or control vehicles.

FIG. 6A depicts a flow chart of an example computer-implemented method 500 for identifying and/or distinguishing and labeling distinct objects that are depicted within images for training machine-learning based models that are used to autonomously control and/or operate vehicles. The method 500 includes displaying, on a user interface, a three-dimensional (3-D) image of an environment in which vehicles operate (block 502), where the 3-D environment image depicts one or more physical objects located in the environment, and where the 3-D environment image is presented on the user interface from a first perspective view. Generally speaking, the 3-D environment image is made up of a set of data points. For instance, the 3-D environment image may comprise a point cloud dataset generated by one or more lidar camera devices mounted on a vehicle traversing through the environment. In other embodiments, the data points that make up the 3-D environment image include one or more other types of data (e.g., sonar data, infrared data, etc.) that has been generated by one or more other types of active sensing systems or devices. In some embodiments, at least a part of the 3-D environment image is constructed from one or more 2-D images of the environment. For example, at least a part of the 3-D environment image may be constructed by image processing and/or otherwise combining information provided by multiple RGB images of the environment that were obtained by different RGB cameras disposed at different locations within the environment. In some usage scenarios, the 3-D environment image may include one or more composite images of various objects located within the environment, where the one or more composite images have been generated from layering data points that are natively included in the 3-D environment image with corresponding native data points of a 2-D image of the environment, such as discussed above with respect to FIGS. 5J and 5K.

The method 500 also includes receiving, via one or more user controls provided by the user interface, an indication of a first graphical representation of a boundary of a particular object as depicted within the 3-D environment image from the first perspective view (block 505). That is, a user may utilize one or more user controls to draw or otherwise create the first graphical representation of the boundary of the particular object within the 3-D environment image from the first perspective view. The first graphical representation may be of any desired format, such as a 3-D bounding box or set of lines, a 3-D lane marking, a 3-D painted surface area, or any other suitable graphical representation. The first graphical representation may be generated by any of the features 215, 218, 220, 222 of the tool 160 described above, for example.

The method 500 includes generating, based on the first graphical representation, data indicative of the boundary of the particular object within the 3-D environment image from the first perspective view (block 508). For example, the first graphical representation of the boundary of the particular object may define or otherwise indicate a particular subset of data points of the 3-D image from the first perspective view that, in turn, represents a particular, distinct object located in the environment. For example, data points that are encompassed by the first graphical representation may represent a particular distinct object, data points that are painted over by the first graphical representation may represent a particular, distinct object, etc. The generated data indicative of the boundary of particular object may indicate, in an embodiment, the particular subset of data points within the 3-D source image that represent the particular distinct object, and/or the particular data points within the 3-D source image that do not represent the particular distinct object.

Additionally, the method 500 includes obtaining an indication of a particular label for the particular, distinct object (block 510). In an embodiment, the indication of the particular label for the particular object may be obtained via the user interface, for example, via a user selection of a label from a drop-down menu or similar, or via a user entering a free-form text label via the user interface. In an embodiment, the indication of the particular label for the particular object may be automatically generated, e.g., by the tool 160. For example, the tool 160 may automatically generate the particular label based on the data indicative of the boundary the particular object within the 3-D environment image from the first perspective view. In an example implementation of automatic labeling, at least some of the data indicative of the boundary of the particular object may be input into a label prediction model that has been previously trained based on distinguished/identified and labeled objects depicted within a plurality of historical images of one or more environments in which vehicles operate, and the label prediction model may automatically generate a label based on the input data. In some embodiments, the tool automatically generates a draft label (e.g., via the label prediction model or via some other means), and the user may accept or approve the automatically-generated draft label, or the user may modify the automatically-generated draft label as desired, and then accept or approve the modified label for association with the indicated particular, distinct object depicted within the 3-D environment image from the first perspective view.

The method 500 may include generating, based on the data indicative of the boundary of the particular object within the 3-D environment image from the first perspective view, an association between the particular label and a 3-D image of the particular object within the 3-D environment image (block 512), thereby distinguishing the 3-D image of the particular object within the 3-D environment image. The method 500 may further include storing an indication of the association between the particular label and the 3-D image of the particular object within the 3-D environment image in one or more tangible, non-transitory memories as a part of a training data set utilized to train one or more machine-learning based models (block 515), where the one or more machine-learning based models are used to autonomously operate and/or control vehicles. In some embodiments, an indication of the particular label may be stored in conjunction with each data point included in the subset of data points of the 3-D image of the particular object within the 3-D image.

Additionally, the method 500 includes receiving, via the one or more user controls, an instruction to present the 3-D environment image on the user interface from a second perspective view different than the first perspective view (block 518). Based on the received instruction, the method 500 may adjust or modify a presentation of the 3-D environment image on the user interface to be from the second perspective view (block 520). Adjusting the presentation of the 3-D environment image to be from the second perspective view 520 may include rotating, in three dimensions, the 3-D environment image displayed on the user interface from the first perspective view, and/or rotating the virtual camera angle from which the 3-D environment image is presented. Additionally or alternatively, adjusting the presentation of the 3-D environment image 520 may include scaling and/or translating the presentation of the 3-D environment image in three dimensions and/or the virtual camera angle from which the 3-D environment image is presented. In an example implementation, the 3-D environment image may be included in a virtual reality representation of the environment. As such, in this example implementation, receiving the instruction to present the 3-D environment image from a second perspective view 518 may include receiving an indication of one or more spatial user interactions with the virtual reality environment, and adjusting the presentation of the 3-D environment image based on the received instruction 520 may include adjusting the presentation of the 3-D environment image in accordance with the one or more spatial user interactions.

The method 500 may include receiving, via the one or more user controls, an indication of a second graphical representation of the boundary of the particular object as depicted within the 3-D environment image from the second perspective view (block 522), and generating, based on the second graphical representation, data indicative of the boundary of the particular object within the 3-D environment image from the second perspective view (block 525). In an embodiment, receiving the second graphical representation of the boundary the particular object as depicted within the 3-D environment image from the second perspective view (block 522) and generating data indicative of the particular object based on the second graphical representation (block 525) may be performed in a manner similar to that discussed above for the blocks 505 and 508.

In some embodiments, though, receiving the indication of the second graphical representation of the boundary of the particular object (block 522) comprises receiving a modification to a draft or interim graphical representation of the boundary of the particular object. In such embodiments, the method 500 may include (e.g., at some time prior to receiving the indication of the second graphical representation 522, and not shown in FIG. 6A), automatically generating and displaying a draft or interim graphical representation of the boundary of the particular object within the 3-D environment image from the second perspective view, e.g., by the tool 160, and/or upon adjusting the presentation of the 3-D environment image to be from the second perspective view (block 520). In an example implementation, the draft or interim graphical representation of the boundary of the particular object may be automatically generated by using a boundary prediction model that has been trained based on distinguished/identified, distinct objects depicted within a plurality of historical images of one or more environments in which vehicles operate. For example, data indicative of the first graphical representation of the boundary and/or data indicative of the change in or adjustment to the displayed perspective view of the source image may be input into the boundary prediction model, and the boundary prediction model may output the draft or interim graphical representation based on its received input.

Accordingly, in such embodiments in which a draft or interim graphical representation is automatically generated, the modification received at the block 522 may be applied to the draft or interim graphical representation, and accordingly, the modified draft/interim graphical representation may be the second graphical representation indicative of the boundary of the particular object within the 3-D environment image from the second perspective view. At any rate, irrespective of whether the second graphical representation is manually generated, is automatically generated, or is generated by using some combination of manual and automatic generation techniques, data indicative of the boundary of the particular object within the 3-D environment image from the second perspective view may be generated based on the second graphical representation (block 525).

At the block 528, the method 500 may include updating, based on the data indicative of the boundary of the particular object within the 3-D environment image from the second perspective view, the stored indication of the association between the particular label and the 3-D image of the particular object within the 3-D environment image (block 528), thereby refining the distinguishing of the 3-D image of the particular object within the 3-D environment image.

In some embodiments (not shown in FIG. 6A), the method 500 includes displaying a 2-D image of the environment in conjunction with displaying 3-D image of the environment (block 502) on the user interface. The 2-D image may have been captured by one or more passive imaging devices, systems, and/or cameras, such as an RGB camera or sensors that measure reflected light that has been emitted by the sun or by other external or third-party light sources, and the 2-D image and the 3-D image may have been captured at a similar or same time. For example, each of the 2-D image and the 3-D image may have a respective timestamp indicative of its time of capture, and the two timestamps may differ by only a short time interval (e.g., within a time interval of a half a second, within a time interval of one second, etc.). In arrangements in which the 2-D image is included in a 2-D video and the 3-D image is included in the 3-D video, the 2-D and 3-D videos may be played or otherwise presented on the user interface and a time-synchronized manner, e.g., in a manner such as previously described above.

In some embodiments, when the user has focused on a particular subset of data points included in the 3-D image of the environment that represent a distinct object (e.g., by manually selecting or otherwise indicating a cluster of group of data points included in the 3-D environment image), corresponding 2-D perspective views of the particular subset of data points that represent the particular object of focus may be displayed in respective portions of the user interface in conjunction with the display of the 3-D image on the user interface. For example, a top or overhead 2-D perspective view of the particular subset of data points may presented in a first portion of the user interface, and a side, 2-D perspective view of the particular subset of data points may be presented in a second portion of the user interface.

At any rate, the inclusion of various 2-D images on the user interface (e.g., a 2-D image of the environment that has been captured using passive sensing technology, and/or one or more 2-D images that provide different 2-D perspective views of the subset of data points included in the object of focus within the 3-D image) in conjunction with the 3-D environment image allows a user to more easily visually discern, distinguish, and/or identify particular, distinct objects that are located in the environment depicted by the 3-D environment image, and thereby more quickly and accurately define the boundaries of said objects as depicted within the 3-D environment image.

In some embodiments (not shown in FIG. 6A), the method 500 may include tracking the particular, distinct object across numerous frames, e.g., in scenarios in which the 3-D image is one of a plurality frames of a 3-D video. For example, after the particular, distinct object has been identified/discerned within a first frame (e.g., via the first graphical representation and/or the second graphical representation), a draft graphical representation of the boundary of the particular, distinct object within a second frame may be automatically generated upon the second frame being displayed on the user interface. In an implementation, the draft or interim graphical representation of the boundary of the particular object within the second frame may be automatically generated by using a boundary prediction model that has been trained based on distinguished/identified, distinct objects depicted within a plurality of historical images of one or more environments in which vehicles operate. For example, data indicative of the first graphical representation of the boundary within the first frame, data indicative of the second graphical representation of the boundary within the first frame, and/or data indicative of a subset of the data points included in the second frame may be input into the boundary prediction model, and the boundary prediction model may output the draft or interim graphical representation based on its received input. The user may accept or approve the draft or interim graphical representation that has been automatically generated for the object in the second frame. Alternatively, the user may modify or alter the draft or interim graphical representation within the second frame, and subsequently accept or approve the modified, draft or interim graphical representation as the defined graphical representation of the boundary of the particular object within the second frame. The label of the particular object (e.g., as previously associated in the first frame) may be automatically associated with the defined graphical representation of the boundary of the particular object within the second frame, an indication of said association may be stored as yet additional training data for the autonomous vehicle operation/control models.

The method 500 may include additional, less, or alternate actions, including those discussed elsewhere herein, e.g., in conjunction with other embodiments. In an example implementation, an embodiment of the method 500 may generate one or more of the displays and/or may utilize one or more of the features discussed with respect to FIGS. 5B-5E.

Figure 6B:
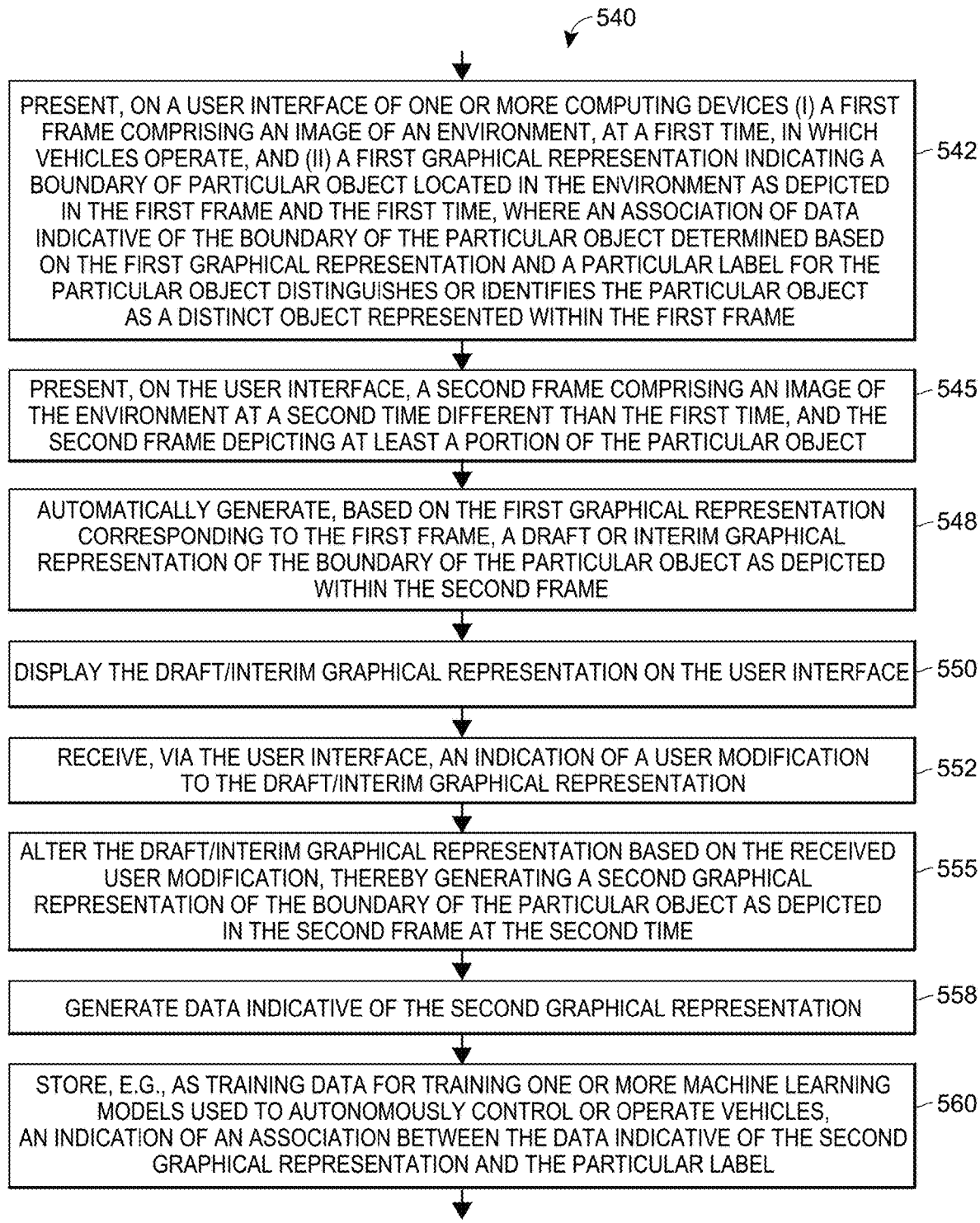

FIG. 6B depicts a flow chart of an example computer-implemented method 540 for identifying and/or distinguishing and labeling distinct objects depicted within images for training machine-learning based models that are used to autonomously control and/or operate vehicles. The method 540 includes presenting, on a user interface of one or more computing devices, (i) a first frame comprising an image of an environment, at a first time, in which vehicles operate, the first frame depicting one or more physical objects located in the environment, and (ii) a first graphical representation indicating a boundary of a particular object located in the environment as depicted in the first frame at the first time (block 542). Specifically, an association of data indicative of the boundary of the particular object as depicted within the first frame at the first time and a particular label of the particular object (i) distinguishes an image of the particular object within the first frame and (ii) is stored in one or more tangible, non-transitory memories as a part of a training data set utilized to train one or more machine-learning based models, where the one or more machine-learning based models used to autonomously operate and/or control vehicles. The first graphical representation may include any one or more graphical representations that are provided by the system or tool 160 as discussed above, e.g., bounding boxes, painting, line marking, layering, and/or other types of graphical representations, and may have been generated with or without human input.

The method 540 also includes presenting, on the user interface, a second frame comprising an image of the environment at a second time different than the first time, where the second frame depicts at least a portion of the particular object (block 545); and automatically generating, based on the first graphical representation of the boundary of the particular object as depicted in the first frame, a draft or interim graphical representation of the boundary of the particular object as depicted within the second frame (block 548). In an embodiment, automatically generating, based on the first graphical representation, the interim graphical representation of the boundary of the particular object as depicted within the second frame includes copying the first graphical representation from the first frame to the second frame, e.g., copying a size, orientation, and/or location of the first graphical representation. In another embodiment, automatically generating, based on the first graphical representation, the interim graphical representation of the boundary of the particular object as depicted within the second frame includes automatically predicting or determining that a particular subset of data points included in the second frame corresponds to the image of the particular object as depicted within the second frame, and presenting the interim graphical representation within the second frame at a location corresponding to the predicted or determined subset of data points. The automatic prediction may be based on, for example, the data indicative of the boundary of the particular object as depicted within the first frame, image processing at least a portion of the second frame, and/or one or more suitable data analytics techniques. For instance, the automatic prediction may utilize a boundary prediction model that has been trained based on identified objects depicted within a plurality of historical images of one or more environments in which vehicles operate, and in particular, historical images that include ordered and/or time-sequenced frames therein. The data indicative of the boundary of the particular object as depicted within the first frame and/or data indicative of at least a portion of data points included in the second frame may be input into the boundary prediction model, and based on its input, the boundary prediction model may generate the interim graphical representation, for example. At any rate, irrespective of the techniques utilized automatically generate interim graphical representation (block 548), the interim graphical representation may be presented, on the user interface, within the second frame upon its automatic generation (block 550).

The method 540 may include receiving, via the user interface, an indication of a user modification to the interim graphical representation (block 552). For example, the indication of the user modification may include an indication of a modification to a visual property, orientation, size, configuration, and/or other property of the interim graphical representation. The method 540 may further include altering, based on the received indication of the user modification, the interim graphical representation to thereby generate a second graphical representation of the boundary of the particular object as depicted in the second frame at the second time (block 555); and generating data indicative of the second graphical representation of the boundary of the particular object as depicted within the second frame (block 558).

Additionally, the method 540 may include storing, in the one or more tangible, non-transitory memories, an association of the data indicative of the boundary of the particular object as depicted in the second frame at the second time and the particular label of the particular object as a part of the training data set utilized to train machine-learning models that autonomously operate and/or control vehicles, e.g., in conjunction with the association of data indicative of the boundary of the particular object as depicted within the first frame at the first time and the particular label of the particular object. In an embodiment, an indication of the particular label may be stored in conjunction with each pixel or data point that has been determined to be included in the representation of the particular object in the second frame.

In an embodiment, the first frame and the second frame operated on by the method 540 are included in a 2-D video that was generated by one or more passive sensing devices, systems, or cameras. For example, the first frame and the second frame may be included in a 2-D video that was generated by one or more RGB video cameras by measuring reflected light within the environment that was generated and/or emitted by the sun or by other external or third-party light sources, and generating the 2-D video therefrom.

In another embodiment, the first frame and the second frame operated on by the method 540 are included in the 3-D video that was generated by one or more active sensing devices, systems, or cameras. For example, the first frame and the second frame may be included in a 3-D video that was generated by one or more active cameras by generating and transmitting electromagnetic waves into their environment, measuring the backscatter that was reflected back to the 3-D cameras, and generating the 3-D video therefrom. In an example implementation, the one or more active cameras that generated the 3-D video include one or more lidar cameras, and the 3-D video comprises point cloud data. In this embodiment, as the first frame and the second frame are respective 3-D images, their respective presentations on the user interface able to be manipulated, changed, or varied in three dimensions so as to be viewed from different 3-D perspective views. Thus, in some scenarios, the perspective view of the environment as depicted in the second frame may be changed, by the user, to be different than the perspective view of the environment as depicted in the first frame.

The method 540 may include additional, less, or alternate actions, including those discussed elsewhere herein, e.g., in conjunction with other embodiments. In an example implementation, an embodiment of the method 540 may generate one or more of the displays and/or may utilize one or more of the features discussed with respect to FIGS. 5B-5E.

Figure 6C:
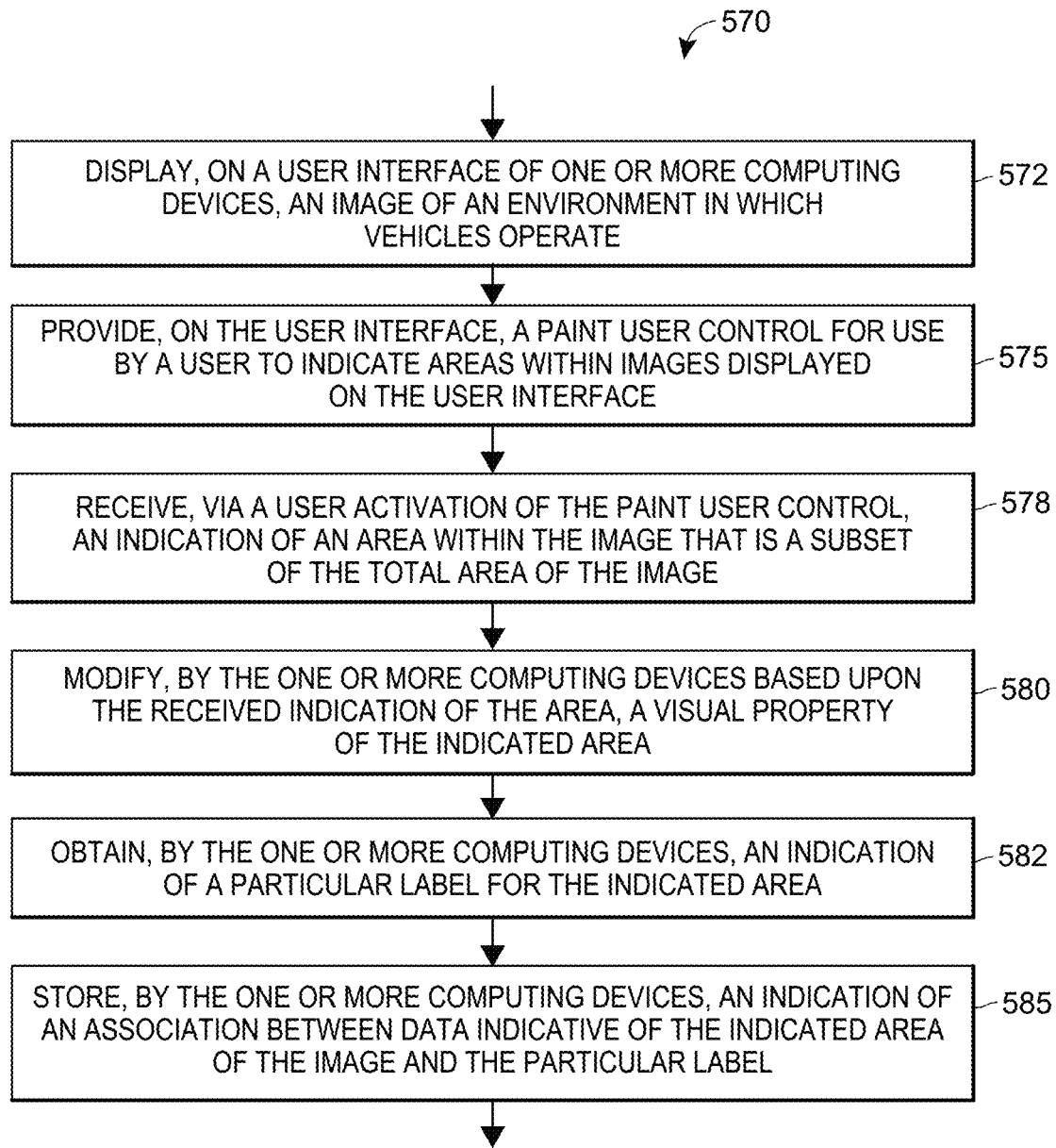

FIG. 6C depicts a flow chart of an example computer-implemented method 570 for identifying and/or distinguishing and labeling distinct objects that are depicted within images for training machine-learning based models that are used to autonomously control and/or operate vehicles. The method 570 includes displaying, on a user interface of one or more computing devices, an image of an environment in which vehicles operate (block 572), where the image depicts one or more physical objects located in the environment, and providing, via the user interface, a paint user control for use by a user to indicate, distinguish, and/or identify areas within images displayed on the user interface as particular distinct objects (block 575).

The method 570 also includes receiving, via a user activation of the paint user control, an indication of an area within the image that is to be "painted" (block 578), e.g., an indication of an area within the image to which a visual property is to be applied, removed, or modified. The indicated area of the image typically is a subset of a total area of the image, and typically depicts a surface area located in the environment, such as a road, a driveway, the ground, the side of a guard rail or retaining wall, or another type of surface, which may be essentially planar (such as a flat road), or may be limited in its changes in elevation throughout the surface area (such as a hilly road). Further, the method 570 includes modifying, by the one or more computing devices and based upon the received indication of the area, a visual property of the indicated area (block 580), to thereby distinguish the area as a distinct object within the source image.

In an embodiment, the user activation of the paint user control received at the block 578 is sole or single user action (e.g., "one-click" or "point-and-fill"), such as a single mouse click while hovering the mouse over a particular location, that automatically causes the visual property of the entirety of the area to be modified (block 580). As such, with one-click or point-and-fill painting, the user no longer needs to first block out, outline, or trace the boundaries of a surface area that is to be painted over using a first set of user actions, and then use additional user actions to paint or effect the modified visual property over the defined surface area. Instead, a user merely points and clicks once on a single location on the source image (block 578), and the tool 160 automatically determines a contiguous surface area that includes the clicked location and applies, removes, or modifies a visual property of the contiguous surface area (block 580).

In this embodiment, automatically determining a contiguous surface area in which the clicked location is included may be performed by the method 570 by utilizing an object identification model that has been trained based on identified (and possibly labeled) objects depicted within a plurality of historical images of one or more environments in which vehicles operate. Accordingly, the indication of the location selected by the user via the paint user control and/or at least some of the data points included in the source image may be provided as input to the object identification model, and based on its input, the object identification model may generate the contiguous surface area corresponding to the clicked location.

In some embodiments, the paint user control may be additionally or alternatively utilized as a paint brush, a paint spill, an eraser, or any desired type of usage to thereby indicate areas within the source image that are to be labeled, e.g., such as previously described with respect to FIGS. 5F and 5G. Accordingly, in these embodiments, the block 580 may include using multiple user actions or interactions with the paint user control to modify the visual property of an indicated area.

The method 570 additionally includes obtaining, by the one or more computing devices, an indication of a particular label for the indicated area of the image (block 582). In an embodiment, the indication of the particular label for the particular object may be obtained via the user interface, for example, via a user selection of a label from a drop-down menu or similar, or via a user entering a free-form text label via the user interface. In an embodiment, the indication of the particular label for the particular object may be automatically generated. For example, the tool 160 may automatically generate the particular label based on the user-indicated area within the 3-D environment image. In an example implementation of automatic labeling, at least some of data indicative of the user-indicated area may be input into a label prediction model that has been previously trained based on distinguished/identified and labeled objects depicted within a plurality of historical images of one or more environments in which vehicles operate, and the label prediction model may automatically generate a label based on the input data. In some embodiments, the tool automatically generates a draft label (e.g., via the label prediction model or via some other means). The user may accept or approve the automatically-generated draft label, or the user may modify the automatically-generated draft label as desired, and then accept or approve the modified label for association with the indicated particular, distinct object depicted within the 3-D environment image from the first perspective view.

In some embodiments, the label is included in a plurality of labels, each of which is associated with a different type of surface area, and each of which is denoted by a different visual property. For example, the label "road" may be denoted by the color red, whereas the label "ice patch" may be denoted by flashing.

It is noted that the block 582 may be performed by the method 570 either prior to or upon the execution of blocks 578, 580. In an example scenario, a user may first select and modify a visual property of a particular surface area depicted within the source image via the blocks 578, 580, and subsequently may obtain a corresponding label via the block 582. In another example scenario, a user may first obtain a label via the block 582, and subsequently may select and modify the visual property of one or more surface areas that are depicted within the source image that are to be associated with the obtained label via the blocks 578, 580.

The method 570 additionally includes storing, by the one or more computing devices in one or more tangible, non-transitory memories, an indication of an association between data indicative of the indicated area of the image and the particular label (block 585), thereby distinguishing the indicated area from other areas of the image. In an embodiment, an indication of the particular label may be stored in conjunction with each pixel or data point that has been determined to be included in the representation of the surface area of focus within the source image.

The method 570 may include additional, less, or alternate actions, including those discussed elsewhere herein, e.g., in conjunction with other embodiments. For example, the method 550 may be executed conjunction with the Hide/Unhide feature provided by the tool 160. In an example implementation, an embodiment of the method 570 may generate one or more of the displays and/or may utilize one or more features discussed with respect to FIGS. 5F-5G.

Figure 6D:
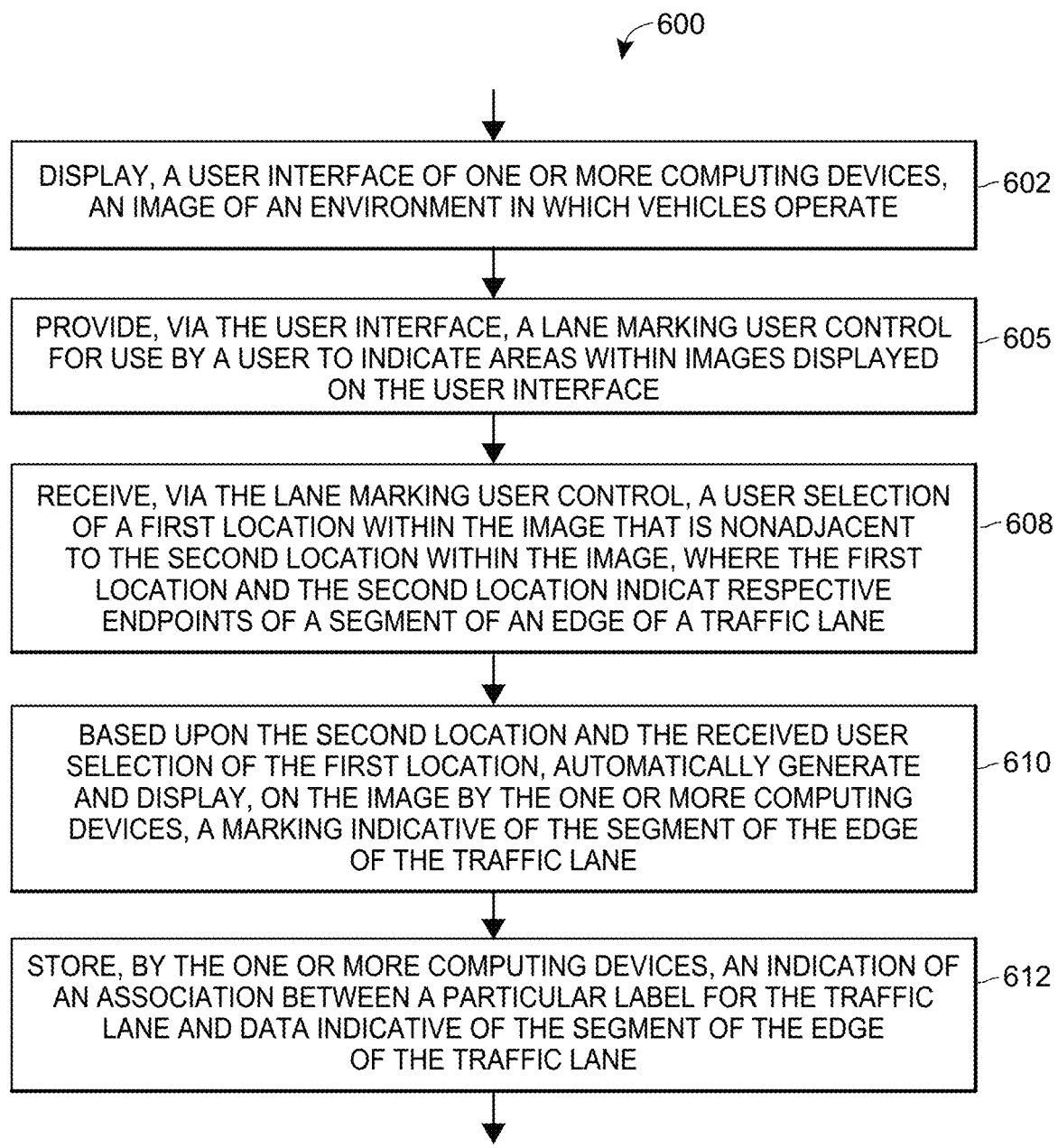

FIG. 6D depicts a flow chart of an example computer-implemented method 600 for identifying/distinguishing and labeling distinct objects that are depicted within images for training machine-learning based models that are used to autonomously control and/or operate vehicles. The method 600 includes displaying, on a user interface of one or more computing devices, an image of an environment in which vehicles operate (block 602), where the image depicts one or more physical objects located in the environment; and providing, on the user interface, a lane-marking user control for use by a user to indicate lane markings within the image (block 605).

The method 600 also includes receiving, via the lane-marking user control, a user selection of a first location within the image that is non-adjacent to a second location within the image (block 608). The first location and the second location indicate respective endpoints of a segment of an edge of a traffic lane depicted within the image of the environment, in an example. The edge of the physical traffic lane may be physically marked within the physical environment, e.g., by painted lines, raised or flat pavement markers, reflectors, etc., or the edge of the physical traffic lane may not be physically marked within the physical environment, such as when the physical traffic lane is a gravel road or a dirt road. While the first location is selected by the user (block 608), the second location may be manually or automatically indicated. For example, in an embodiment, the method 600 may receive a user selection of the second location. In another embodiment, the second location may be automatically determined, e.g., by using one or more image processing techniques.

The method 600 includes, based upon the second location and the received user selection of the first location, automatically generating and displaying on the image, by the one or more computing devices, a marking indicative of the segment of the edge of the traffic lane (block 610). For example, the marking indicative of the segment of the edge of the traffic lane may be represented by a line or other suitable indicator. Additionally, the method includes storing, by the one or more computing devices in one or more tangible, non-transitory memories, an indication of an association between a particular label for the traffic lane and data indicative of the segment of the edge of the traffic lane (block 612), thereby distinguishing the traffic lane from other areas and/or objects depicted within the image. In an embodiment, an indication of the particular label may be stored in conjunction with each pixel or data point that has been determined to be included in the representation of the edge of the traffic lane of focus within the source image.

In an embodiment (not depicted in FIG. 6D), the method 600 may further include automatically determining, by the one or more computing devices and based upon the data indicative of the edge of the traffic lane, a second segment of the edge of the traffic lane that abuts the first segment. For example, the one or more computing devices may perform an image analysis of a portion of the source image that surrounds the first location or that surrounds a second location, and determine a third location to which the edge of the traffic lane extends from either the first location or the second location. The method 600 may automatically generate and display a second marking indicative of the second segment of the edge of the traffic lane, where the second segment has an endpoint at the third location, and may store, and the one or more memories, an indication of an association between the particular label and data indicative of the second segment of the edge of the traffic lane, thereby further establishing the traffic lane from other areas and/or objects depicted within the source image. In some situations, the second marking may be a draft or interim marking which the user may modify to generate a modified second marking to thereby indicate the second segment of the edge of the traffic lane abutting the first segment.

In an embodiment (not shown), the method 600 may be performed in conjunction with adjusting the perspective view from which the source image is presented on the user interface, e.g., when the source image is a 3-D image, thereby allowing the user to have more accuracy in selecting the first location, for example.

In an embodiment, the method 600 may be executed across multiple frames of a video. For example, the block 602-612 may be performed for first frame of the video to thereby mark and label a first segment of the edge of the traffic lane. Subsequently (not shown in FIG. 5D), a second frame may be presented on the user interface where the second frame depicts at least a part of the traffic lane that was marked and labeled in the first frame. In this embodiment, the method 600 may automatically determine, based upon the data indicative of the first segment of the edge of the traffic lane, at least one endpoint of an abutting segment of the edge of the traffic lane that is displayed in the second frame, and may automatically mark the abutting segment in the second frame. For example, the abutting segment may be determined based upon image analysis that is performed on the second frame, and/or based on data indicative of the first segment of the edge of the traffic lane represented in the first frame. The user may approve the automatically generated and marked abutting segment, or the user may make desire modifications thereto prior to approval. The method 600 may include storing, in the one or more memories, an indication of an association between the particular label for the traffic lane and data indicative of the abutting segment of the edge of the traffic lane as depicted within the second frame.

The method 600 may include additional, less, or alternate actions, including those discussed elsewhere herein, e.g., in conjunction with other embodiments. In an example implementation, an embodiment of the method 600 may generate one or more of the displays and/or may utilize one or more features discussed with respect to FIGS. 5H-5I.

Figure 6E:
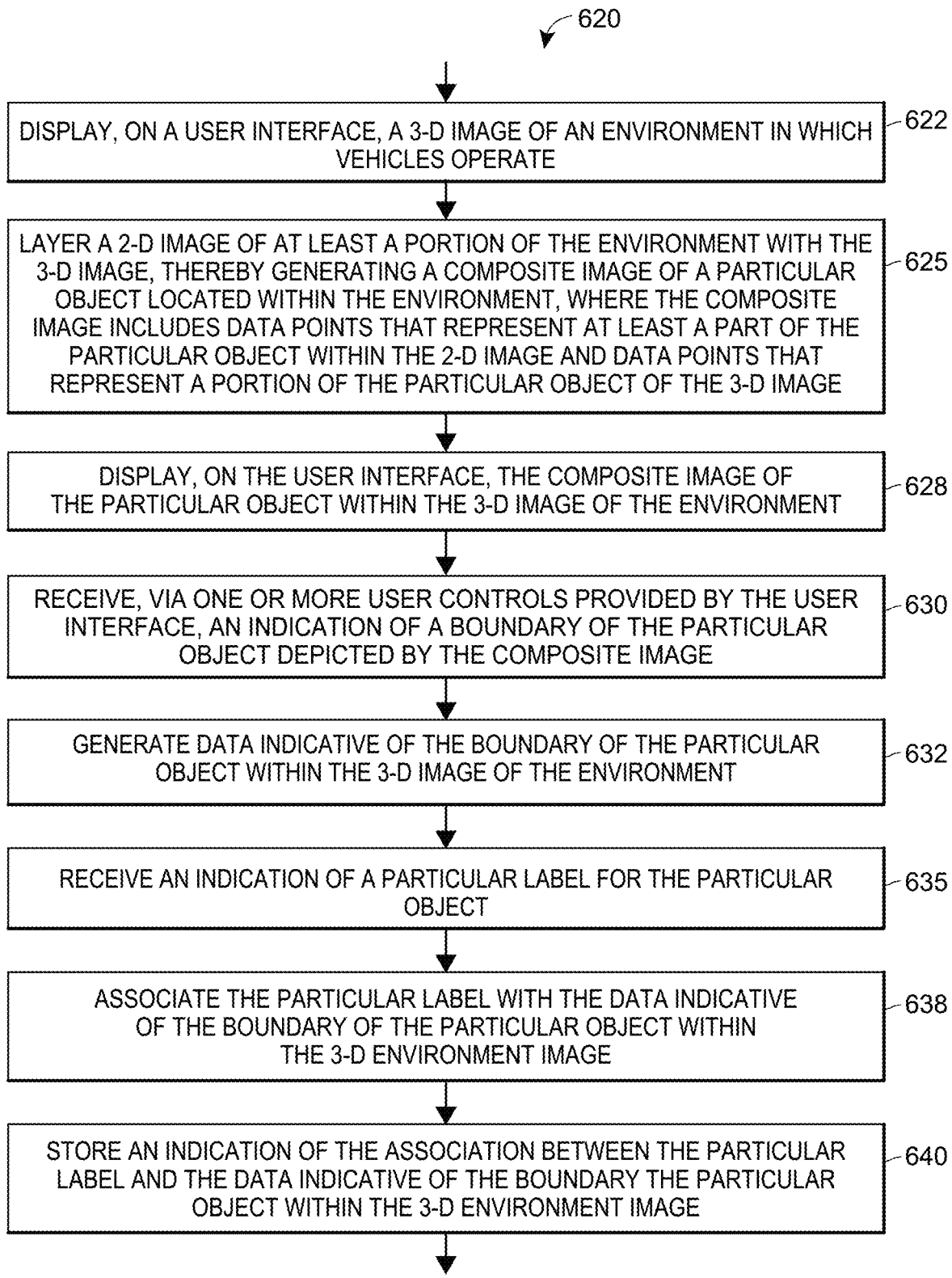

FIG. 6E depicts a flow chart of an example computer-implemented method 620 for identifying and/or distinguishing and labeling distinct objects depicted within images for training machine-learning based models that are used to autonomously control and/or operate vehicles. The method 620 includes displaying, on a user interface, a three-dimensional (3-D) image of an environment in which vehicles operate (block 622), where the 3-D environment image depicts one or more physical objects located in the environment, and where the 3-D environment image is able to be displayed from multiple perspective views on the user interface in response user input. In an embodiment, the 3-D image comprises a point cloud dataset generated by one or more active sensing devices located within the environment.

The method 620 also includes layering a two-dimensional (2-D) image of at least a portion of the environment with the 3-D environment image, where the 2-D environment image depicts a particular physical object, at least a part of which is also depicted in the 3-D environment image (block 625). For example, a portion of the 2-D image that represents a particular object may be overlaid onto a portion of the 3-D image that also represents the particular object, and respective overlay data points of the 2-D and 3-D images may be associated, linked, combined, or integrated, thereby generating a composite image of the particular physical object, where the composite image of the particular physical object includes both a portion of the 2-D environment image and a portion of the 3-D environment image. In an embodiment, layering at least a portion of the 2-D image on the 3-D image (block 625) may be performed in response to a user action, such as the user dragging and dropping the 2-D image (or, a selectable object included therein) onto the 3-D image, or the user indicating that the tool 106 should enter into a layering mode. The method 620 includes displaying, on the user interface, the composite image of the particular object within the 3-D image of the environment (block 628).

Further, the method 620 includes receiving, via one or more user controls provided by the user interface, an indication of a boundary of the particular physical object depicted by the composite image within the 3-D environment image (block 630). For example, a user may indicate the boundary via a graphical representation such as a bounding box, a paint treatment, a lane marking, or any other suitable graphical representation. In an embodiment, a draft or interim boundary of the particular physical object depicted by the composite image may be automatically generated, e.g., by using one or more of the analytic techniques described above, and the user may modify the draft or interim boundary via the user controls provided by the user interface (block 630). At any rate, whether the boundary of the composite object is manually generated, automatically generated, or generated via combination of manual and automatic methods, the method 620 may include generating data indicative of the boundary of the particular physical object within the 3-D environment image (block 632), for example, based upon the graphical representation indicated or approved by the user.

Still further, the method 620 includes receiving an indication of a particular label for the particular physical object (block 635); associating the particular label in with the data indicative of the boundary of the particular physical object within the 3-D environment image (block 638), thereby distinguishing the particular physical object within the 3-D environment image; and storing an indication of the association between the particular label and the data indicative of the boundary of the particular physical object within the 3-D environment image in one or more tangible memories as a part of a training data set utilized to train one or more machine-learning based models (block 640), the one or more machine-learning based models used to autonomously operate vehicles. In an embodiment, an indication of the particular label may be stored in conjunction with each pixel or data point included in the composite object, irrespective of a pixel/data point being native to the 2-D image or being native to the 3-D image.

Composite object images may be viewed from different 3-D perspectives as composite object images inherently include data points native to the 3-D image. As such, a composite object may be presented on the user for interface in concert with various perspective views from which the 3-D image is presented on the user interface, and information provided by the native 2-D data points that are integrated with the 3-D data points may be presented in concert with various perspective views of the 3-D image. Indeed, in scenarios in which the 3-D image is included in a 3-D video, a user may dynamically vary the perspective view from which the 3-D video is displayed while the video is playing, and as such the perspective view from which any composite object images depicted therein will also dynamically vary in accordance with the 3-D video. A user may pause the video at any frame and in any perspective view to define and/or refine a boundary of a composite object. Accordingly, the boundary of a composite object may be defined and/or refined across multiple perspective views and/or multiple frames, and respective data indicative thereof may be stored in conjunction with the label for the composite object as training data.

The method 620 may include additional, less, or alternate actions, including those discussed elsewhere herein, e.g., in conjunction with other embodiments. In an example implementation, an embodiment of the method 620 may generate one or more of the displays and/or may utilize one or more features discussed with respect to FIGS. 5J-5K.

General Considerations

Embodiments of the techniques described in the present disclosure may include any number of the following aspects or features, either alone or in combination:

1. A computer-implemented method for identifying and labeling objects within images for training machine-learning based models that are used to autonomously operate vehicles, the method comprising: displaying, on a user interface of one or more computing devices, an image of an environment in which vehicles operate, the image depicting one or more physical objects located in the environment; providing, on the user interface, a paint user control for use by a user to indicate areas within images displayed on the user interface; and receiving, via a user activation of the paint user control, an indication of a location within the image.

The method further includes: based upon the indicated location, (i) automatically determining, without any additional user input aside from the user activation, an area within the image, the area within the image being a subset of a total area of the image, the area including the indicated location and other locations within the image, and the area representing a surface area depicted in the image of the environment, and (ii) automatically modifying, by the one or more computing devices, a visual property of the automatically determined area; obtaining, by the one or more computing devices, an indication of a particular label for the automatically determined area of the image; and storing, by the one or more computing devices in one or more tangible, non-transitory memories, an indication of an association between data indicative of the automatically determined area of the image and the particular label, thereby distinguishing the surface area from other physical objects depicted within the image.

2. The method of aspect 1, wherein the particular label is included in a plurality of labels of a plurality of areas and/or physical objects, and wherein each label included in the plurality of labels corresponds to a respective visual property.

3. The computer-implemented method of aspect 1, wherein the user activation of the paint user control consists of only a single mouse click.

4. The computer-implemented method of aspect 1, wherein the automatically determined area within the image is a first area and the visual property is a first visual property, and the method further comprises modifying a second area within the image with the first visual property or with a second visual property, the second area being another subset of the total area of the image, and the modifying of the second area based on a usage of the paint user control as a virtual paint brush, a virtual paint spill, or another type of usage of the paint user control.

5. The computer-implemented method of aspect 4, wherein the usage of the paint user control is as the virtual paint brush, and modifying the second area with the first visual property or the second visual property comprises the user manipulating the virtual paint brush across the second area within the image.

6. The computer-implemented method of aspect 5, wherein a width of the virtual paintbrush is modifiable.

7. The computer-implemented method of aspect 1, wherein receiving, via the user activation of the paint user control, the indication of the location within the image comprises receiving an indication of the user activation of the paint user control while a cursor or electronic pointer controlled by the paint user control hovers over or points to the location.

8. The computer-implemented method of aspect 1, wherein receiving the indication of the area within the image comprises receiving an indication of a particular type of object depicted in the image.

9. The computer-implemented method of aspect 1, wherein surface area is an essentially planar surface area.

10. The computer-implemented method of aspect 1, wherein the surface area includes a road.

11. The computer-implemented method of aspect 1, wherein the surface area includes the ground.

12. The computer-implemented method of aspect 1, wherein automatically modifying the visual property of the automatically determined area comprises automatically applying the visual property to the automatically determined area.

13. The computer-implemented method of aspect 12, further comprising receiving, via the paint user control, an indication of a portion of the automatically determined area from which the particular visual property is to be removed.

14. The computer-implemented method of aspect 1, wherein automatically modifying the visual property of the automatically determined area comprises removing the visual property from the automatically determined area of the image.

15. The computer-implemented method of aspect 1, wherein automatically determining the area within the image comprises automatically determining the area within the image by utilizing an object identification model that has been trained based on identified objects depicted within a plurality of historical images of one or more environments in which vehicles operate.

16. The computer-implemented method of aspect 1, wherein the image of the environment is a two-dimensional (2-D) visual image of the environment generated by one or more passive sensing devices, systems, or cameras.

17. The computer-implemented method of aspect 1, wherein image of the environment comprises a dataset generated by one or more active sensing devices or systems.

18. The computer-implemented method of aspect 17, wherein the one or more active sensing devices or systems include one or more lidar devices.

19. The computer-implemented method of aspect 17, wherein dataset is a point cloud dataset.

20. The computer-implemented method of aspect 1, wherein the image of the environment is a three-dimensional (3-D) image of the environment.

21. The computer-implemented method of aspect 20, wherein the 3-D environment image is an interactive, three-dimensional (3-D) image of the environment.

22. The computer-implemented method of aspect 1, wherein storing the indication of the association between the data indicative of the automatically determined area of the image and the particular label comprises storing data indicative of the particular label in association with each pixel or data point included in the automatically determined area of the image.

23. The computer-implemented method of aspect 1, wherein the method further comprises: receiving, via the user interface, an instruction to hide respective images of one or more specific objects depicted within the image of the environment; and based on the received hiding instruction, rendering non-visible the respective images of the one or more specific objects depicted within the image of the environment while maintaining respective levels of visibility of other objects and/or areas within the image of the environment, thereby preventing the respective images of the one or more specific objects from being indicated via the paint user control.

24. The computer-implemented method of aspect 1, further comprising providing the stored data indicative of the association between the automatically determined area of the image and the particular label as training data for a machine-learning model that generates control signals to autonomously control one or more autonomous operations of a vehicle.

25. The computer-implemented method of aspect 1, wherein receiving the indication of the particular label is executed prior to receiving the indication of the location within the image.

26. The computer-implemented method of aspect 1, wherein receiving the indication of the location within the image is executed prior to receiving the indication of the particular label.

27. A system for identifying and labeling objects within images for training machine-learning based models that are used to autonomously operate vehicles, the system comprising: a communication module one or more processors; and one or more non-transitory, tangible memories coupled to the one or more processors and storing computer executable instructions thereon that, when executed by the one or more processors, cause the system to: display, on a user interface, an image of an environment in which vehicles operate, the image depicting one or more physical objects located in the environment; and provide, on the user interface, a paint user control for use by a user to indicate areas within the image.

The computer executable instructions, when executed by the one or more processors cause the system further to: receive, via the communication module, an indication of a user activation of the paint user control at a location within the image; based upon the indicated location, (i) automatically determine, without any additional user input aside from the user activation, an area within the image, the area within the image being a subset of a total area of the image, the area including the indicated location and additional locations within the image, and the area representing a surface area depicted in the image of the environment; and (ii) automatically modify, by the one or more computing devices, a visual property of the automatically determined area; obtain an indication of a particular label for the automatically determined area; and store, in the one or more tangible, non-transitory memories, an indication of an association between data indicative of the automatically determined area of the image and the particular label, thereby distinguishing the surface area from other physical objects depicted within the image.

28. The system of aspect 27, wherein the particular label is included in a plurality of labels of a plurality of areas and/or objects, and wherein each label included in the plurality of labels corresponds to a respective visual property.

29. The system of aspect 27, wherein the user activation of the paint user control to indicate the location within the image consists of only a single click or selection.

30. The system of aspect 27, wherein paint user control is configured to be further utilized by the user as a virtual paint brush, a virtual paint spill, or another type of user usage of the paint user control.

31. The system of aspect 30, wherein the paint user control is utilized as the virtual paint brush, and a user activation of the virtual paint brush includes the user manipulating the virtual paint brush across a desired area within the image.

32. The system of aspect 31, wherein a width of the virtual paint brush is modifiable.

33. The system of aspect 30, wherein the indication of the user activation of the paint user control at the location within the image comprises an indication of a user activation of the paint user control while a cursor or electronic pointer provided by the paint user control hovers over or points to the location within the image.

34. The system of aspect 27, wherein the automatic determination of the area within the image comprises a utilization of an object identification model that has been trained based on identified objects depicted within a plurality of historical images of one or more environments in which vehicles operate.

35. The system of aspect 27, wherein the surface area is essentially planar.

36. The system of aspect 27, wherein the surface area includes a road.

37. The system of aspect 27, wherein the surface area includes the ground.

38. The system of aspect 27, wherein the automatic modification of the visual property of the automatically determined area comprises an application of the visual property to the automatically determined area.

39. The system of aspect 27, wherein the automatic modification of the visual property of the automatically determined area comprises a removal of the visual property from the automatically determined area.

40. The system of aspect 27, wherein the image of the environment is a two-dimensional (2-D) visual image of the environment generated by one or more passive sensing devices, systems, or cameras.

41. The system of aspect 27, wherein image of the environment comprises a dataset generated by one or more active sensing devices or systems.

42. The system of aspect 41, wherein the one or more active sensing devices or systems include one or more lidar devices.

43. The system of aspect 41, wherein dataset is a point cloud dataset.

44. The system of aspect 27, wherein the image of the environment is a three-dimensional (3-D) image of the environment.

45. The system of aspect 44, wherein the 3-D environment image is an interactive, three-dimensional (3-D) image of the environment.

46. The system of aspect 27, wherein data indicative of the particular label is stored in particular association with each pixel or data point included in the automatically determined area of the image.

47. The system of aspect 27, wherein the computer executable instructions are further executable by the one or more processors to further cause the system to: receive, via the communication module, an indication of an instruction, received via the user interface, to hide respective images of one or more specific objects depicted within the image of the environment; and based on the received hiding instruction, render non-visible the respective images of the one or more specific objects depicted within the image of the environment while maintaining respective levels of visibility of other objects and/or areas within the image of the environment, thereby preventing the respective images of the one or more specific objects from being indicated via the paint user control.

48. The system of aspect 27, wherein the stored association distinguishing the surface area from other physical objects depicted within the image is included in a set of training data for a machine-learning model that generates control signals to autonomously control one or more operations of a vehicle.

49. The system of aspect 27, wherein the indication of the particular label for the surface area of the image is obtained prior to the reception of the indication of the user activation of the paint user control.

50. The system of aspect 27, wherein the indication of the user activation of the paint user control is received prior to the obtaining of the indication of the particular label for the surface area.

51. Any one of the previous aspects in combination with any other one of the previous aspects.

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately," "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed:

1. A computer-implemented method for identifying and labeling objects within images for training machine-learning based models that are used to autonomously operate vehicles, the method comprising:

displaying, on a user interface of one or more computing devices, a three-dimensional (3-D) image of an environment in which vehicles operate, the 3-D image depicting one or more physical objects located in the environment;

providing, on the user interface, a paint user control for use by a user to indicate areas within images displayed on the user interface;

receiving, via a user activation of the paint user control, an indication of a data point within the 3-D image;

based upon the indicated data point within the 3-D image,
(i) automatically determining, without any additional user input aside from the user activation, boundaries of a depiction of an essentially planar surface area within the 3-D image, the depiction of the essentially planar surface area including the indicated data point and other data points surrounding the indicated data point within the 3-D image, and the essentially planar surface area being a particular type of surface area,
(ii) automatically determining, from a plurality of visual properties, each of which denotes a different type of surface area, a particular visual property corresponding to the particular type of the essentially planar surface area, and (iii) automatically modifying, by the one or more computing devices and based on the determined boundaries, the particular visual property of the data points included within the boundaries of the depiction of the essentially planar surface area of the particular type;

obtaining, by the one or more computing devices, an indication of a particular label for the automatically determined depiction of the essentially planar surface area of the 3-D image; and storing, by the one or more computing devices in one or more tangible, non-transitory memories, an indication of an association between data indicative of the automatically determined depiction of the essentially planar surface area of the 3-D image and the particular label, thereby distinguishing the essentially planar surface area from other physical objects depicted within the 3-D image.

2. The method of claim 1, wherein the particular label is included in a plurality of labels of a plurality of areas and/or physical objects, and wherein each label included in the plurality of labels corresponds to a respective visual property.

3. The computer-implemented method of claim 1, wherein the user activation of the paint user control consists of only a single mouse click.

4. The computer-implemented method of claim 1, wherein the automatically determined depiction of the essentially planar surface area within the 3-D image is a first area representing a first essentially planar surface area of a first particular type, and the visual property is a first visual property, and the method further comprises modifying a second area within the 3-D image with a second visual property different than the first visual property, the second area being another subset of the total area of the 3-D image representing a second essentially planar surface area of a second particular type, and the modifying of the second area based on a usage of the paint user control as a virtual paint brush, a virtual paint spill, or another type of usage of the paint user control.

5. The computer-implemented method of claim 4, wherein the usage of the paint user control is as the virtual paint brush, and modifying the second area with the second visual property comprises the user manipulating the virtual paint brush across the second area within the 3-D image.

6. The computer-implemented method of claim 5, wherein a width of the virtual paintbrush is modifiable.

7. The computer-implemented method of claim 1, wherein receiving, via the user activation of the paint user control, the indication of the data point within the 3-D image comprises receiving an indication of the user activation of the paint user control while a cursor or electronic pointer controlled by the paint user control hovers over or points to a location of the data point.

8. The computer-implemented method of claim 1, further comprising receiving an indication of a particular type of object depicted in the 3-D image, the particular type of object corresponding to the essentially planar surface area.

9. The computer-implemented method of claim 1, wherein the essentially planar surface area includes a road.

10. The computer-implemented method of claim 1, wherein the essentially planar surface area includes a ground.

11. The computer-implemented method of claim 1, wherein automatically modifying the particular visual property of the data points included within the depiction of the essentially planar surface area comprises automatically applying the particular visual property to the data points included within the depiction of the essentially planar surface area.

12. The computer-implemented method of claim 11, further comprising receiving, via the paint user control, an indication of a portion of the data points included within the depiction of the essentially planar surface area from which the particular visual property is to be removed.

13. The computer-implemented method of claim 1, wherein automatically modifying the particular visual property of the data points included within the depiction of the essentially planar surface area comprises removing the particular visual property from the data points included within the depiction of the essentially planar surface area of the 3-D image.

14. The computer-implemented method of claim 1, wherein automatically determining the boundaries of the depiction of the essentially planar surface area within the 3-D image comprises automatically determining the boundaries of the depiction of the essentially planar surface area within the 3-D image by utilizing an object identification model that has been trained based on identified objects depicted within a plurality of historical images of one or more environments in which vehicles operate.

15. The computer-implemented method of claim 1, wherein 3-D image of the environment comprises a dataset generated by one or more active sensing devices or systems.

16. The computer-implemented method of claim 15, wherein the one or more active sensing devices or systems include one or more light detection and ranging (LIDAR) devices.

17. The computer-implemented method of claim 15, wherein dataset is a point cloud dataset.

18. The computer-implemented method of claim 1, wherein the 3-D environment image is an interactive, three-dimensional (3-D) image of the environment.

19. The computer-implemented method of claim 1, wherein storing the indication of the association between the data indicative of the automatically determined depiction of the essentially planar surface area of the 3-D image and the particular label comprises storing data indicative of the particular label in association with each pixel or data point included in the automatically determined depiction of the essentially planar surface area of the 3-D image.

20. The computer-implemented method of claim 1, wherein the method further comprises:

receiving, via the user interface, an instruction to hide respective images of one or more specific objects depicted within the 3-D image of the environment; and based on the received hiding instruction, rendering non-visible the respective images of the one or more specific objects depicted within the 3-D image of the environment while maintaining respective levels of visibility of other objects and/or areas within the 3-D image of the environment, thereby preventing the respective images of the one or more specific objects from being indicated via the paint user control.

21. The computer-implemented method of claim 1, further comprising providing the stored data indicative of the association between the automatically determined depiction of the essentially planar surface area of the 3-D image and the particular label as training data for a machine-learning model that generates control signals to autonomously control one or more autonomous operations of a vehicle.

22. The computer-implemented method of claim 1, wherein receiving the indication of the particular label is executed prior to receiving the indication of the data point within the 3-D image.

23. The computer-implemented method of claim 1, wherein receiving the indication of the data point within the 3-D image is executed prior to receiving the indication of the particular label.

24. A system for identifying and labeling objects within images for training machine-learning based models that are used to autonomously operate vehicles, the system comprising:
a communication module;
one or more processors; and
one or more non-transitory, tangible memories coupled to the one or more processors and storing computer executable instructions thereon that, when executed by the one or more processors, cause the system to:
display, on a user interface, a three-dimensional (3-D) image of an environment in which vehicles operate, the 3-D image depicting one or more physical objects located in the environment;
provide, on the user interface, a paint user control for use by a user to indicate areas within the 3-D image;
receive, via the communication module, an indication of a user activation of the paint user control at a location of a data point within the 3-D image;
based upon the indicated location of the data point, (i) automatically determine, without any additional user input aside from the user activation, boundaries of a depiction of an essentially planar surface area within the 3-D image, the depiction of the essentially planar surface area including the indicated data point and other data points surrounding the indicated data point within the 3-D image, and the essentially planar surface area being a particular type of surface area, (ii) automatically determine, from a plurality of visual properties, each of which denotes a different type of surface area, a particular visual property corresponding to the particular type of the essentially planar surface area, and (iii) automatically modify, by the one or more computing devices and based on the determined boundaries, the particular visual property of the data points included within the boundaries of the depiction of the essentially planar surface area of the particular type;
obtain an indication of a particular label for the automatically determined depiction of the essentially planar surface area; and
store, in the one or more tangible, non-transitory memories, an indication of an association between data indicative of the automatically determined depiction of the essentially planar surface area of the 3-D image and the particular label, thereby distinguishing the essentially planar surface area from other physical objects depicted within the 3-D image.

25. The system of claim 24, wherein the particular label is included in a plurality of labels of a plurality of areas and/or objects, and wherein each label included in the plurality of labels corresponds to a respective visual property.

26. The system of claim 24, wherein the automatic determination of the depiction of the essentially planar surface area within the 3-D image comprises a utilization of an object identification model that has been trained based on identified objects depicted within a plurality of historical images of one or more environments in which vehicles operate.

27. The system of claim 24, wherein the stored association distinguishing the essentially planar surface area from other physical objects depicted within the 3-D image is included in a set of training data for a machine-learning model that generates control signals to autonomously control one or more operations of a vehicle.

* * * * *